(12) United States Patent
Amano

(10) Patent No.: US 8,246,172 B2
(45) Date of Patent: Aug. 21, 2012

(54) IMAGE DISPLAY DEVICE

(75) Inventor: Katsuhiro Amano, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 783 days.

(21) Appl. No.: 12/281,079

(22) Filed: Aug. 28, 2008

(65) Prior Publication Data
US 2009/0027571 A1 Jan. 29, 2009

Related U.S. Application Data

(63) Continuation-in-part of application No. PCT/JP2007/053605, filed on Feb. 27, 2007.

(30) Foreign Application Priority Data

Feb. 28, 2006 (JP) .................................. 2006-054047
Mar. 9, 2006 (JP) .................................. 2006-064799

(51) Int. Cl.
*G03B 21/00* (2006.01)
*G03B 21/14* (2006.01)
*H04N 3/22* (2006.01)
*H04N 3/26* (2006.01)

(52) U.S. Cl. ............................. 353/69; 353/82; 348/745

(58) Field of Classification Search .................... 353/69, 353/70, 30, 31, 79, 122, 82; 348/745; 248/917, 248/918, 919, 920
See application file for complete search history.

(56) References Cited

U.S. PATENT DOCUMENTS 6,002,505 A 12/1999 Kraenert et al.
6,394,610 B2 * 5/2002 Rodriguez, Jr. ................. 353/79
6,416,186 B1 7/2002 Nakamura
(Continued)

FOREIGN PATENT DOCUMENTS
DE 19640404 4/1998
(Continued)

OTHER PUBLICATIONS

International Search Report, mailed Apr. 24, 2007, in PCT/JP2007/053605.

(Continued)

*Primary Examiner* — William C Dowling
*Assistant Examiner* — Ryan Howard
(74) *Attorney, Agent, or Firm* — Banner & Witcoff, Ltd

(57) ABSTRACT

The present invention provides an image display device which detects projection region suitable for performing a display of an image and displays an image on the detected projection region. The present invention provides an image display device which displays an image on a projection surface by projecting light on the projection surface. The image display device includes an aptitude detection part which detects an aptitude as the projection surface, and a projection control part which controls projection light such that the an image to be displayed on the projection surface falls within a predetermined projection region in response to a detection result by the aptitude detection part. For example, the image display device further includes an aptitude value arithmetic operation part which recognizes the projection area as a mass of a plurality of divided regions and detects aptitude values of projection surfaces of the respective divided regions, a projection region determining part which selects one or more divided regions out of the plurality of divided regions as the projection regions based on the aptitude values, and an image processing part which controls projection light such that an image to be projected on the projection surface falls within one or more projection regions.

19 Claims, 56 Drawing Sheets

U.S. PATENT DOCUMENTS

| | | |
|---|---|---|
| 6,575,581 B2 | 6/2003 | Tsurushima |
| 2004/0021799 A1 | 2/2004 | Matsuda |
| 2005/0128578 A1 | 6/2005 | Sugawara et al. |

FOREIGN PATENT DOCUMENTS

| | | |
|---|---|---|
| EP | 1365584 A2 | 11/2003 |
| EP | 1365597 | 11/2003 |
| EP | 1224507 B1 | 9/2005 |
| JP | 04277810 A | 2/1992 |
| JP | 4355740 A | 12/1992 |
| JP | 06245207 A | 9/1994 |
| JP | 2001075733 A | 3/2001 |
| JP | 2001249399 A | 9/2001 |
| JP | 2001-350586 A | 12/2001 |
| JP | 2003513307 A | 4/2003 |
| JP | 2003207846 A | 7/2003 |
| JP | 2003280091 A | 10/2003 |
| JP | 2004048695 A | 2/2004 |
| JP | 2004070298 A | 3/2004 |
| JP | 2004348078 A | 12/2004 |
| JP | 2005-303493 | 10/2005 |

OTHER PUBLICATIONS

European Search Report for corresponding European Patent Application No. 07737407.2 issued on Nov. 13, 2009.

Notification of Reason for Refusal dated Jan. 11, 2011 in Japanese Application No. 2006-054047 and partial English translation thereof.

Notification of Reason for Refusal dated Jan. 11, 2011 in Japanese Application No. 2006-064799 and partial English translation thereof.

* cited by examiner

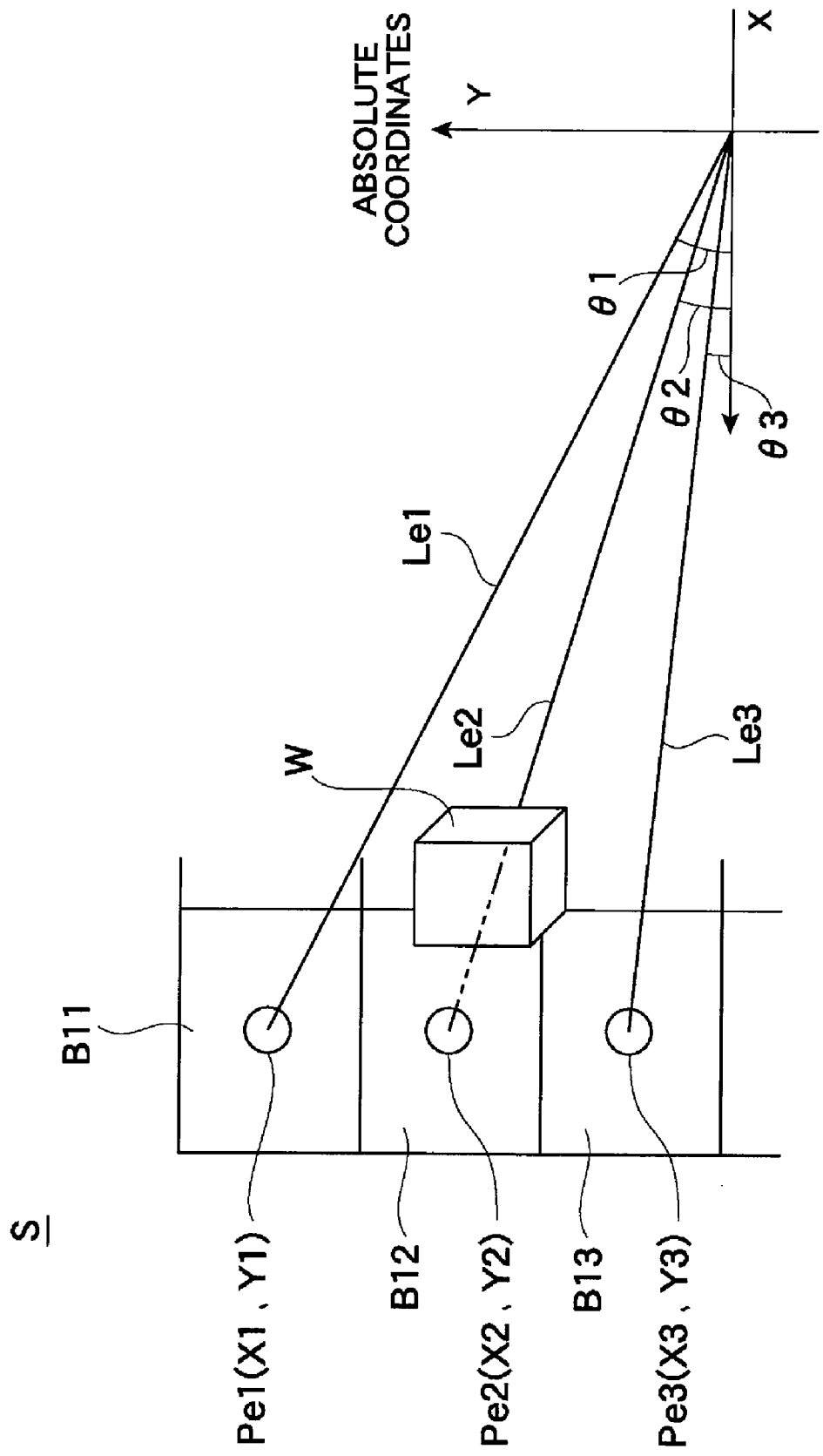

Fig. 7A

| CLOSE TO A PROJECTION LENS | 4 POINTS |
|---|---|
| SLIGHTLY SPACED-APART | 3 POINTS |
| LARGELY SPACED-APART | 2 POINTS |
| NOT MEASURABLE | 0 POINT |

Fig. 7B

| THREE POSITIONS ON ONE STRAIGHT LINE | 5 POINTS |
|---|---|
| SLIGHTLY SPACED-APART | 3 POINTS |
| LARGELY SPACED-APART | 2 POINTS |
| NOT MEASURABLE | 1 POINT |

| | | | |
|---|---|---|---|
| 2 | ③ | ⑤ | ⑤ |
| 2 | ③ | ⑤ | ⑤ |
| 1 | ③ | ⑤ | ⑤ |
| 1 | ③ | ⑤ | ⑤ |

B11 (top-left) B41 (top-right)
B14 (bottom-left) B44 (bottom-right)

Fig. 20

| WHITE COLOR (100~80) | 5 POINTS |
|---|---|
| THIN COLOR ( 79~50) | 3 POINTS |
| THICK COLOR ( 49~20) | 2 POINTS |
| BLACK COLOR ( 19~ 0) | 1 POINT |

| B11 | | | B41 |
|---|---|---|---|
| 1 | 7 | 8 | 9 |
| 2 | 7 | 9 | 9 |
| 2 | 8 | 9 | 9 |
| 3 | 8 | 9 | 9 |
| B14 | | | B44 |

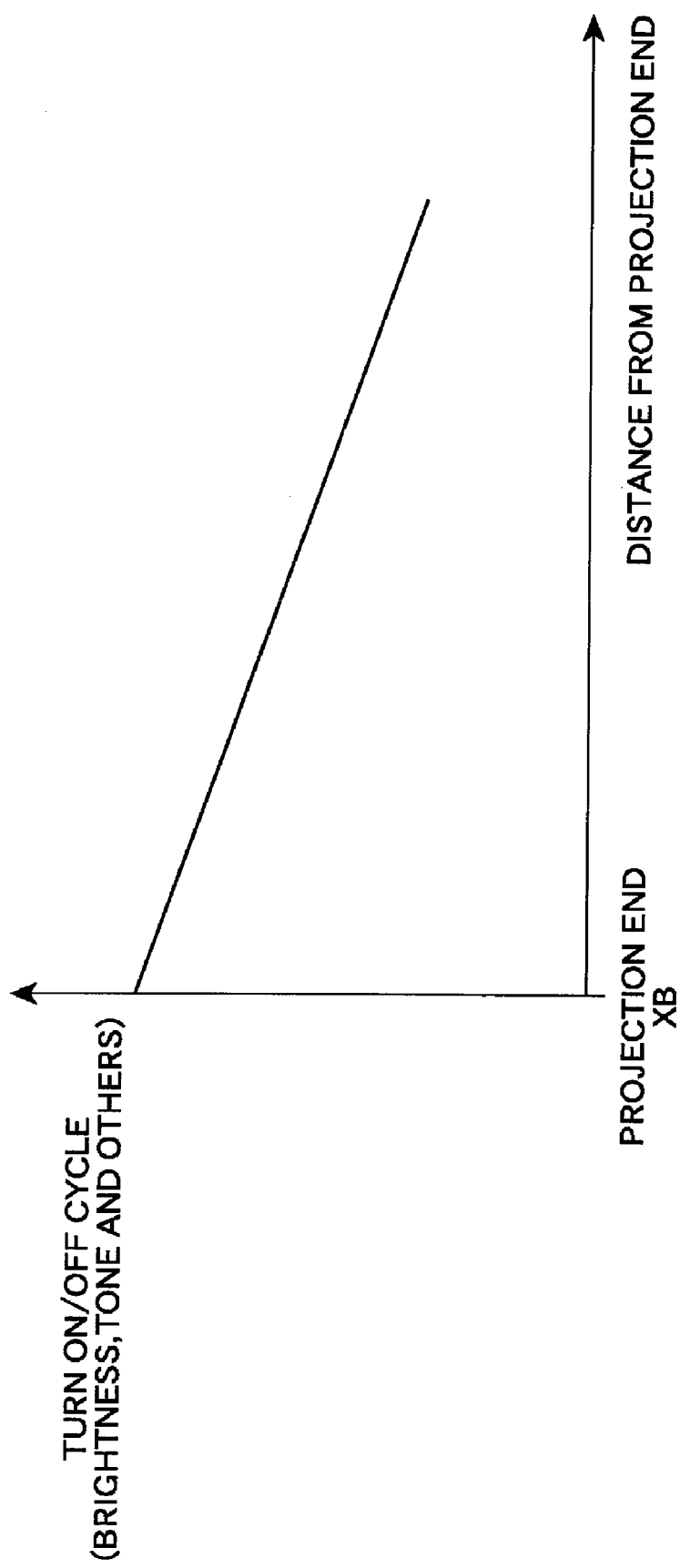

IMAGE DISPLAY DEVICE

CROSS-REFERENCE TO RELATED APPLICATIONS

The present application is a Continuation-in-Part of International Application PCT/JP2007/053605 filed on Feb. 27, 2007, which claims the benefits of Japanese Patent Application No. 2006-054047 filed on Feb. 28, 2006 and Japanese Patent Application No. 2006-064799 filed on Mar. 9, 2006.

BACKGROUND OF THE INVENTION

1. Field of the Invention

The present invention relates to an image display device such as a projector for displaying an image on a projection surface such as a screen.

2. Description of the Related Art

The image display device such as a projector is provided for projecting an image such as a still image or an animated image of an OHP or a slide on a projection surface such as a screen.

Recently, in making the presentation to a plurality of people concerned, a document stored in a computer device is projected on an image display device, and the explanation or the like is made using an image displayed on the projection surface (see JP-A-2003-280091 (patent document 1), for example).

In displaying an image on the projection surface using such an image display device, when unevenness exists on the projection surface or an obstacle exists on the projection surface or in the midst of an optical path of a projection light, there arises a drawback that a projected image is distorted or a shadow of the obstacle is displayed on the projection surface. Accordingly, several methods have been proposed conventionally for preventing the occurrence of such drawback.

For example, there has been known one conventional image display device which detects whether or not a projection light is projected in the oblique direction relative to a screen. When the projecting direction is oblique relative to the screen, a trapezoidal distortion generated due to the presence of the oblique projecting direction is automatically corrected (see JP-A-4-355740 (patent document 2), for example).

Further, there has been also known an image display device which radiates detection waves such as infrared rays to a screen, and detects reflection waves reflected from a screen side thus detecting the presence or non-presence of an obstacle. Then, when the obstacle is detected, a quantity of projection light is reduced or the projection is interrupted by taking a case that the obstacle is a human into consideration (see JP-A-2004-70298 (patent document 3), for example).

SUMMARY OF THE INVENTION

However, none of these conventional image display devices can prevent the distortion of image generated by unevenness which exists partially on the surface of the screen. Further, the image display devices disclosed in patent document 1 and patent document 2 cannot detect an obstacle present in the midst of the optical path of the projection light and hence, these image display devices cannot prevent the shadow of the obstacle from being displayed. Further, although the image display device disclosed in patent document 3 can detect the obstacle in the midst of the optical path, a quantity of projection light is decreased or the projection is interrupted when the obstacle is detected and hence, the image is no more displayed or it is difficult for a viewer to watch an image due to shortage of light quantity.

The present invention has been made to overcome such drawbacks and it is an object of the present invention to provide an image display device which detects projection region suitable for performing a display of an image and displays an image on the detected projection region.

To overcome the above-mentioned drawbacks, according to a first aspect of the present invention, there is provided an image display device for projecting light on a projection surface to display an image on the projection surface, wherein the image display device includes: an aptitude detection part which detects an aptitude as the projection surface; and a projection control unit which controls the projection light to allow the image to be displayed on the projection surface to fall within a predetermined projection region in response to a result of detection by the aptitude detection part.

BRIEF DESCRIPTION OF THE DRAWINGS

FIG. 5A and FIG. 5B are explanatory views for explaining processing of an obstacle detection part in an arithmetic processing part of controller;

FIG. 7A is an evaluation-use distance table used for obtaining an aptitude value;

FIG. 7B is a spaced-apart distance table used for obtaining the aptitude value;

FIG. 8 is an explanatory view for explaining one example of aptitude values obtained with respect to the respective divided regions with respect to the first embodiment;

FIG. 20 is a luminosity table used in obtaining aptitude values;

FIG. 21 is an explanatory view for explaining one example of aptitude values obtained with respect to the respective divided regions with respect to the second embodiment;

FIG. 34A and FIG. 34B are views for explaining a state in which the adjustment of the image size is performed;

FIG. 45 is a flowchart for explaining an image projection processing for setting a projection position of an image, an image size, brightness and the like;

DESCRIPTION OF THE PREFERRED EMBODIMENTS

First Embodiment

Hereinafter, a projector according to an embodiment of an image display device is explained in detail in conjunction with drawings. With respect to symbols used in the respective drawings, parts having an identical function are given the same symbols.

Figure 1:
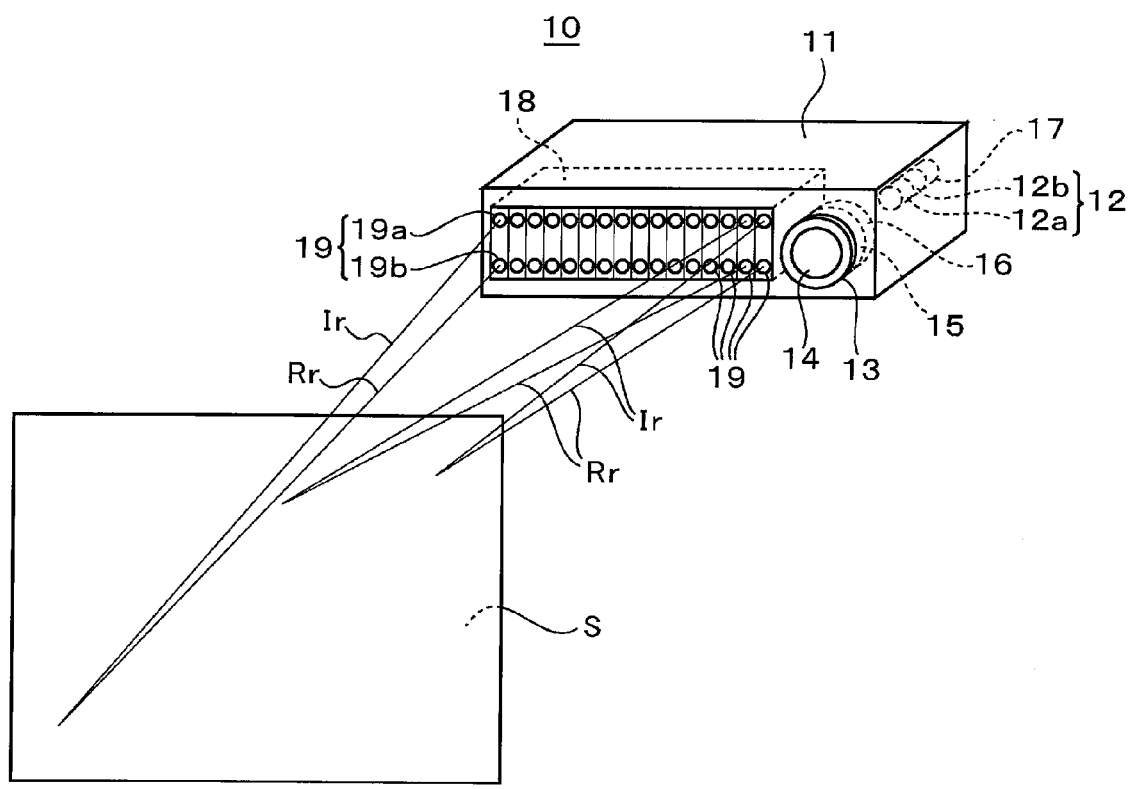
FIG. 1 is a perspective view showing an image display device of a first embodiment.

As shown in FIG. 1, a projector 10 includes a light source unit 12 mounted in a projector body 11 thereof and a projection lens part 13 mounted on a front surface of the projector body 11. The light source unit 12 includes a light source 12a for projecting a projecting light L to display an image (see FIG. 2) and a light source control part 12b for controlling the light source 12a in response to signals from an image processing part 27 described later. Further, the projection lens part 13 includes a projection lens 14, and the projecting light L is projected on a screen S or the like using the projection lens 14.

Figure 2:
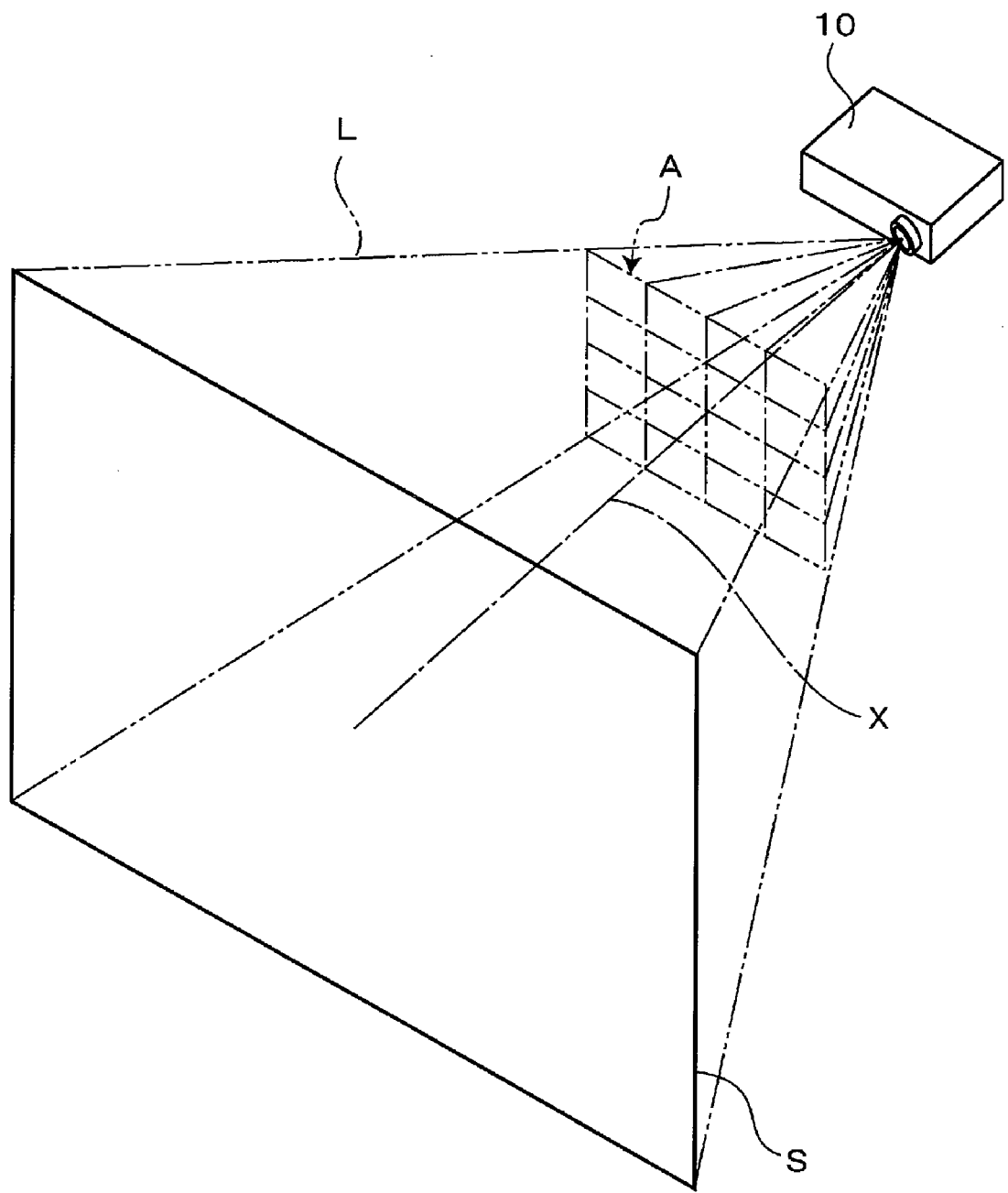
FIG. 2 is a perspective view showing a projection area of the image display device shown in FIG. 1.
Figure 3A:
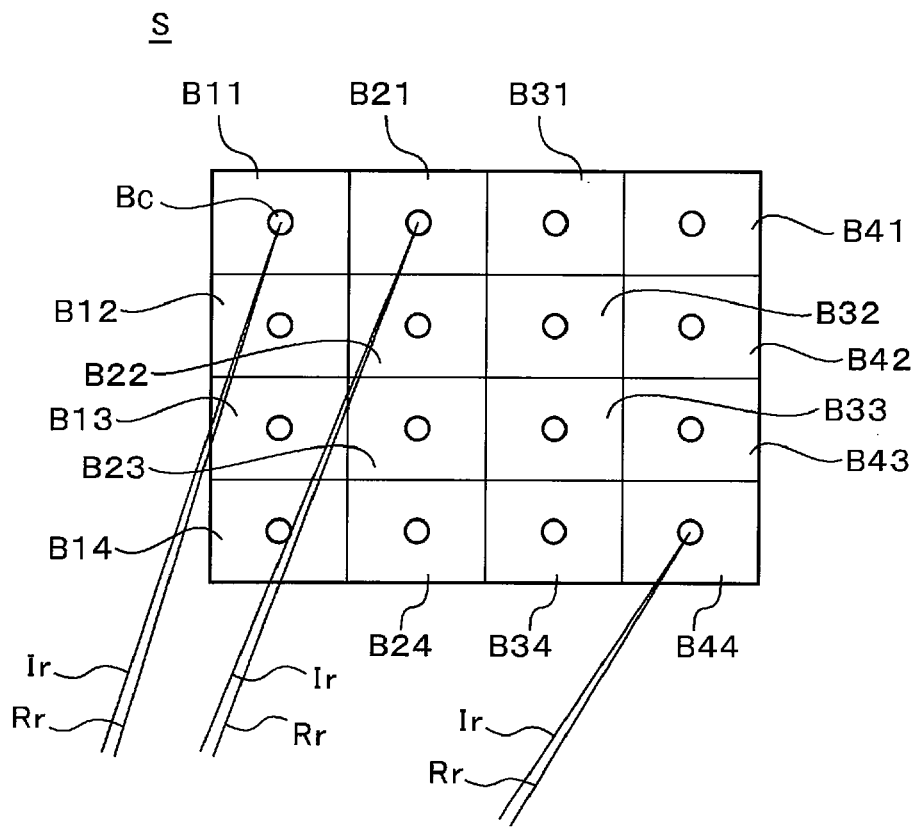
FIG. 3A is a front view showing a shape of the projection area and divided regions.

As shown in FIG. 2, a shape of an area on which an image can be projected using the projection light L, that is, a shape of a projection area A is a laterally-elongated rectangular shape. Further, the projection area A is, by a controller 20 (see FIG. 4) described later, recognized as a mass of a plurality of divided regions B as shown in FIG. 3A. To be more specific, the projection area A is recognized as a mass of the sixteen divided regions B in total extending vertically in four rows and laterally in four columns. Each divided region B has a laterally-elongated shape similar to the shape of the projection area A. In identifying an individual divided region B, the explanation is made by adding a suffix indicative of a position of the divided region B. For example, "divided region B21" is a divided region B positioned at the second column from the left and at the first row from above with respect to the projection light L projected toward the screen S from the light source 12a of the projector 10.

Here, the projection area A actually means a space through which the projection light L from the light source 12a advances. However, here, assuming that a plane orthogonal to a projecting direction X of the projection light L is provided, a shape of a projection range of the projection light L projected on the plane becomes a shape of the projection area A (see FIG. 2). Further, the divided region B, a projection candidate region C and a projection region D described later also mean predetermined spaces through which the projection light L from the light source 12a advances. Here, in the same manner as the projection area A, a shape of each region such as the divided region B projected on a plane orthogonal to the projecting direction X of the projection light L is rendered as the shape of the divided region B.

Further, as shown in FIG. 1, the projector 10 includes a zooming unit 15 and a focusing unit 16 provided to the projection lens part 13, a light quantity adjuster 17 mounted in the projector body 11, a sensor unit 18 mounted on a front surface of the projector body 11, an ON-OFF switch and a power source unit (neither of them shown in the drawing) of the projector 10. Further, the projector 10 mounts the controller 20 for operation control in the projector body 11. Here, lines for supplying electric power to respective devices and the like are omitted.

Figure 4:
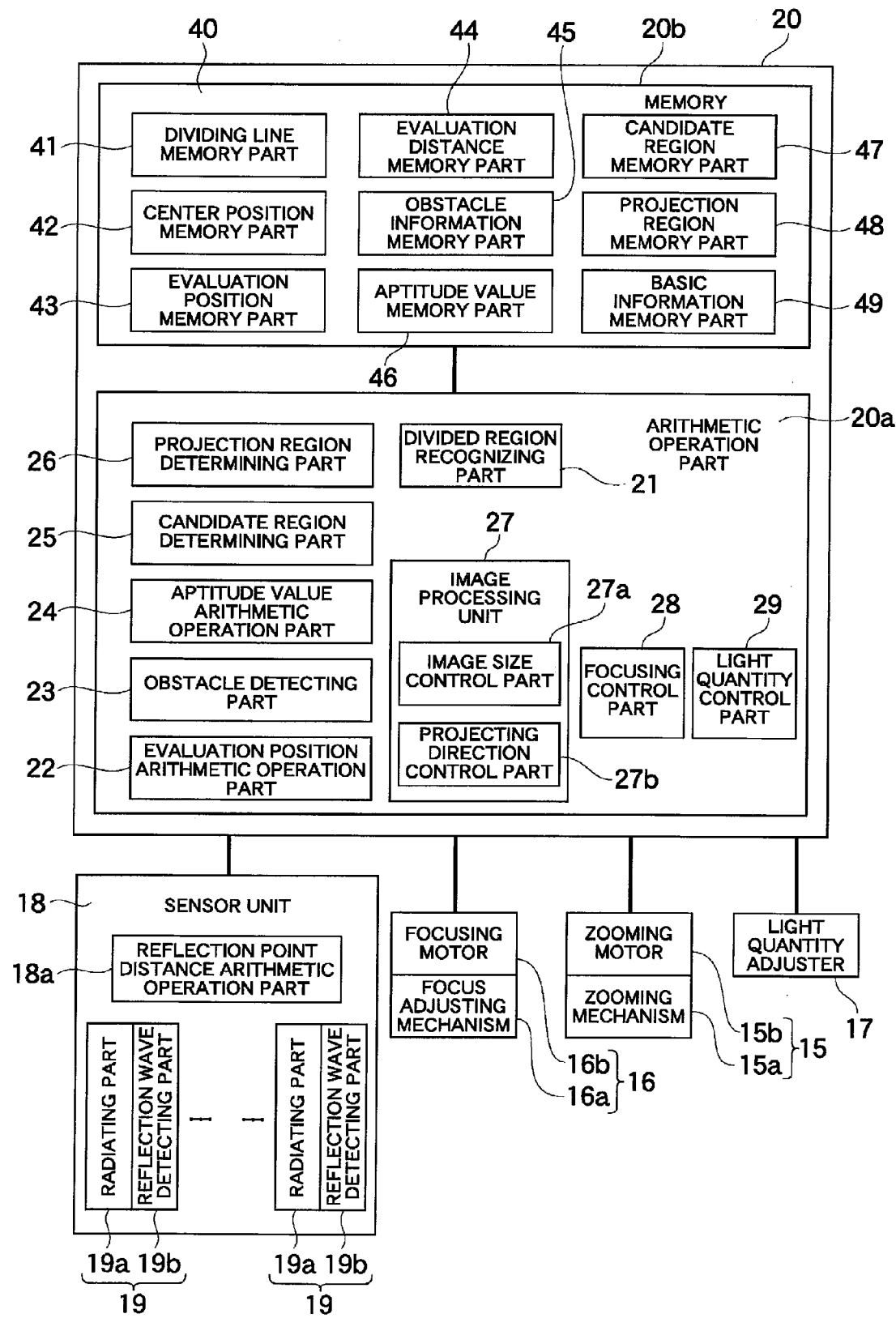
FIG. 4 is an explanatory view for explaining a function of a controller of the image display device shown in FIG. 1.

The zooming unit 15 is provided for enlarging or shrinking an image to be projected on the screen S and includes a zooming mechanism 15a and a zooming motor 15b for operating the zooming mechanism 15a (see FIG. 4). Further, the focusing unit 16 includes a focus adjusting mechanism 16a which adopts a so-called helicoid mechanism and a focusing motor 16b for operating the focus adjusting mechanism 16a (see FIG. 4). Zooming and focus adjusting of the projection lens 14 are performed by operating the zooming mechanism 15a and the focus adjusting mechanism 16a using these motors 15b, 16b. Here, these mechanisms are known mechanisms and hence, the detailed explanation of these mechanisms is omitted.

The light quantity adjuster 17 is a voltage-variable light quantity adjuster and adjusts quantity of light by adjusting a voltage of electric power supplied to the light source 12a. With the provision of the light quantity adjuster 17, an image having a suitable brightness can be displayed on the screen S. Here, the light adjusting method is not limited to the voltage-variable light adjusting method, and various other methods including a method which uses a stop or a filter may be used.

The sensor unit 18 includes a plurality of distance sensors 19 for measuring distances from the projector 10. To be more specific, the sensor unit 18 includes sixteen distance sensors 19 which is the same as the number of the divided regions B. Each distance sensor 19 includes a radiating part 19a for radiating an infrared ray (detection waves) Ir toward the inside of the projection area A of the projector 10 and a reflection wave detecting part 19b for detecting a reflection wave of the infrared ray Ir. Further, the sensor unit 18 includes a reflection point distance arithmetic operation part 18a (see FIG. 4) for obtaining a distance from the distance sensor 19 to a reflection point Pr of the infrared ray Ir (see FIG. 3B) based on detected information.

As shown in FIG. 3A, the radiating part 19a of each distance sensor 19 radiates an infrared ray Ir toward the center Bc of the corresponding divided region B. Accordingly, when the screen S is arranged in the projecting direction of the projection light L, the infrared ray Ir radiated from the distance sensor 19 is reflected on a surface of the screen S at a position of the center Bc of the corresponding divided region B. Then, the reflection wave of the infrared ray Ir (herein after, referred to as reflected infrared ray) Rr is detected by the reflection wave detecting part 19b of the distance sensor 19.

Figure 3B:
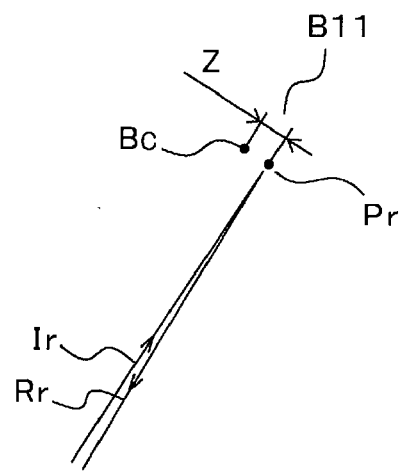
FIG. 3B is an explanatory view for explaining a center position and a reflection point in the divided region.

Here, a position of the projection lens 14 for projecting the projection light L differs from positions where the radiating parts 19a of the distance sensors 19 which radiate the infrared ray Ir are positioned. Accordingly, as shown in FIG. 3B, there is a possibility that the position of the actual reflection point Pr of the infrared ray Ir is displaced from the position of the center Bc of the corresponding divided region B. However, the distance between the projection lens 14 and the distance sensor 19 is smaller than the distance from the projector 10 to the reflection point Pr and hence, a displacement quantity of the reflection point Pr from the center Bc is slight. Accordingly, in this embodiment, the radiation direction of the infrared ray Ir of each distance sensor 19 is explained as the direction of the infrared ray Ir toward the position of the center Bc of the corresponding divided region B.

The reflection point distance arithmetic operation part 18a of the sensor unit 18 (see FIG. 4) obtains a distance from the distance sensor 19 to the reflection point Pr based on the radiation direction of the infrared ray Ir and an incident direction of the reflected infrared ray Rr from the reflection point Pr in each distance sensor 19. Further, the reflection point distance arithmetic operation part 18a also obtains the position of each reflection point Pr with respect to the position of the distance sensor 19 based on the obtained distance to the reflection point Pr and the radiation direction of the infrared ray Ir and/or the incident direction of the reflected infrared ray Rr. The distance from the distance sensor 19 to the reflection point Pr and the position of the reflection point Pr with respect to the distance sensor 19 are stored in a center position memory part 42 of a memory 20b described later via a controller 20. The distance from the distance sensor 19 to the reflection point Pr can be obtained using the principle of triangulation or the like provided that the radiation direction of the infrared ray Ir and the incident direction of the reflected infrared ray Rr from the reflection point Pr are as known. Accordingly, the explanation of the method of obtaining the distance from the distance sensor 19 to the reflection point Pr is omitted here.

Here, as described above, as shown in FIG. 3B, the actual position of the reflection point Pr is not always positioned on the center Bc of the divided region B. Accordingly, a correction may be made with respect to the position of the actual reflection point Pr. For example, when the position of the reflection point on the assumption that the reflection point is positioned at the center Bc of the divided region B is obtainable by the correction, the corrected reflection point position obtained by the correction may be stored in the center position memory part 42.

Next, the controller 20 is explained.

As shown in FIG. 4, the controller 20 includes an arithmetic operation processing part 20a which performs various processing and the memory 20b which stores various data therein.

The arithmetic operation processing part 20a includes a divided region recognizing part 21 for recognizing the projection area A as a mass of a plurality of divided regions B, an evaluation position arithmetic operation part 22 for obtaining an evaluation position Pe of each divided region B (see FIG. 5) based on the position of the reflection point measured by the distance sensor 19, an obstacle detecting part 23 for detecting an obstacle W or the unevenness present in each divided region B, an aptitude value arithmetic operation part 24 for obtaining an aptitude value R of each divided region B as a projecting surface, a candidate region determining part 25 for determining a projection candidate region C out of the divided regions B, a projection region determining part 26 for selecting a projection region D out of the projection candidate regions C, an image processing part 27 for performing image processing to display an image in the selected projection region D, a focusing control part 28 for controlling the focusing motor 16b for the projection lens 14 and a light quantity control part 29 for controlling the light quantity adjuster of the light source. The aptitude value arithmetic operation part 24 is provided for detecting an aptitude of the projecting surface and corresponds to one example of an aptitude detecting part. The candidate region determining part 25 and the projection region determining part 26 are provided for selecting a projection region based on the detection result obtained by the aptitude value arithmetic operation part 24 and corresponds to one example of a region selection part. The image processing part 27 is provided for controlling a projection light so that an image displayed on the projecting surface falls within a predetermined projection region based on the detection result obtained by the aptitude value arithmetic operation part 24, and corresponds to one example of the projecting control part.

Further, the memory 20b includes a dividing line memory part 41 for storing information on dividing lines which divide the projection area A into a plurality of divided regions B, the center position memory part 42 for storing positions of reflection points Pr measured by the respective distance sensors 19, an evaluation position memory part 43 for storing the evaluation positions Pe obtained with respect to the respective divided regions B, an evaluation distance memory part 44 for storing distances Le from the respective divided regions B to the evaluation positions Pe, an obstacle information memory part 45 for storing information on whether or not an obstacle W or the unevenness is present in the respective divided regions B, an aptitude value memory part 46 for storing aptitude values R obtained with respect to the respective divided regions B, a candidate region memory part 47 for storing information whether or not the respective divided regions B are determined as the projection candidate regions C, a projection region memory part 48 for storing information whether or not each projecting candidate region C is selected as a projection region D, and a basic information memory part 49 for storing data and tables to be used in an arithmetic operation executed by the arithmetic operation processing part 20a.

The controller 20 recognizes, in the divided region recognizing part 21, as explained previously, the projection area A as a mass of a plurality of divided regions B based on division information stored in the dividing line memory part 41. As shown in FIG. 3A, the projection area A is divided into regions extending vertically in four rows and laterally in four columns and is recognized as a mass of the sixteen divided regions B in total. Accordingly, when the projection light L is projected on a plane orthogonal to a projecting direction X of the projection light L, the centers Bc of the divided regions B arranged vertically in the projection area A are positioned on one straight line and, in the same manner, the centers Bc of the divided regions B arranged laterally are also positioned on one straight line. Here, the division information stored in the dividing line memory part 41 is, for example, position information of dividing lines in a matrix array which divides the projection area A.

The evaluation position arithmetic operation part 22 obtains the evaluation position Pe of each divided region B based on the position of the reflection point Pr of each divided region B measured by each distance sensor 19. The position of the reflection point Pr measured by the distance sensor 19 is stored in the center position memory part 42 as a relative position with respect to the position of the distance sensor 19. The stored position of the reflection point Pr may be directly used as the evaluation position. In this case, the evaluation position arithmetic operation part 22 is unnecessary. In this embodiment, with the use of the evaluation position arithmetic operation part 22, the position of each reflection point Pr is converted into the position which is expressed as the relative position with respect to the position of the projection lens 14 and the converted position is set as the evaluation position Pe of each divided region B. In this manner, by setting the common standard for determining the respective evaluation positions Pe, the arithmetic operation executed thereafter is facilitated. Here, various positions such as the positions of the respective distance sensors 19 described later are positions relative to the position of the projection lens 14 unless otherwise specified.

In the evaluation position arithmetic operation part 22, first of all, a divided region B to be subjected to the arithmetic operation is selected, and the position of the reflection point Pr corresponding to the selected divided region B is read from the center position memory part 42. Then, the position of the distance sensor 19 which measures the position of the reflection point Pr of the selected divided region B and the position of the projection lens 14 are read from the basic information memory part 49 of the memory 20b. Based on these positions, the evaluation positions Pe of the respective divided regions B are obtained. The obtained evaluation positions Pe are stored in the evaluation position memory part 43 as the evaluation positions Pe of the corresponding divided regions B. In the evaluation position arithmetic operation part 22, the distances from the projection lens 14 to the respective evaluation positions Pe are obtained. Here, the obtained distances are stored in the evaluation distance memory part 44 as the evaluation distances Le to the corresponding divided regions B. Such processing is performed with respect to all the divided regions B. Here, the evaluation positions Pe and the evaluation distances Le can be obtained using the principle of triangulation or the like provided that the positions of the reflection point Pr, the positions of the distance sensor 19 and the positions of the projection lens 14 are known. Accordingly, the method for obtaining the evaluation positions Pe and the evaluation distances Le is omitted here.

Figure 12:
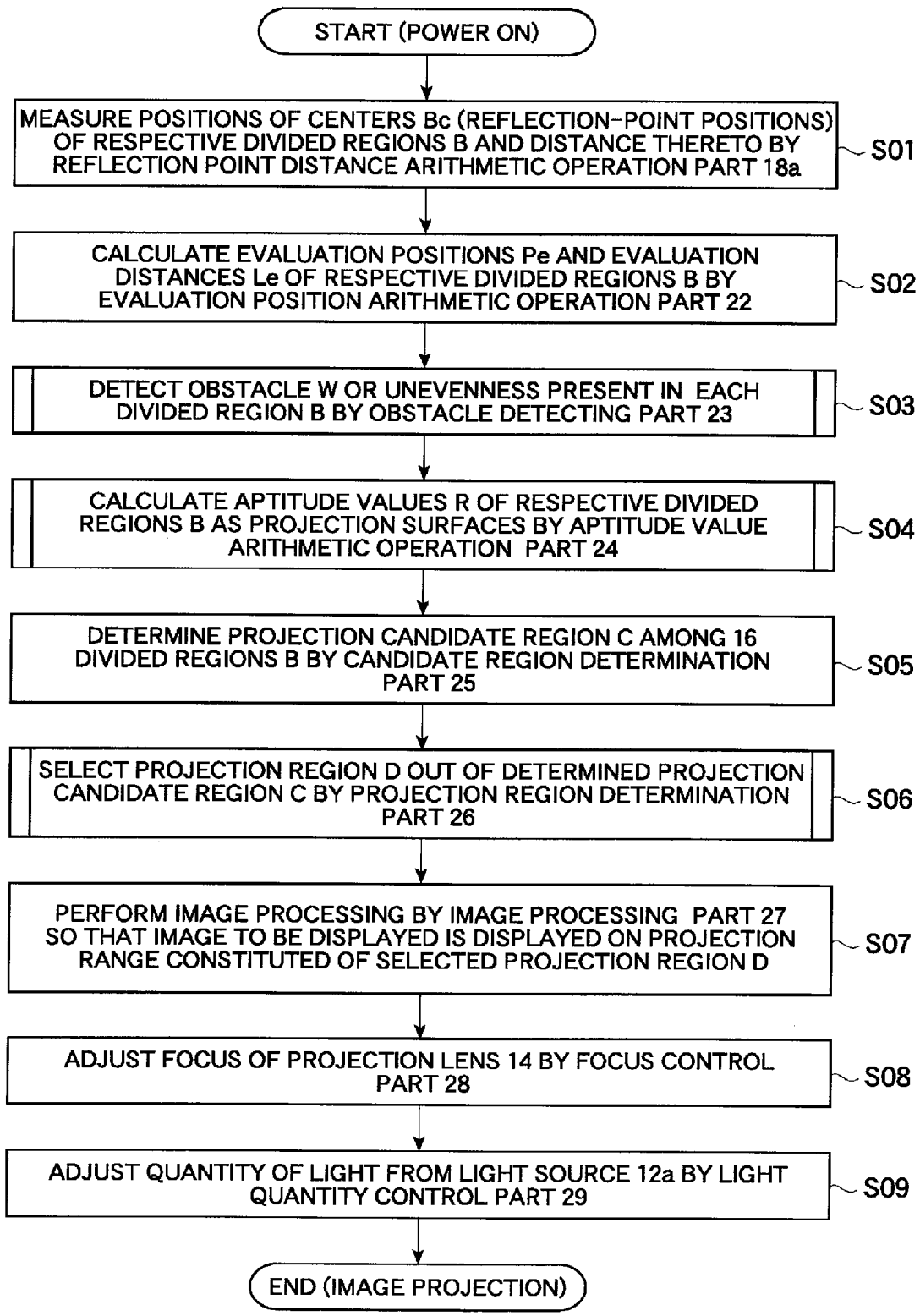
FIG. 12 is a flowchart showing the manner of operation of the image display device of the first embodiment.

The obstacle detecting part 23 executes processing for detecting an obstacle W or the unevenness present in each divided region B (see S03 in FIG. 12).

Figure 13:
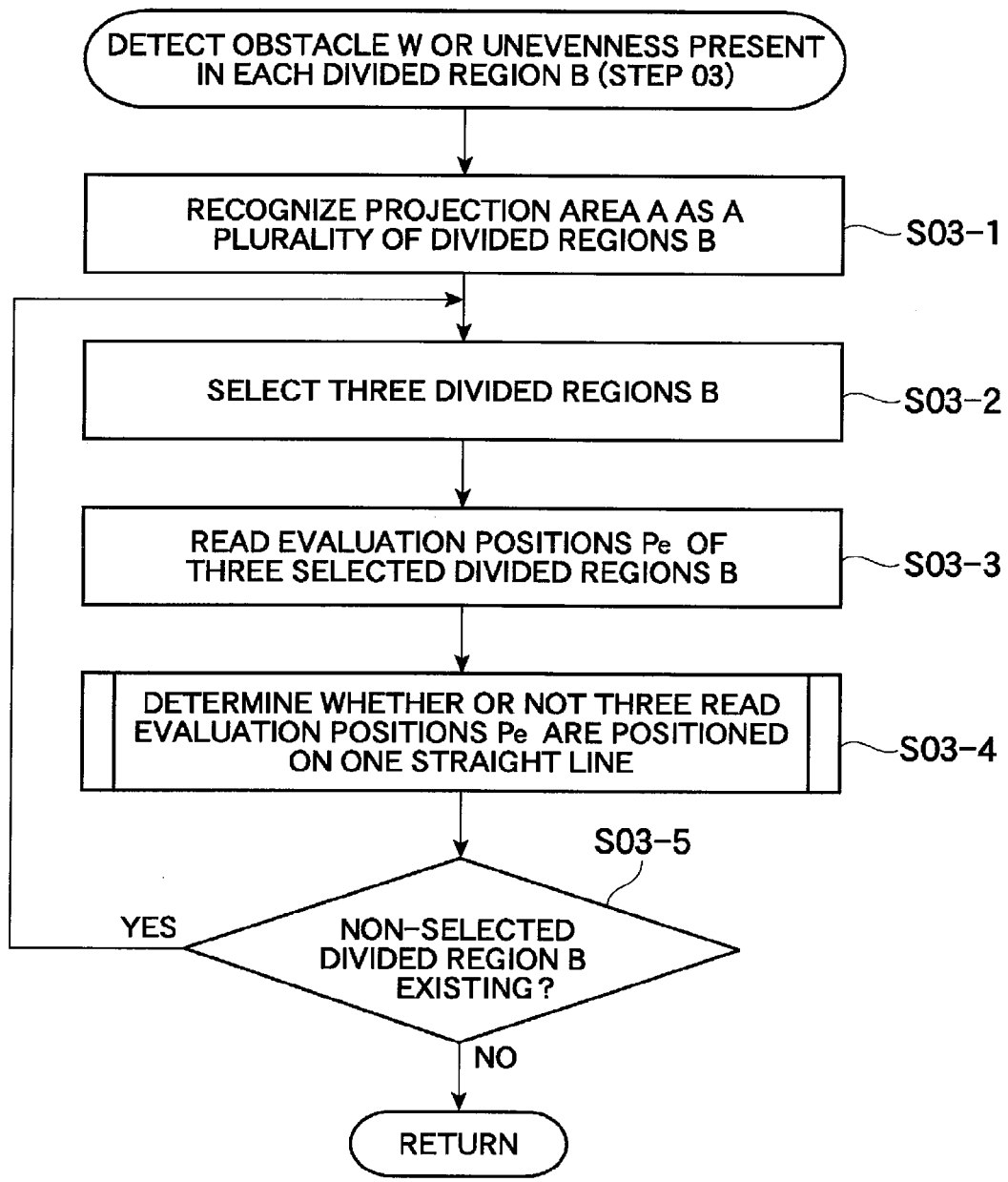
FIG. 13 is a flowchart showing processing of the obstacle detection part.

As described in a flowchart shown in FIG. 13, the obstacle detecting part 23 recognizes the projection area A as a plurality of divided regions B (S03-1) and selects three divided regions B from the recognized divided regions B (S03-2). Although various selection manners are considered, in this embodiment, three divided regions B arranged vertically or laterally are selected. Next, the evaluation positions Pe of the three selected divided regions B are read from the evaluation position memory part 43 (S03-3). Then, it is determined whether or not the three read evaluation positions Pe are positioned on one straight line (that is, on one plane) (S03-4) and the determination result is stored in the obstacle information memory part 45. Thereafter, it is determined whether or not there exists a non-selected divided region B (S03-5). When there exists such a non-selected divided region B, the processing returns to the step (S03-2) for selecting three divided regions B out of the non-selected divided regions B, and the processing is repeated until the evaluation is finished with respect to all the divided regions B (S03-5). Here, until the evaluation is made with respect to all the divided regions B, the same divided region B may be selected plural times or the same divided region may not be repeatedly selected. Further, in respective flowcharts used in this embodiment including the flowchart shown in FIG. 13, although flows of processing such as detection processing, the determination processing and the like are explained, processing of storing information in the memory parts or the like is omitted.

Here, as explained above, when the projection light L is projected on a plane orthogonal to the projecting direction X, the positions of the centers Bc of the divided regions B arranged vertically or the positions of the centers Bc of the divided regions B arranged laterally are positioned on one straight line. In this embodiment, the positions of the reflection points Pr positioned at the centers Bc of the respective divided regions B are used as the evaluation positions Pe of the respective divided regions B. Accordingly, when the screen S on which the projection light L is projected is a plane, the three evaluation positions Pe are positioned on one straight line and, when there exists an obstacle W (see FIG. 5) or the unevenness, the three evaluation positions Pe are not positioned on one straight line. As can be understood from this explanation, the determination whether or not three evaluation positions Pe are positioned on one straight line is also expressed as the determination whether or not three evaluation positions Pe are arranged to and fro in relation to the projection X and hence, this technique is suitable as a projecting direction determining technique for detecting an obstacle or the unevenness.

Figure 5A:
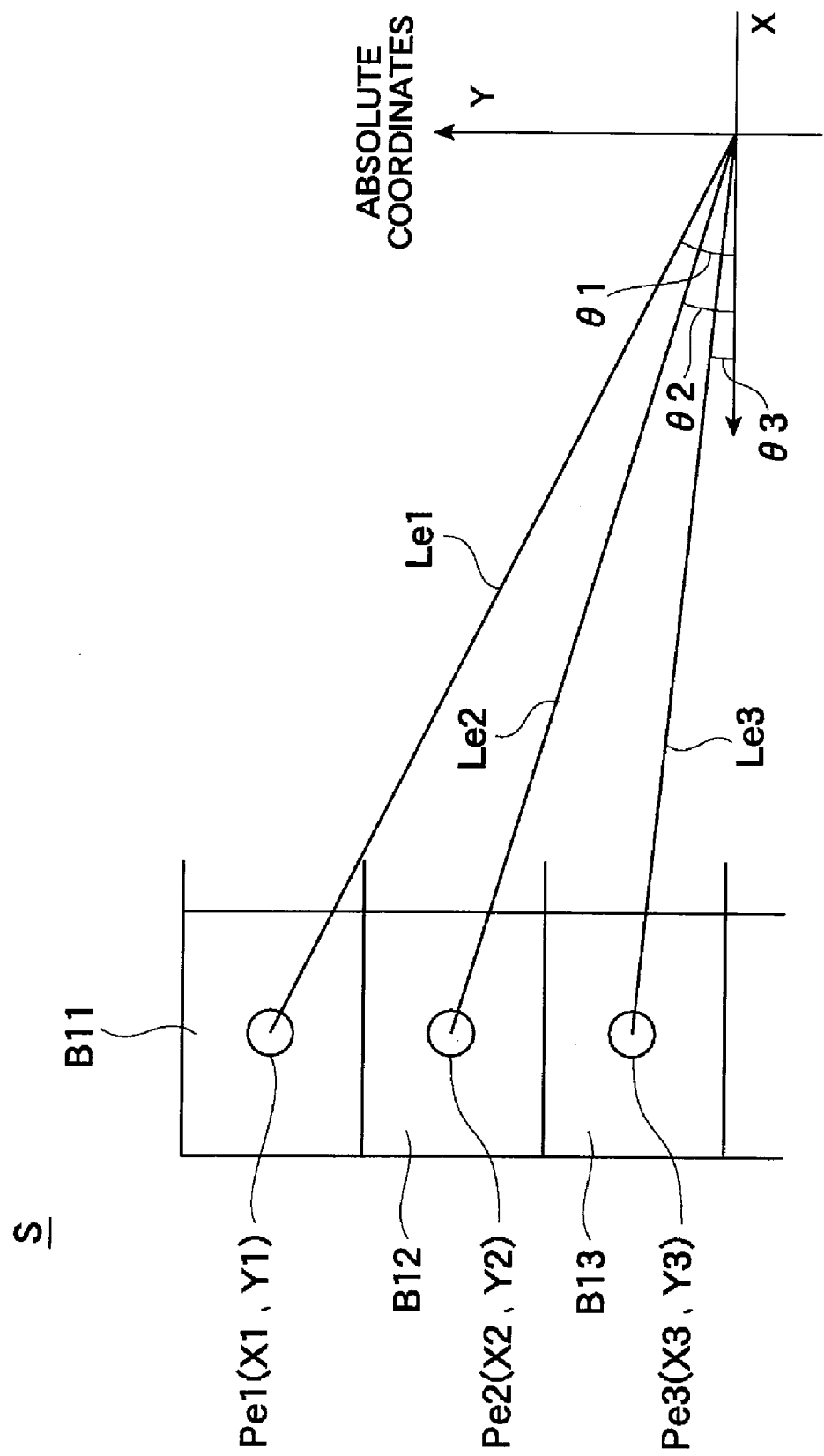

As a method of determining whether or not three evaluation positions Pe are positioned on one straight line, various methods are considered. Here, a basic determination method is explained by taking a case in which three divided regions B11, B12, B13 (see FIG. 3A) positioned on the first column from the left of the projection area A are selected as an example. As shown in FIG. 5A, for example, coordinates (x2, y2) of the evaluation position Pe2 of the divided region B12 positioned at the center of three evaluation positions Pe are, as expressed by the following formula 2, specified by the distance L2 from the position of the corresponding distance sensor 19 to the evaluation position Pe2 and an angle θ2 made by the direction of the evaluation position Pc2 and the projecting direction X. Here, coordinates of evaluation positions Pe1, Pe3 of other divided regions B11, B13 are also specified using the following formulae 1 and 3.

$$x1 = L1 \times \cos\theta1, \ y1 = L1 \times \sin\theta1 \quad \text{(formula 1)}$$

$$x2 = L2 \times \cos\theta2, \ y2 = L2 \times \sin\theta2 \quad \text{(formula 2)}$$

$$x3 = L3 \times \cos\theta3, \ y3 = L3 \times \sin\theta3 \quad \text{(formula 3)}$$

Two evaluation positions are selected from three evaluation positions Pc1, Pc2, Pc3 specified in the above-described manner, and it is determined whether or not remaining one evaluation position is positioned on a straight line formed by joining two selected evaluation positions. Due to such a method, it is determined whether or not three evaluation positions Pe are positioned on the same straight line. For example, as shown in FIG. 5B, when an obstacle W exists in the divided region B12, the evaluation position Pe2 of the divided region B12 is determined to be positioned frontward from a line segment obtained by joining other evaluation positions Pe1, Pe3 and hence, it is determined that three evaluation positions Pe1, Pe2, Pe3 are not positioned on one straight line.

Figure 6:
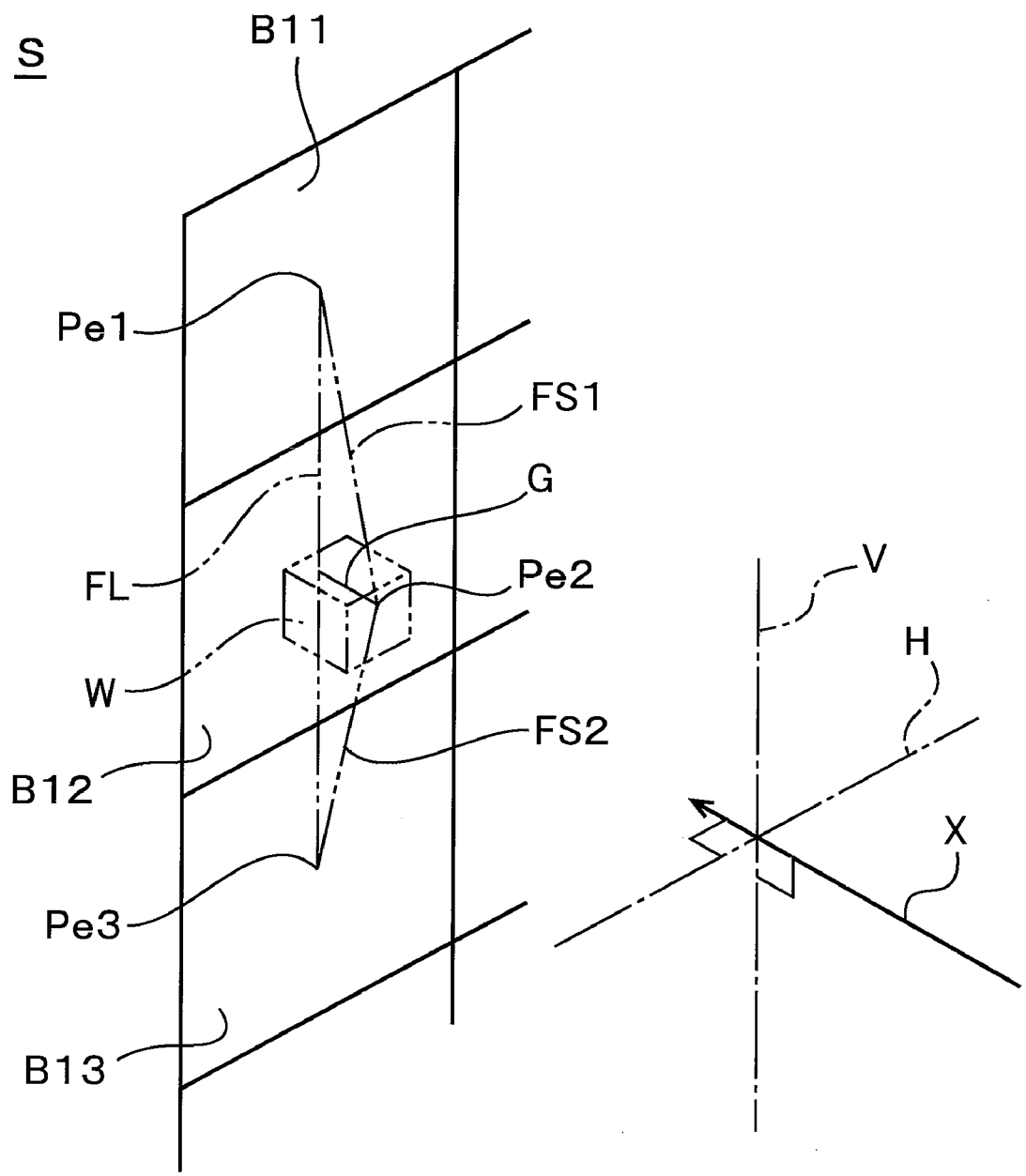
FIG. 6 is an explanatory view for explaining the processing of the obstacle detection part in the arithmetic processing part of the controller.
Figure 9A:
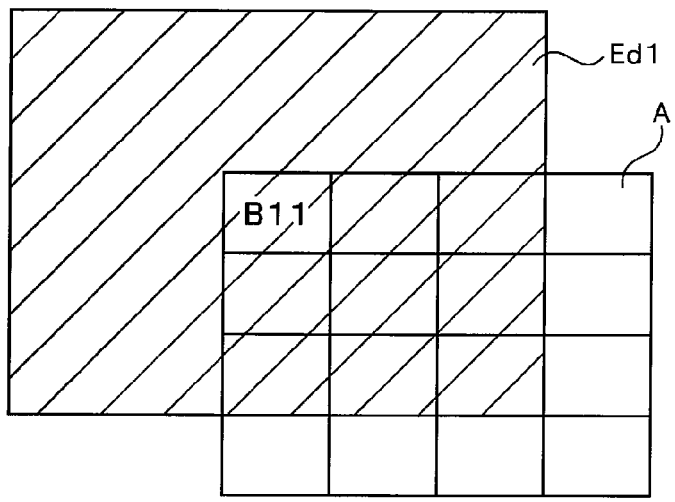
FIG. 9A to FIG. 9C are explanatory views for explaining processing of a projection region determination part.
Figure 9B:
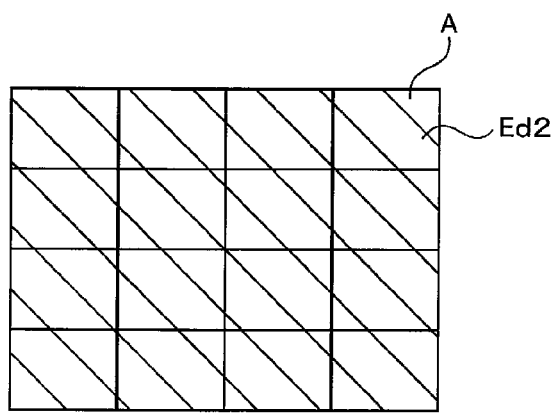
Figure 9C:
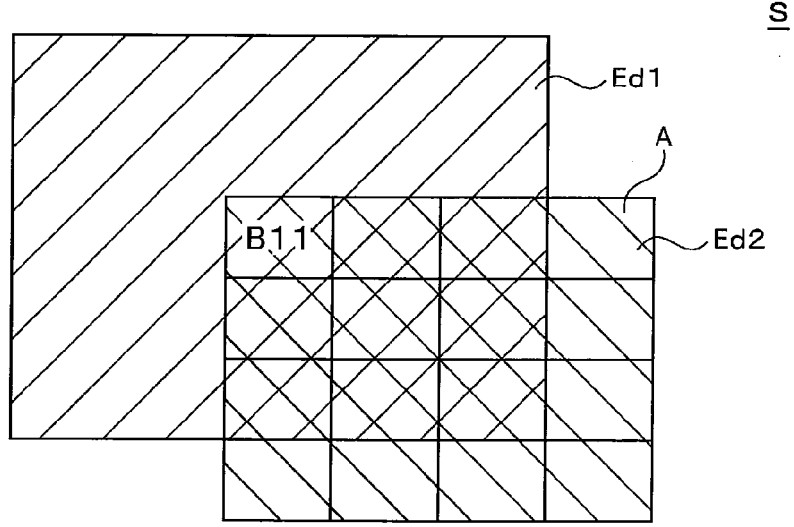

In the projector 10 of this embodiment, the determination whether or not three evaluation positions Pe1, Pe2, Pe3 are positioned on one straight line is made using the following method. As described in the flowchart shown in FIG. 14, first of all, extending directions of three line segments in total obtained by joining the selected two evaluation positions out of three evaluation positions Pe1, Pe2, Pe3 are obtained (S03-4-1). To be more specific, as shown in FIG. 6, a long line segment FL which is obtained by joining the evaluation positions Pe1, Pe3 positioned at both ends out of three evaluation positions Pe1, Pe2, Pe3 and two short line segments FS1, FS2 which are obtained by joining the evaluation position Pe2 positioned at the center and the respective remaining evaluation positions Pe1 and Pe3 are specified thus obtaining the position and the extending directions of the respective line segments FL, FS1, FS2. Next, the relationships among the extending directions of the respective line segments FL, FS1, FS2 and the projecting direction X of the projection light L are determined (S03-4-2, 4, 6, 7). When three divided regions B arranged vertically are selected as in the case of the example of this embodiment, it is determined whether or not the extending directions of the respective line segments EL, FS1, FS2 are parallel to a first reference line V orthogonal to the projecting direction X. When three divided regions arranged laterally are selected, it is determined whether or not the extending directions of the respective line segments FL, FS1, FS2 are parallel to a second reference line H orthogonal to the projecting direction X. Here, a state in which a first reference line orthogonal to the projecting direction X is used as the first reference line V, and a second reference line orthogonal to the projecting direction X is used as the second reference line H is shown. However, the reference line may not always be necessary to be vertical or horizontal.

When all the line segments EL, FS1, FS2 are parallel to the first reference line V (S03-4-2) as a result of the determination, a detection result that three evaluation positions Pc1, Pc2, Pc3 are positioned on one straight line (one plane) is obtained. When there exists no obstacle or unevenness in the selected divided region B, such a result is obtained. When the detection result is obtained, a spaced-apart distance G (see FIG. 6) from the respective three evaluation positions Pe1, Pe2, Pe3 to a line segment parallel to the first reference line V is obtained and stored in the obstacle information memory part 45. However, when all the line segments are parallel to the first reference line V, the spaced-apart distance G from the respective evaluation positions Pe1, Pe2, Pe3 to the line segment parallel to the first reference line V is obtained as 0 (S03-4-3) and this information is stored in the obstacle information memory part 45.

Further, when the long line segment FL and one short line segment FS1 (FS2) are parallel to the first reference line V while the other short line segment FS2 (FS1) is not parallel to the first reference line V (S03-4-4), a determination result that three evaluation positions Pe1, Pe2, Pe3 are not positioned on one straight line is obtained. For example, as shown in FIG. 6, when an obstacle W exists in the divided region B12 positioned at the center, such a result is obtained. In this case, the spaced-apart distance G is 0 with respect to the evaluation positions Pe1, Pe3. Then, the spaced-apart distance G from the evaluation position Pe2 positioned at the center to the line segment FL parallel to the first reference line V is obtained (S03-4-5) and the spaced-apart distance G is stored in the obstacle information memory part 45.

Further, when the long line segment FL is parallel to the first-reference line V while the two short line segments FS1, FS2 are not parallel to the first reference line V (S03-4-6), a detection result that three evaluation positions Pe1, Pe2, Pe3 are not positioned on one straight line is obtained. When an obstacle W exists in the divided region B12 positioned at the center, such a result is obtained (see FIG. 6). In this case, the spaced-apart distance G is 0 with respect to the evaluation positions Pe1, Pe3. Here, the spaced-apart distance G from the evaluation position Pe2 at the center to the line segment FL parallel to the first reference line V is obtained (S03-4-5) and is stored in the obstacle information memory part 45. However, when one short line segment is not parallel to the first reference line V, usually, the other short line segment is also not parallel to the first reference line V. Accordingly, the determination is made with respect to either one of the case in which one short line segment is not parallel to the first reference line V and the case in which both short line segments are not parallel to the first reference line V without distinguishing one case from another.

Further, when one short line segment FS1 (FS2) is parallel to the first reference line V while the other short line segment FS2 (FS1) and the long line segment FL are not parallel to the first reference line V (S03-4-7), a determination result that three evaluation positions Pe1, Pe2, Pe3 are not positioned on one straight line is obtained. For example, when an obstacle or the unevenness exists in the divided region B13 and the short line segment FS2 is not parallel to the first reference line V, such a result is obtained. In this case, the spaced-apart distance G is 0 with respect to the evaluation positions Pc1, Pc2. Then, the spaced-apart distance G from the evaluation position Pe3 to the line segment FS1 parallel to the first reference line V is obtained (S03-4-8) and is stored in the obstacle information memory part 45.

Further, when none of line segments FL, FS1, FS2 is parallel to the first reference line V, a determination result that three evaluation positions Pe1, Pe2, Pe3 are not positioned on one straight line is obtained. For example, when there exists an obstacle or the unevenness which strides over all the divided regions B11, B12, B13, such a detection result is obtained. In this case, a detection result that the spaced-apart distance G between the first reference line V and the parallel line segment is not measurable with respect to all evaluation positions Pe1, Pe2, Pe3, (S03-4-9) is required, and information that the spaced-apart distance G is not measurable with respect to all evaluation positions Pe1, Pe2, Pe3 is stored in the obstacle information memory part 45.

Here, in determining whether or not three evaluation positions Pe are positioned on one straight line, error is taken into consideration when necessary. As a determination method which takes the error into consideration, various methods are considered. For example, it may be possible to adopt a method which establishes, in determining whether or not the respective line segments FL, FS1, FS2 are parallel to a reference line such as the first reference line V, an allowable range in the determination criteria. To explain the method specifically, even when angles made between the respective line segments FL, FS1, FS2 and the reference line are not accurately 0°, it is determined that the respective line segments FL, FS1, FS2 are parallel to the reference line provided that the angle assumes a value which falls within ±15°.

The aptitude value arithmetic part 24 detects aptitude values R of the respective divided regions B based on the stored data in the evaluation distance memory part 44 and the obstacle information memory part 45. In the evaluation distance memory part 44, distances (evaluation distances) Le from the projection lens 14 to the respective evaluation positions Pe are stored. In the obstacle information memory part 45, the spaced-apart distances G between the reference line V, H (see FIG. 6) and the parallel line segments are stored with respect to the evaluation positions Pe of the respective divided regions B. When the spaced-apart distance G cannot be measured, information that the spaced-apart distance G is not measurable is stored.

Further, the aptitude value arithmetic operation part 24 uses, in obtaining the aptitude value R, an evaluation distance table T1 and a spaced-apart distance table T2 stored in the basic information memory part 49 in the memory 20b. The evaluation distance table T1 is a table shown in FIG. 7A for converting the evaluation distances Le obtained with respect to the respective divided regions B into numerical values R1 for the aptitude value arithmetic operation. Here, in the table T1, "slightly spaced-apart" implies that the projecting distance is half of or more than half of a specified projecting distance and less than the specified projecting distance, and "largely spaced-apart" implies that the projecting distance is the specified projecting distance or more. The spaced-apart distance table T2 is a table shown in FIG. 7B for converting the spaced-apart distances G stored in the obstacle information memory part 45 into numerical values R2 for the aptitude value R arithmetic operation. Here, in the table T2, "slightly spaced-apart" implies that the spaced-apart distances G is 5 mm or more and less than 20 mm, and "largely spaced-apart" implies that the spaced-apart distances G is 20 mm or more.

Figure 15:
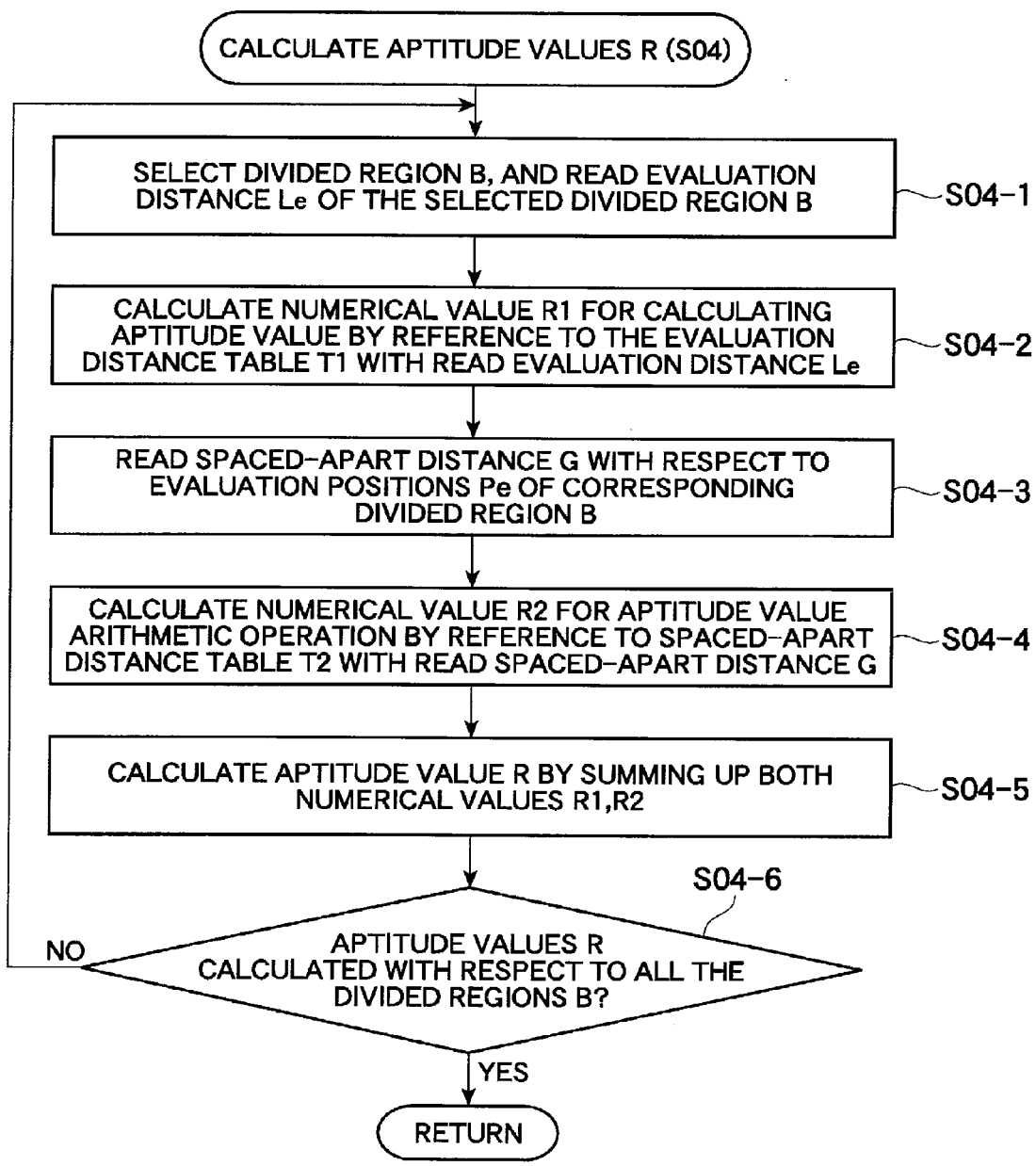
FIG. 15 is a flowchart showing processing of an aptitude value arithmetic operation part.

As described in a flowchart shown in FIG. 15, first of all, the aptitude value arithmetic operation part 24 selects a divided region B for which the aptitude value is calculated, and an evaluation value Le of the selected divided region B is read from the evaluation distance memory part 44 (S04-1). Then, the numerical value R1 for calculating the aptitude value is obtained by reference to the evaluation distance table T1 shown in FIG. 7A with the read evaluation distance Le (S04-2). For example, when the evaluation distance Le is the specified projecting distance or more, the numerical value R1 is 2 points. Next, from the obstacle information memory part 45, the spaced-apart distance G with respect to the evaluation position Pe of the corresponding divided region B is read (S04-3). Then, a numerical value R2 for the aptitude value arithmetic operation is obtained by reference to the spaced-apart distance table T2 shown in FIG. 7B with the read spaced-apart distance G (S04-4). For example, when the spaced-apart distance G is 10 mm, the numerical value R2 is 3 points. Then, the aptitude value R is obtained by summing up both numerical values R1, R2 (S04-5). In this example, the aptitude value R becomes 5 points. Then, the obtained aptitude value R is stored as the aptitude value of the corresponding divided region B in the aptitude value memory part 46. The above-mentioned operation is performed with respect to all the divided regions B (S04-6). Here, FIG. 8 shows a specific example in which the aptitude values R obtained with respect to all the divided regions B are described at the positions of the respective divided regions B.

The candidate region determining part 25 determines the projection candidate region C out of all the divided regions B based on the aptitude value R stored in the aptitude value memory part 46. In this determination, a reference aptitude value Rc which becomes a criterion for determining whether or not the divided region B is suitable as a projection candidate region C is used. The reference aptitude value Rc is stored in the basic information memory part 49 of the memory 20b. Here, the reference aptitude value Rc in this embodiment is 5 points.

The candidate region determining part 25, first of all, reads the reference aptitude value Rc from the basic information memory part. Next, the candidate region determining part 25 selects one divided region B and reads the aptitude value R of the selected divided region B from the aptitude value memory part 46. Then, the candidate region determining part 25 determines whether or not the read aptitude value R is equal to or more than the reference aptitude value R and, when it is determined that the aptitude value Rc is equal to or more than the reference aptitude value Rc, the divided region B subjected to the determination is determined as a projection candidate region C and the information on the determination is stored in the candidate region memory part 47. On the other hand, when the aptitude value R is less than the reference aptitude value Rc, information that the divided region B subjected to the determination is not the projection candidate region C is stored in the candidate region memory part 47. Such processing is performed with respect to all the divided regions B, and 0 or more projection candidate regions C are determined. For example, in the case shown in FIG. 8, the candidate region memory part 47 stores information that a plurality of divided regions (divided regions having 5 points) B in which a point (numerical value of the reference aptitude value Rc) is surrounded by a circle are determined as the projection candidate regions C.

When the candidate region determining part 25 determines that there is no projection candidate region C (the number of projection candidate regions C being 0) as the result of reference to the reference aptitude value Rc, in this embodiment, all the divided regions B are determined as the projection candidate regions C. When there is no projection candidate region C, it may be possible to execute processing which projects no image. However, when such processing is executed, a viewer cannot observe the image at all. Accordingly, in such a case, one or more arbitrary or suitable divided regions B may be selected as the projection regions D. In this embodiment, eventually, the whole projection area A is selected as the projection region D. By adopting such processing, the image is displayed on the whole projection area A and hence, the viewer can observe the image.

The projection region determining part 26 is provided for selecting the projection region D for actually displaying the image out of the projection candidate regions C. Here, even when the image to be actually displayed is displayed in a zooming manner, an aspect ratio of the actually displayed area is equal to an aspect ratio of a shape of the projection area A which is a maximum range in which the image can be displayed. Here, although various selecting methods of the projection region D are considered, in this embodiment, as will be explained next, when a maximum similar figure which falls within a region constituted of the projection candidate region C out of similar figures similar to the shape of the projection area A overlaps with the area constituted of the projection candidate region C, the projection candidate region C which overlaps with the maximum similar figure is selected as the above-mentioned projection region D. Here, the shape of the projection area A is stored in the basic information memory part 49 of the memory 20b as a shape of projection range of the projection light L.

Figure 16:
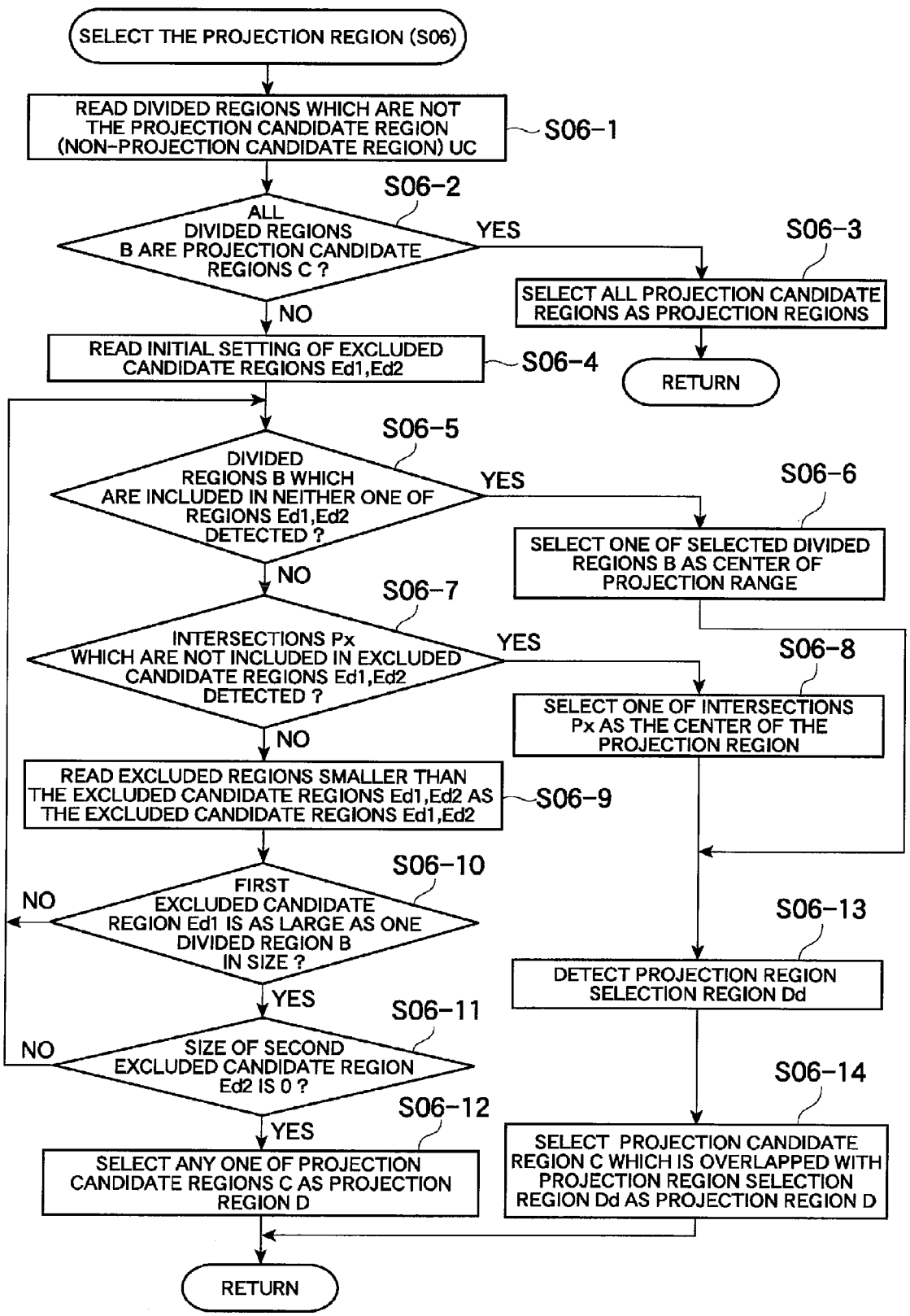
FIG. 16 is a flowchart showing processing of a projection region determination part.

As described in a flowchart shown in FIG. 16, the projection region determining part 26, first of all, reads whether or not the divided regions which are not the projection candidate region C (herein after referred to as non-projection candidate region) UC exist from the candidate region memory part 47 (S06-1). Here, when all the divided regions B are the projection candidate regions C (S06-2), all the projection candidate regions C are selected as the projection regions D (S06-3). On the other hand, when the non-projection candidate regions UC exist, the projection candidate region C which constitutes the center of a range in which the image is displayed is detected in the following manner. This processing is explained in conjunction with FIG. 9A to FIG. 9C and FIG. 10A to FIG. 10C.

Figure 10A:
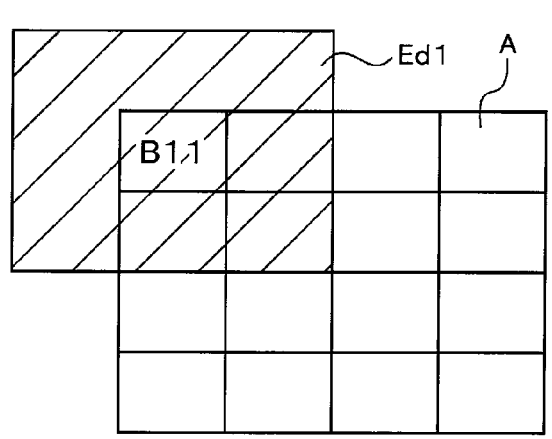
FIG. 10A to FIG. 10C are explanatory views for explaining the processing of the projection region determination part.

First of all, with respect to all the non-projection candidate regions UC, a first excluded region E1 shown in FIG. 10A whose center is placed in each non-projection candidate region UC is obtained. For this end, first of all, initial setting of the first excluded candidate region Ed1 is read from the basic information memory part 49 (S06-4). The shape of the first excluded candidate region Ed1 is similar to the shape of the projection area A and the size of the first excluded candidate region Ed1 is, even when the divided region B positioned in an outermost periphery of the projection area A is the non-projection candidate region UC, set to a size which allows the first excluded candidate region Ed1 to cover the center of the projection area A. In this embodiment, the first excluded candidate region Ed1 is indicated by hatching in FIG. 9A and agrees with a range of the divided regions B corresponding to two layers surrounding the divided region B11.

Further, along with the obtainment of the first excluded region Ed1, a second excluded region Ed2 having a frame shape shown in FIG. 11B extending toward the inside of the projection area A from an outer periphery of the projection area A by a predetermined thickness is obtained. For this end, first of all, initial setting of the second excluded candidate region Ed2 is read from the basic information memory part 49 (S06-4). A size of the second excluded candidate region Ed2 in initial setting is, in this embodiment, set to a size indicated by hatching in FIG. 9B. Although the size of the second excluded candidate region Ed2 agrees with a range of the divided regions B corresponding to two layers on a peripheral side of the projection area A, the size of the second excluded candidate region Ed2 is a size which allows the second excluded candidate region Ed2 to cover the whole range of the projection area A.

Next, by overlapping both of the excluded candidate regions Ed1, Ed2 to the projection area A, the projection candidate regions C which are included in neither one of regions Ed1, Ed2 are detected (S06-5). When such projection candidate regions C exist, one of the projection candidate regions is selected as the center of the projection range (S06-6). In the example explained above, as shown in FIG. 9C, the whole divided regions B are included in either one of regions Ed1, Ed2 and hence, the projection candidate region C which is included in neither one of regions Ed1, Ed2 does not exist.

In this case, subsequently, with respect to intersections Px of dividing lines of the divided regions B, the intersection PX which becomes the center of a range for displaying the image is detected. To explain more specifically, out of intersections Px, the intersections Px which are not included in the excluded candidate regions Ed1, Ed2 are detected (S06-7). When such intersections Px exist, one of the intersections Px is selected as the center of the projection region D (S06-8). However, in the example explained above, such an intersection Px does not also exist.

When neither the projection candidate region C which becomes the center of the projection range nor the intersection Px which becomes the center of the projection region D is detected, excluded regions smaller than the excluded candidate regions Ed1, Ed2 used in this processing by one step are prepared and are read as the excluded candidate regions Ed1, Ed2 (S06-9). Then, when the first excluded candidate region Ed1 is not as large as the one divided region B in size (S06-10) or when the size of the second excluded candidate region Ed2 is not 0 although the first excluded candidate region Ed1 is as large as one divided region B (S06-11), processing as same as the above-mentioned processing is performed using the newly-read excluded candidate regions Ed1, Ed2 thus detecting either one of the projection candidate region C and the intersection Px which constitutes the center of the projection region D. Such processing is repeated until the projection candidate region C or the intersection Px which becomes the center of the projection region D can be detected (S06-5, 7, 9 to 11).

Figure 10B:
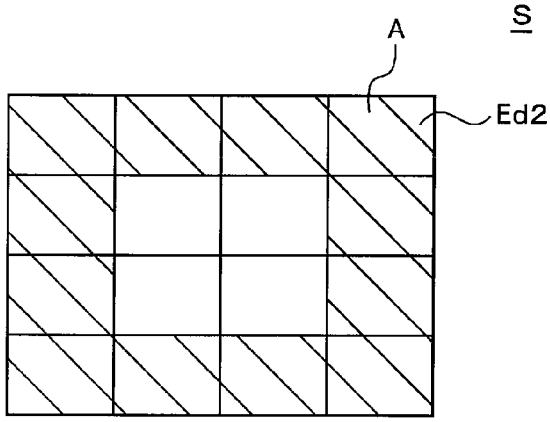

In the example explained above, the region indicated by hatching shown in FIG. 10A is prepared as the first excluded candidate region Ed1 smaller than the projection area A by one stage. This region falls within a range of the divided regions B corresponding to one layer surrounding the divided region B11. Here, although a shrinking rate of the first excluded candidate region Ed1 can be appropriately selected, the newly provided first excluded candidate region Ed1 is set similar to the shape of the projection area A. Further, a region indicated by hatching shown in FIG. 10B is prepared as the second excluded candidate region Ed2 having a size smaller than the projection range A by one stage. The region falls within a range of the divided region B corresponding to one layer on the outer peripheral side of the projection area A. Although a shrinking rate of the second excluded candidate region Ed2 region can be suitably selected, the prepared second excluded candidate region Ed2 is set such that a shape of the second excluded candidate region Ed2 becomes similar to a shape of the projection area A.

In this manner, when necessary, the excluded candidate regions Ed1, Ed2 whose sizes are gradually decreased are provided. When a range of the first excluded candidate region Ed1 becomes equal to a range of the divided regions B which are not the projection candidate regions C, that is, becomes equal to a range of non-projection candidate region UC (S06-10) and a range of the second excluded candidate region Ed2 becomes 0 (S06-11) before the projection candidate region C or the intersection Px which constitutes the center is detected, any one of the projection candidate regions C is selected as the projection region D (S06-12).

Figure 10C:
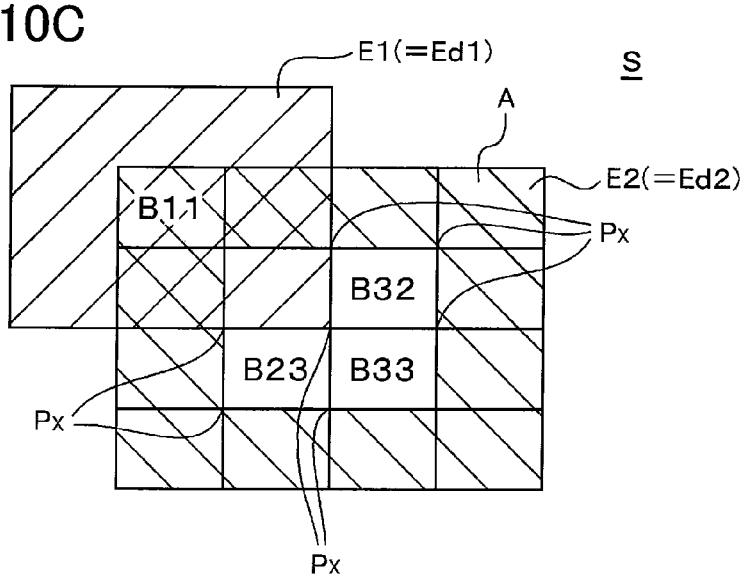

As shown in FIG. 10C, when excluded candidate region Ed1, Ed2 which is smaller by one step is overlapped with the projection area A, since three divided regions B23, B32, B33 are present as the projection candidate regions C which are included in neither excluded candidate region Ed1 nor Ed2 (S06-5), one out of three divided regions is selected as the center of the projection range (S06-6). In this example, the divided region B33 is selected. Here, the intersections Px which are included in neither excluded candidate region Ed1 nor Ed2 are, for example, intersections Px shown in FIG. 10C. In the example explained here, the projection candidate region C which constitutes the center of the projection range is detected in advance and hence, the processing for detecting the intersection Px is not executed.

Figure 11:
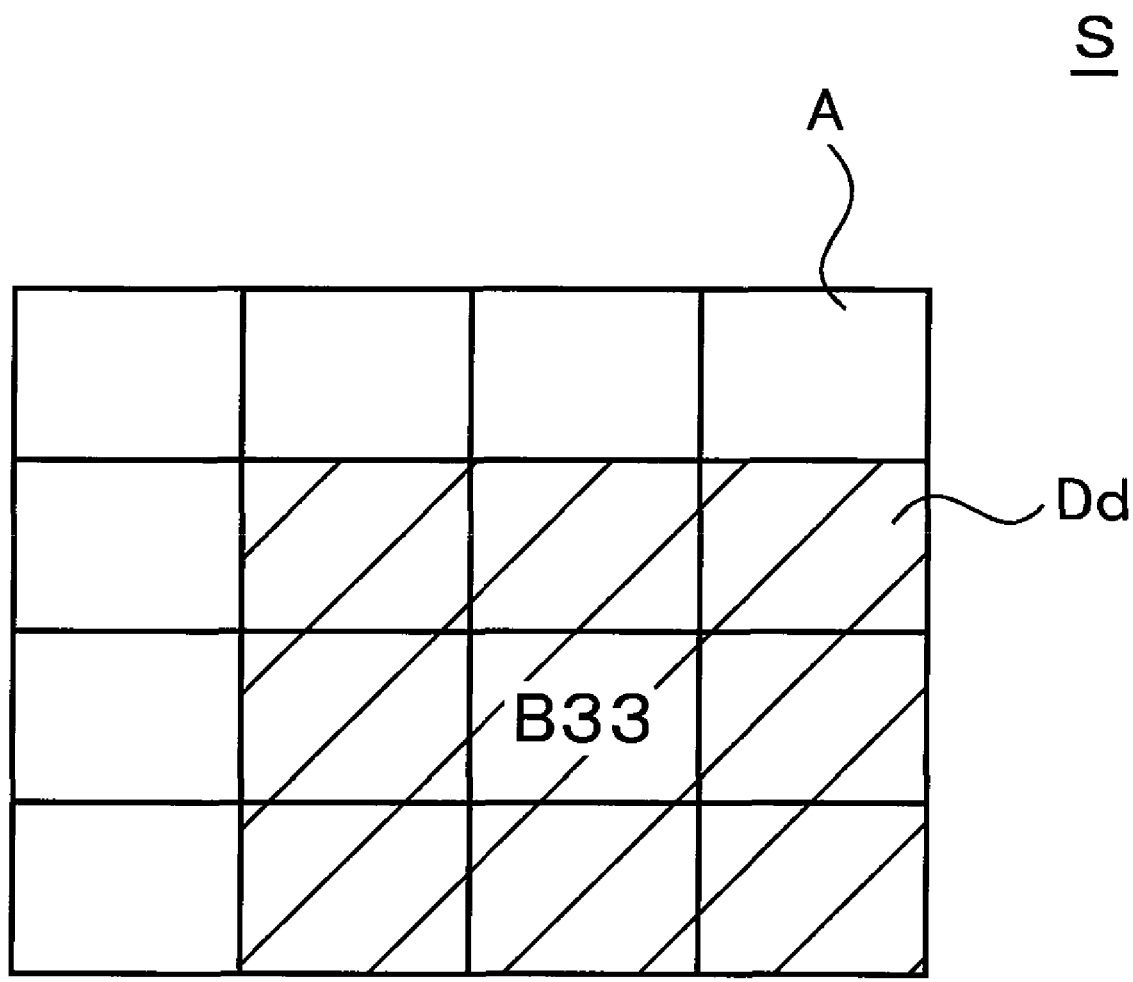
FIG. 11 is an explanatory view for explaining the processing of the projection region determination part.

Next, under conditions that the selected divided region B33 is positioned at the center, has a shape similar to the shape of the projection area A and is not overlapped with the non-projection candidate region UC, a projection region selection region Dd having a maximum size is detected (S06-13). In the example explained here, the projection region selection region Dd can be determined depending on the number of layers that the divided regions B surrounding the divided region B11 can increase. Then, the region indicated by hatching in FIG. 11 is detected as the projection region selection region Dd.

Here, the projection candidate region C which is overlapped with the projection region selection region Dd is selected as the projection region D (S06-14), and the selected divided region B is stored in the projection region memory part 48 as the projection region D. In the example shown in FIG. 11, nine divided regions B22, B23, B24, B32, B33, B34, B42, B43, B44 are stored in the projection region memory part 48 as the projection region D. In this manner, in the projector 10 of this embodiment, it is considered that the candidate region determination part 25 and the projection region determination part 26 as a whole correspond to a region selection unit.

Here, even when the intersection Px is detected as the center of the projection range instead of the projection candidate region C, the projection region D is selected in accordance with similar steps. In this case, in step corresponding to step "S06-13" in the flowchart shown in FIG. 16, one intersection Px is selected out of the detected intersections Px, and the number of layers that the divided regions B surrounding the selected intersection Px can increase is calculated and the projection region selection region Dd is detected based on the calculation. Here, in step corresponding to step "S06-14", the projection candidate region C overlapped with the projection region selection region Dd is selected as the projection region D and the selection is stored in the projection region memory part 48. Here, since the basic flowchart of the above-mentioned processing is similar to the flowchart of the processing shown in FIG. 16, the explanation thereof is omitted.

The image processing part 27 is, to allow an image to be displayed in a projection range formed of the selected projection region D, constituted of an image size control part 27a for obtaining an enlargement/shrinkage ratio of an image, and a projecting direction control part 27b for obtaining the projecting direction X of the projection light L. Here, the image size control part 27b, for obtaining the enlargement/shrinkage ratio and the projecting direction X, first of all, reads the divided region B selected as the projection region D from the projection region memory part 48.

The image size control part 27a obtains a size of the projection range constituted of the read projection region D. Here, the image size control part 27a obtains the enlargement ratio or the shrinkage ratio of the image to be projected by comparing the size of the obtained projection range and the size of the projection area A, and the obtained enlargement/shrinkage ratio is stored in the basic information memory part 49. The image size control part 27a performs image processing such that a pure black image is displayed within a range in the projection area A where an image is not projected. Due to such a constitution, it is possible to prevent an excess light from entering the image from peripheries thus making the displayed image more easily visible. In this embodiment, the enlargement ratio or the shrinkage ratio obtained here is used for controlling a zooming motor 15b of the zooming unit 15 of the projection lens part 13.

The projecting direction control part 27b obtains the center position of the projection range constituted of the read projection region D, and obtains the projecting direction X along which the image is projected on the obtained center position. The obtained projection direction X is used for controlling the light source control part 12b of the light source unit 12.

The focusing control part 28 is provided for controlling the focusing of the projection lens 14. The focusing control part 28 reads an evaluation distance Le of the divided region B positioned at the center or in the vicinity of the center of the projection region D from the evaluation distance memory part 44 and, at the same time, reads the enlargement/shrinkage ratio from the basic information memory part 49. Then, the focusing control part 28, based on these data, obtains a position of the projection lens 14 at which an image displayed on the screen S becomes sharp, and the obtained position of the projection lens 14 is stored in the basic information memory part 49. Here, the obtained position is used for controlling the focusing unit 16.

The light quantity control part 29 is provided for controlling a light quantity of the light source 12a. The light quantity control part 29, first of all, out of the projection region D, reads the evaluation distance Le of the divided region B which is closest to the center of the projection range where the image is actually displayed from the evaluation distance memory part 44. Then, the light quantity control part 29, based on the evaluation distance Le, obtains a light quantity which makes the image displayed on the screen S easily visible, and the obtained light quantity is stored in the basic information memory part 49. The obtained light quantity is used for controlling a light quantity of the light source 12a. Here, the light quantity may be also controlled by taking the enlargement/shrinkage ratio of the image stored in the basic information memory part 49 into consideration.

The manner of operation of the respective parts of the projector 10 when an image is projected on the screen S using such a projector 10 is explained in conjunction with the flowchart in FIG. 12.

When the power source switch of the projector 10 is turned on, firs to fall, the positions of the centers Bc of the respective divided regions B in the inside of the projection area A are measured using the respective distance sensors 19 of the sensor unit 18 shown in FIG. 1 or the like (S01).

Upon measurement of the positions of the centers Bc of the respective divided regions B, the evaluation positions Pe and the evaluation distances Le of the respective divided regions B are obtained by the evaluation position arithmetic operation part 22 of the controller 20 shown in FIG. 4 (S02). Here, the positions of the centers Bc (reflection point position) are measured by infrared rays Ir for distance detection radiated to the centers Bc of the respective divided regions Bc, and the evaluation positions Pe and the evaluation distances Le are obtained based on the measured positions. The evaluation positions Pe and the evaluation distances Le are converted into values which are expressed as the positions and the distances with respect to the projection lens 14.

After the evaluation positions Pe and the evaluation distances Le are obtained, as next step, the obstacle detecting part 23 detects an obstacle W or the unevenness present in each divided region B using the evaluation position Pe in each divided region B. To explain this detection processing schematically, it is determined whether or not three selected evaluation positions Pe are positioned on one straight line and, at the same time, the spaced-apart distances G from a line segment constituting the reference obtained at the time of determination to the respective evaluation positions Pe are obtained (S03). Steps for obtaining the spaced-apart distances G are explained in detail using a flowchart shown in FIG. 14 and hence, the detailed explanation of steps is omitted here.

After the spaced-apart distances G are obtained with respect to all evaluation positions Pe, the aptitude value arithmetic operation part 24 obtains aptitude values R of the respective divided regions B as the projection surfaces using the spaced-apart distance G and the evaluation distance Le (S04). The spaced-apart distances G are suitable as numerical values for determining whether or not the obstacle exist in the corresponding divided region B or whether or not the unevenness exists in the corresponding divided region B. Further, the evaluation distance Le is suitable as a value for determining whether the position of the screen S falls within a proper range for the projector 10 or not. Accordingly, using such numerical values, the aptitude value R of the corresponding divided region B as the projection surface can be adequately obtained. Here, the procedure for obtaining the aptitude value R is explained in detail using the flowchart shown in FIG. 15.

After the aptitude values of the respective divided regions B are obtained, as next step, the candidate region determination part 25 determines the projection candidate region C among the sixteen divided regions B using the aptitude values R (S05). To be more specific, the candidate region determination part 25 compares the aptitude values of the respective divided regions B with the reference aptitude value Rc and determines the divided region B whose aptitude value R is the reference aptitude value Rc or more as the projection candidate region C.

After the projection candidate region C is determined, the projection region determination part 26 selects the projection region D to actually display the image out of the divided regions B determined by the projection candidate region C (S06). The projection candidate region C is a portion of the projection area A which substantially posses aptitude as the projecting surface. However, it is not always limited that all the projection candidate regions C are included in the projecting range to display the image. In this regard, the projector 10 according to this embodiment automatically select the projection region D on which the image is actually projected out of the projection candidate region C and hence, the image can be displayed speedily and surely only in the area having no obstacles and no unevenness. Here, the procedure for selecting the projection region D is explained in detail using the flowchart shown in FIG. 16.

After the projection region D is selected, the image processing part 27 performs image processing so that the image to be displayed is displayed on a projection range constituted of the selected projection region D (S07). To be more specific, the image size control part 27a modifies the image to be displayed by enlargement or shrinkage and, the projection direction control part 27b determines the projection direction X of the image to be displayed so that the image can be displayed within the projection range. Due to such a method, the image having a suitable size can be surely displayed on the projection range constituted of the selected projection region D.

Figure 17A:
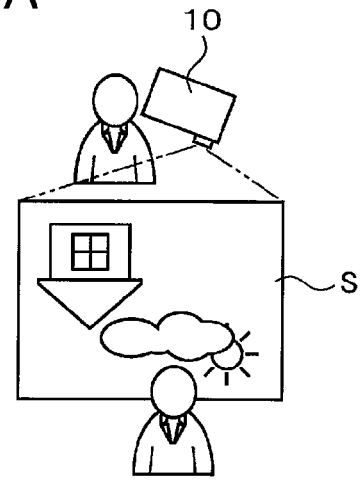
FIG. 17A to FIG. 17C are explanatory views for explaining specific display states.
Figure 17B:
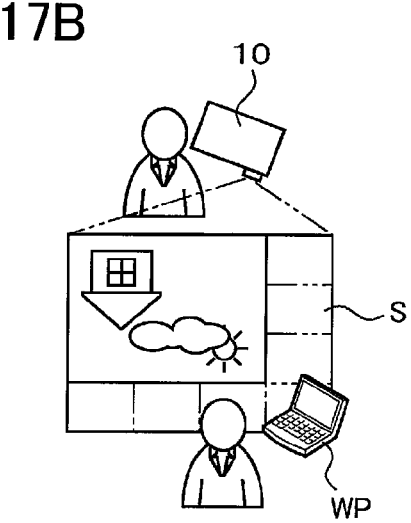
Figure 17C:
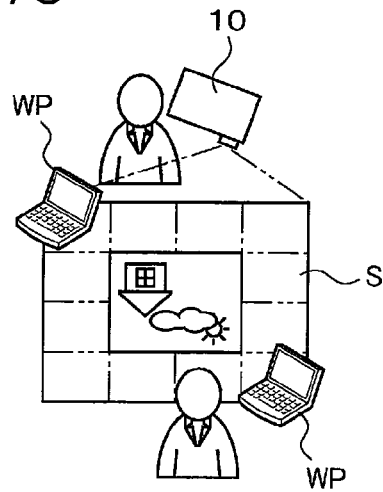

For example, as shown in FIG. 17B, when the image is projected from the projector 10 placed above the screen S which extends horizontally toward the screen S, a case in which a notebook computer WP is placed on the left upper corner of the projection area A is considered. Here, when the notebook computer WP is detected as an obstacle W in a divided region B11, the divided region B indicated by hatching in FIG. 11 is selected as the projection region D and hence, the image is displayed in a state shown in FIG. 17B. Here, when all divided regions B are selected as the projection regions D, as shown in FIG. 17A, the image is displayed on the whole projection area A. Further, when a plurality of obstacles W such as the notebook computers WP is present, as shown in FIG. 17C, the image is displayed on portions of the projection area A.

Then, the focus control part 28 adjusts focusing of the projection lens 14 so that a clear image is displayed on the screen S (S08). Further, the light quantity control part 29 adjusts a quantity of light from the light source 12a so that the image with brightness sufficient for easy viewing is displayed on the screen S (S09). By performing such a control, a clear image having proper brightness can be surely displayed on the projection range on the screen S.

As has been described above, according to the projector 10 of this embodiment, out of the projection area of the projector, a range suitable for a projection surface having no obstacle W or unevenness can be detected. Then, the projection light L is projected toward the range suitable for the projection surface so as to display the image on this projection range. When the image is displayed on a region having the obstacle W or unevenness, the image is displayed in a distorted state or a stepped portion is formed in the middle of the image and hence, there may be a case in which the image cannot be accurately viewed.

In this respect, according to the projector 10 of this embodiment, the image can be displayed in the range having no obstacle W or unevenness and suitable for the projection surface and hence, it is possible to prevent distortion or a stepped portion in the image thus enabling the display of the easily viewable image.

Here, in the projector 10 of this embodiment, infrared rays Ir are used as detection waves. However, the detection waves are not limited to the infrared rays Ir, and laser beams or ultrasonic waves may be used as the detection waves.

Further, in the projector 10 of the above-mentioned embodiment, the infrared rays Ir of the distance sensor 19 for detecting distance are radiated toward a position of the center Bc of each divided region B so as to obtain an evaluation position Pe of the corresponding divided region B. However, the evaluation position Pe may not be the position relating to the center Bc of the divided region B. For example, an evaluation position acquired with respect to an arbitrary position in the inside of the corresponding divided region B may be used as the evaluation position Pe. Here, in the above-mentioned embodiment, a position measuring place is only one place constituted of the center Bc for each divided region B, and the evaluation position Pe of the divided region B is obtained based on the portion. However, a method for obtaining the evaluation position Pe is not limited to such a method. For example, positions of a plurality of places in the divided region B may be measured and the evaluation position Pe of the corresponding divided region B may be obtained based on the measured positions of the plurality of places, or an average position of the plurality of measured positions may be used as the evaluation position.

Second Embodiment

Next, a projector of a second embodiment is explained.

In an explanation of a second embodiment, the constitution different from the constitution of the projector 10 of the above-mentioned embodiment is mainly explained, and with respect to the parts common with the parts in the constitution of the projector 10 of the above-mentioned embodiment is given the same symbol and the explanation thereof is omitted.

Figure 18:
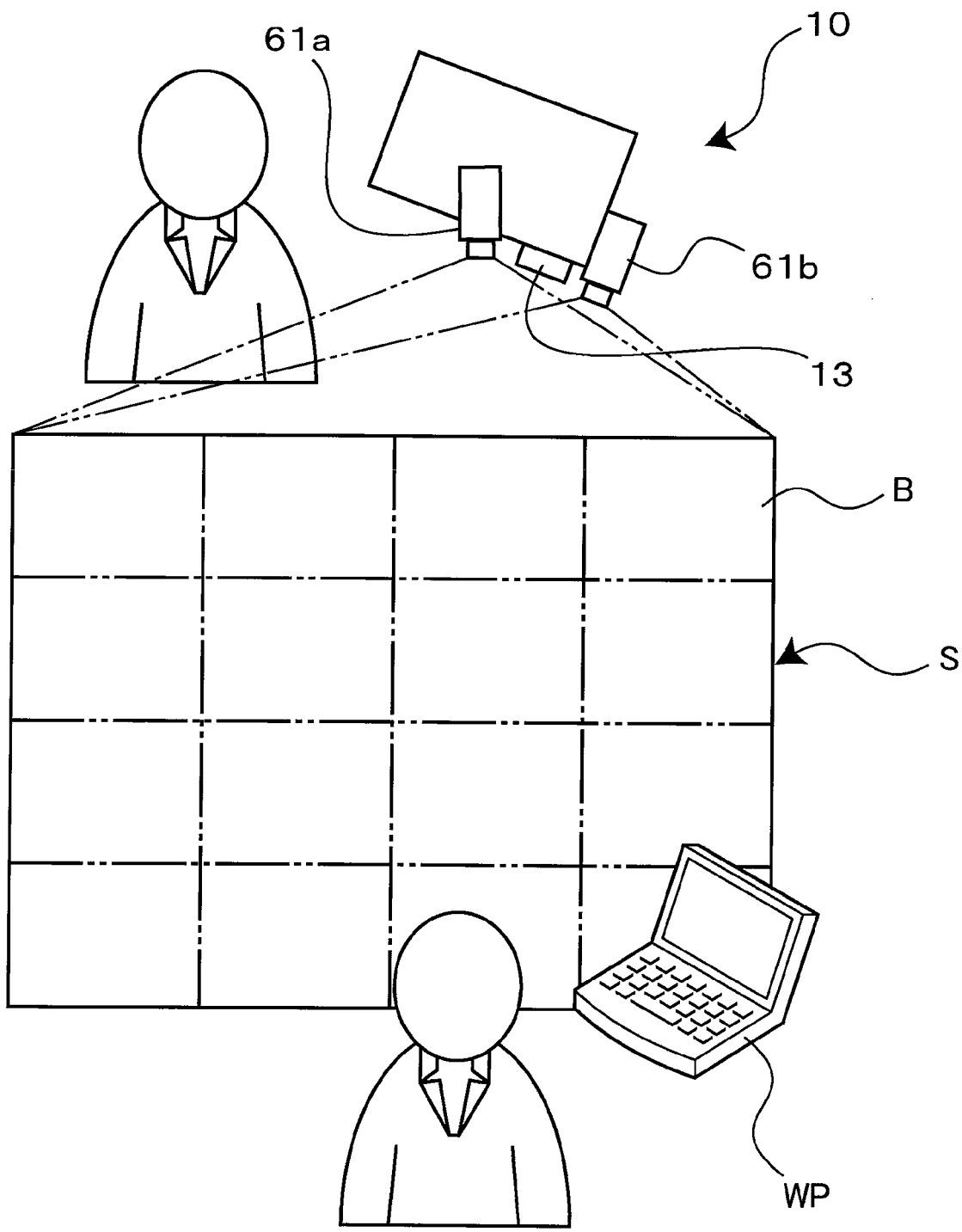
FIG. 18 is a plan view showing the schematic constitution of an image display device of a second embodiment.

As shown in FIG. 18, the projector 60 of the second embodiment includes an imaging unit 61 which includes CCD cameras 61a, 61b as means for measuring a distance from a projection area A to a divided region B. The second embodiment differs from the above-mentioned embodiment 1 with respect to this constitution. Here, the projector 60 of the second embodiment, as described later, includes a color detector 62 for detecting color of each divided region B in the projection area A and a color memory part 81 for storing data relating to the colors detected by the color detector 62. The second embodiment differs from the above-mentioned embodiment also with respect to this constitution (see FIG. 19).

Further, as described later, in this embodiment, color is taken into consideration when an aptitude value R is obtained with respect to the projection surface of each divided region B and hence, the projector 60 includes a color arithmetic operation part 71 for detecting the color of each divided region B. Here, this embodiment differs from the above-mentioned embodiment in a method for obtaining the aptitude value R and hence, a controller 70 includes an aptitude value arithmetic operation part 72 different from the aptitude value arithmetic operation part of the above-mentioned embodiment.

Figure 19:
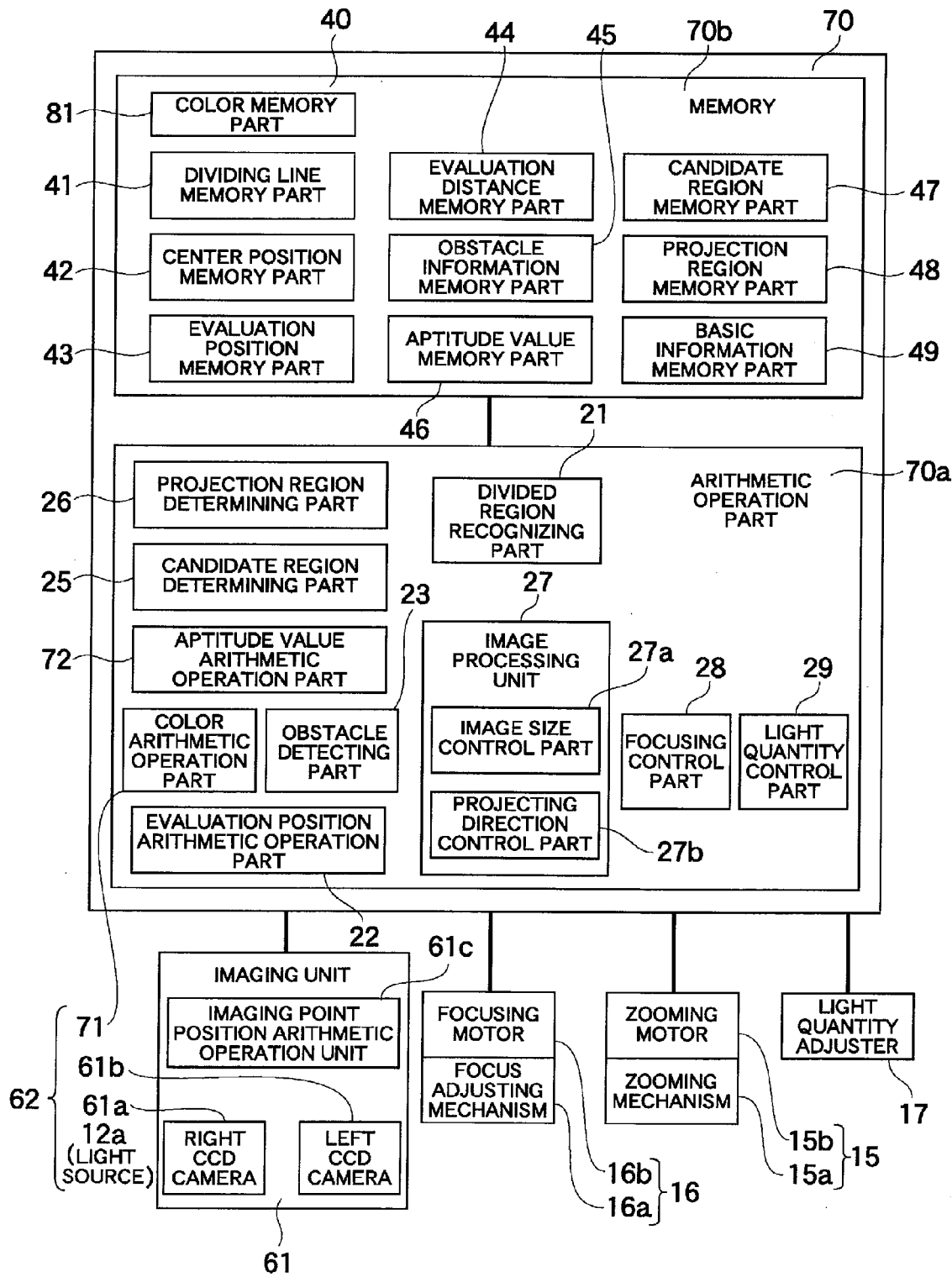
FIG. 19 is an explanatory view for explaining a function of a controller of the image display device shown in FIG. 18.

As shown in FIG. 18 and FIG. 19, the imaging unit 61 includes a right CCD camera 61a, left CCD camera 61b and an imaging point position arithmetic operation unit 61c for calculating a position with respect to a predetermined position in an imaging range or a distance.

The right CCD camera 61a and the left CCD camera 61b are arranged on both sides of the projection lens part 13. That is, the right CCD camera 61a and the left CCD camera 61b sandwich the projection lens part 13 there between. Here, the both CCD cameras 61a, 61b are directed in the direction in which an image of the whole projection area A on the projection surface can be picked up when the projection surface such as the screen S is arranged within a proper range of the projection distance of the projection 60. The proper range of the projection distance is usually preliminarily set for each projector based on an output of the light source of the projector or the like. Further, the images picked up by the both CCD cameras 61a, 61b are inputted to the imaging point position arithmetic operation unit 61c.

The imaging point position arithmetic operation unit 61c is provided for detecting the obstacle W or the unevenness in the inside of the projection area A using a detection method for detecting a distance based on a parallax image. This detecting method is, to schematically explain, a method for detecting a parallax between the parallax images based on a plurality of parallax images obtained by viewing an object to be picked up from different viewing points and detecting a depth such as unevenness of the object to be picked up based on the detected parallax, and a generally well-known method in an image processing field and an image recognition method. Accordingly, the detailed explanation of the method is omitted.

In the imaging unit 61, first of all, matching is performed using two inputted images as the parallax images so as to detect a parallax quantity between the parallax images. To explain specifically, for example, one specific point corresponding to the center Bc of each divided region B in the projection area A is obtained on the image picked up by the right CCD camera 61a, while another specific point corresponding to the one specific point is obtained on the image picked up by the left CCD camera 61b. In this manner, after the both specific points corresponding to each other are obtained, a movement distance, that is, a parallax quantity on the parallax image is obtained with respect to the position of the center Bc of each divided region B.

Then, based on the obtained parallax quantity, by making use of the principle of triangulation, the position of the center Bc of each divided region B is obtained and, at the same time, a distance between the center Bc of each divided region B (see FIG. 3A) and the right CCD camera 61a (and/or the left CCD camera 62a is obtained. The obtained position and distance are stored in a center position memory part 42 of a memory 70b described later by way of the controller 70.

The image pick-up unit 61 constitutes a portion of the color detector 62 for detecting color of each divided region B.

The color detector 62 is constituted of the light source 12a, the right CCD camera 61a for picking up the projection area A and the color arithmetic operation part 71 provided to the arithmetic operation part 70 in the projector 60.

The light source 12a is used as a unit for projecting white light toward the inside of the projection area A. Here, the right CCD camera 61a picks up each divided region B in a state that the white light is projected, and the picked-up image is inputted to the color arithmetic operation part 71. Here, as a CCD camera which constitutes the color detector 62, the left CCD camera 61b may be used, or the both CCD cameras 61a, 61b may be used.

Further, the color arithmetic operation part 71 obtains color of each divided region B based on a signal relating to the image outputted by the right CCD camera 61a. Color has three attributes consisting of luminosity, hue and chrominance, and the color arithmetic operation part 71 obtains the luminosity M and the hue N out of these three attributes.

Then, the luminosity M and the hue N obtained with respect to each divided region B are stored in the color memory part 81 of the memory 70b. Various kinds of cameras can be used as the CCD camera. However, in this embodiment, a camera which outputs RGB signals is used. Accordingly, the color arithmetic operation part 71 obtains the luminosity M and the hue N based on the outputted RGB signals. As a method for obtaining the luminosity M and the hue N, various well-known methods such as a method using an RGB lookup table, for example, or the like exist in a field of an image apparatus and hence, the explanation of the method is omitted here. Here, the luminosity M is specified with a numerical value between 100 (pure white) and C (pure black), and a degree of coloration of the hue N is specified with a numerical value between 100 (achromatic color) and 0 (any one of three primary colors). Here, the luminosity M and the hue N obtained with respect to each divided region B are stored in the color memory part 81 of the memory 70b.

Here, although this embodiment is configured such that the color arithmetic operation part 71 is provided to the controller 70, the present invention is not limited to such constitution. For example, when an image pick up unit such as a CCD camera which outputs a color (hue) signal and a brightness signal is used, the color arithmetic operation part 71 of the controller 70 may, simply, obtain hue based on intensity of the color signal and obtain luminosity based on intensity of the brightness signal.

The aptitude value arithmetic operation part 72 obtains an aptitude value R for each divided region B based on the spaced-apart distance G, luminosity M and hue N obtained with respect to the evaluation position Pe for each divided region B.

Figure 21:
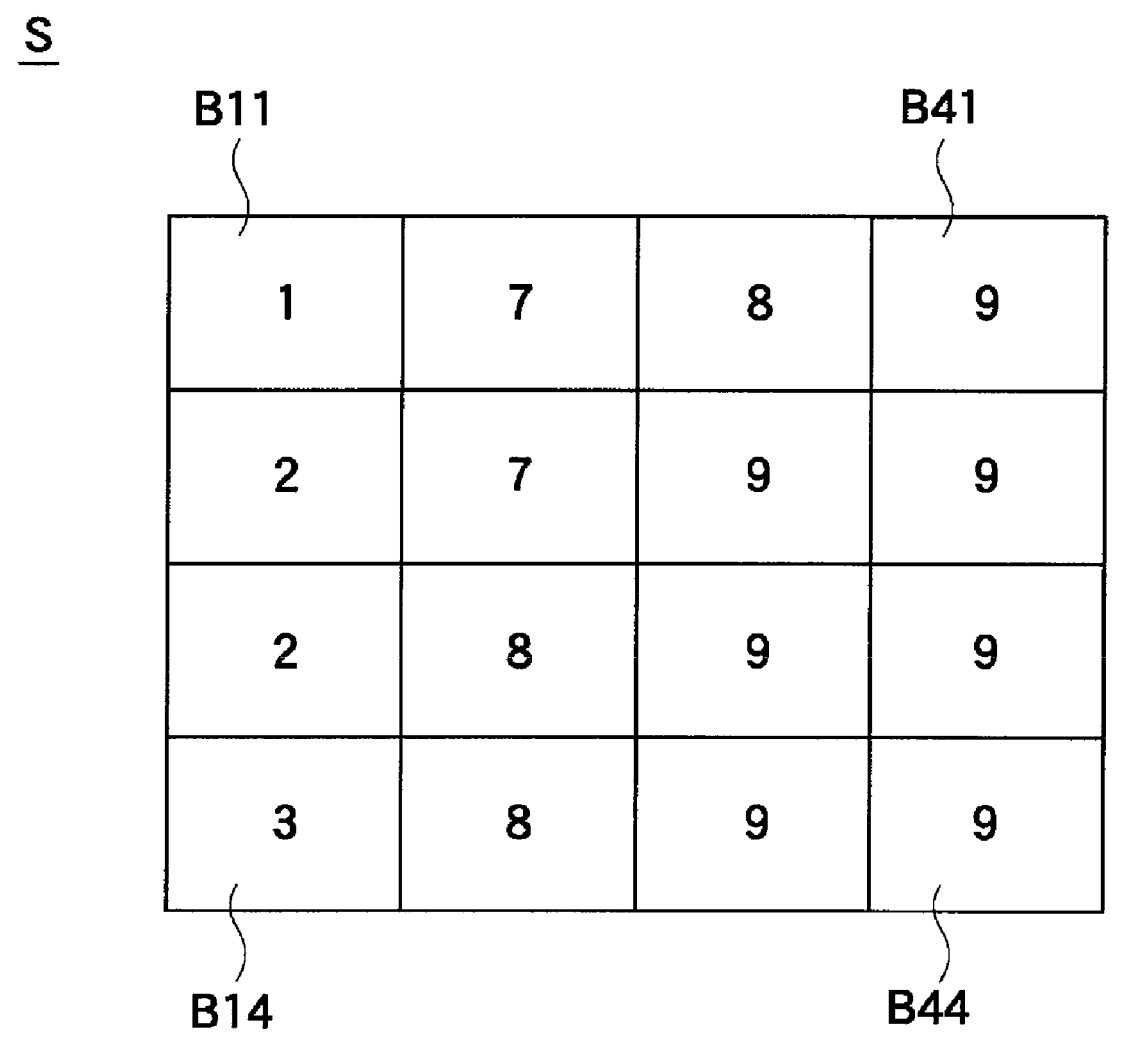
Figure 23:
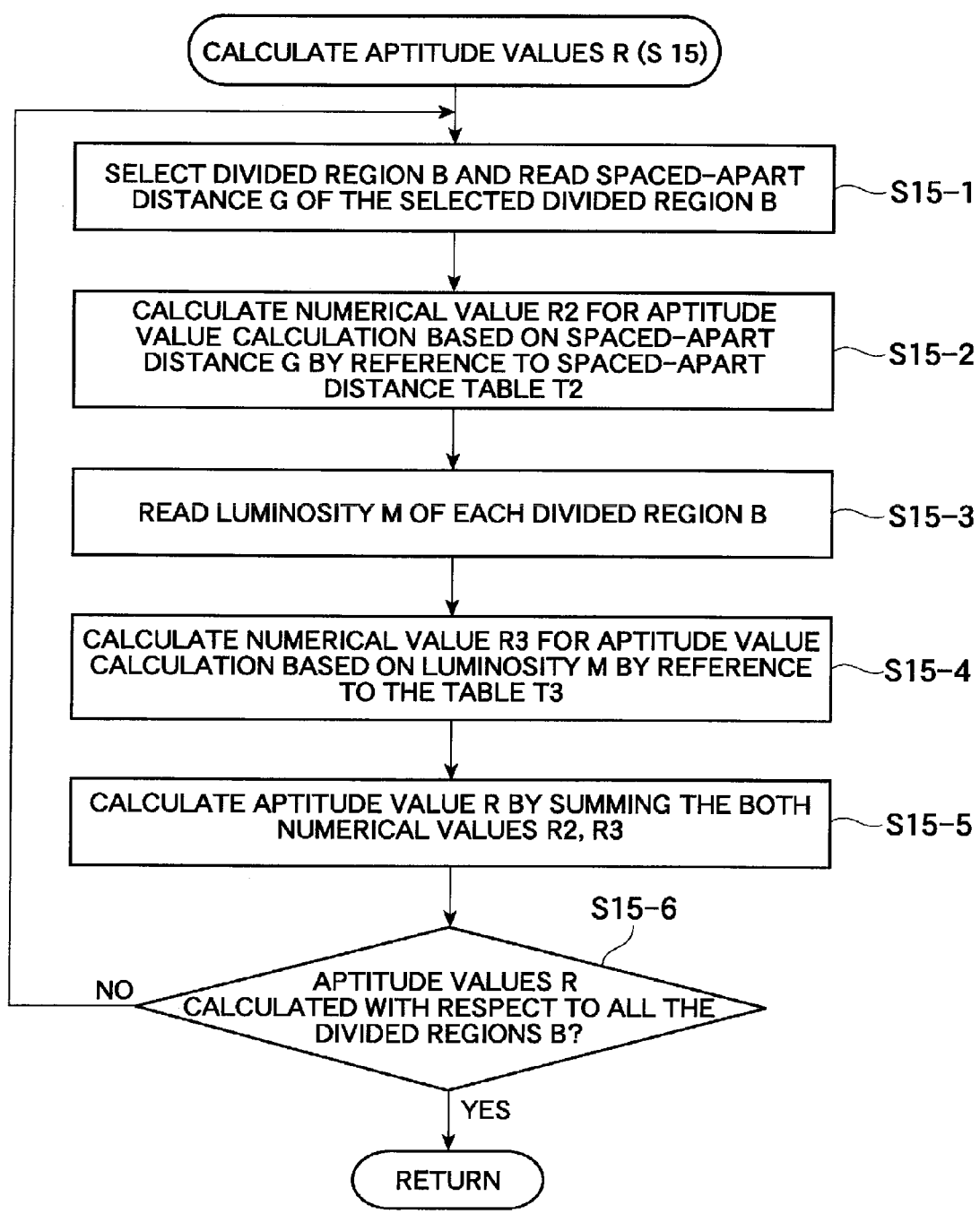
FIG. 23 is a flowchart showing processing of an aptitude value arithmetic operation part.

As described in a flowchart shown in FIG. 23, when the aptitude value R is obtained, the spaced-apart distance G of the corresponding divided region B is read from the obstacle information memory part 45 (S15-1). Then, spaced-apart distance table T2 (see FIG. 7B) is read from the basic information memory part 49, and a numerical value R2 for aptitude value calculation is obtained based on the read spaced-apart distance G by reference to a spaced-apart distance table T2 (S15-2). Further, the luminosity M and hue N of each divided region B are read from the color memory part 81 (S15-3). A color map table T3 shown in FIG. 20 is stored in the basic information memory part 49, and the aptitude value arithmetic operation part 72 reads the color map table T3. Then, numerical value R3 for aptitude value calculation is obtained based on a value obtained by multiplying numerical values of the obtained luminosity M and hue N and by dividing the value by 100 by reference to the table T3 (S15-4). Then, by summing the both numerical values R2, R3, the aptitude value R of the selected divided region B is obtained (S15-5). For example, when "largely remote" occurs on a white surface, R2 is 2 points and R3 is 5 points and hence, the aptitude value R becomes 7 points. Then, the obtained aptitude value R is stored in the aptitude value memory part 46. Such processing is performed with respect to all divided regions B (S15-6). Here, FIG. 21 shows a specific example of the aptitude values R obtained with respect to all divided regions B, wherein the aptitude values R are filled in the respective divided regions B.

Figure 22:
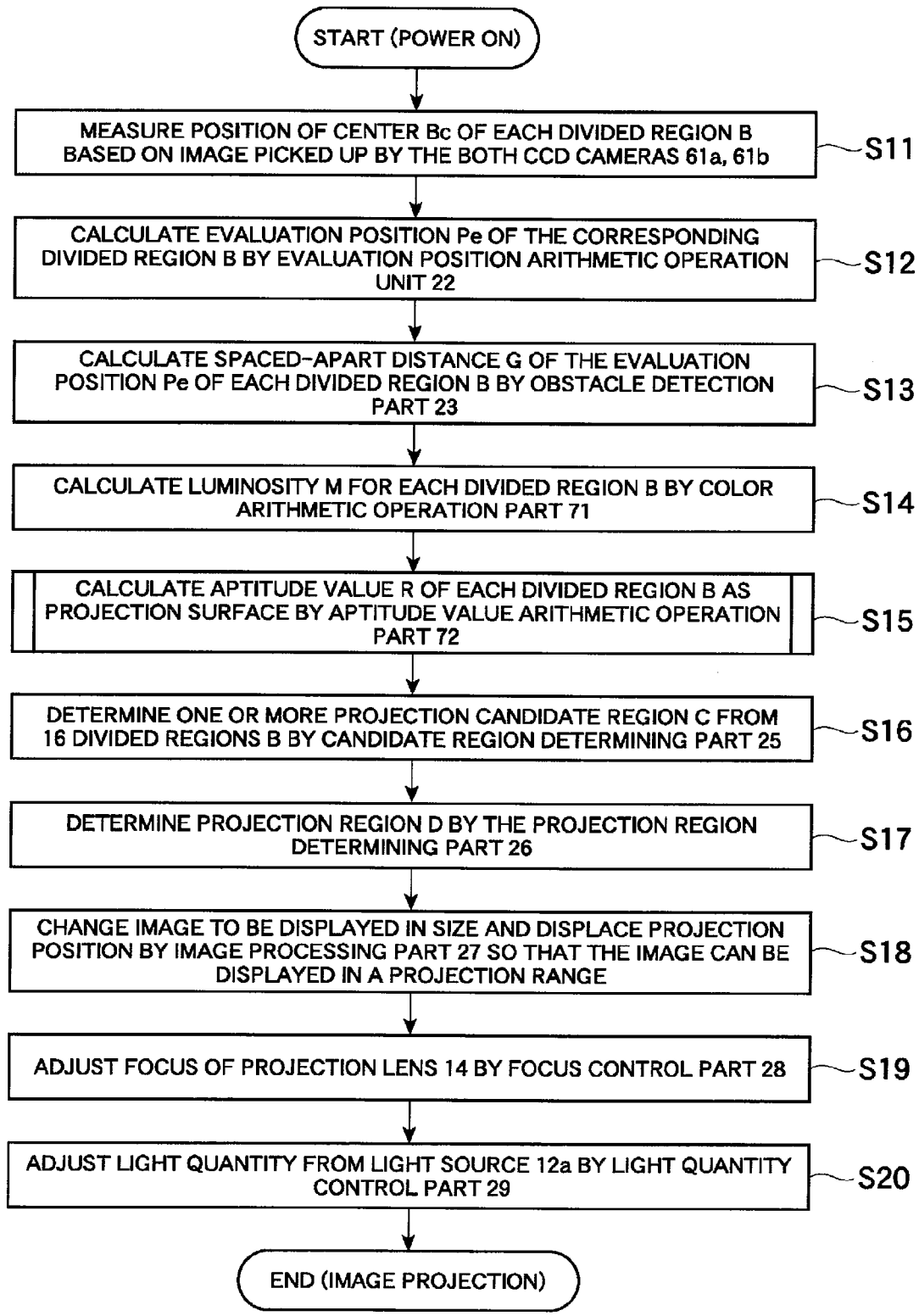
FIG. 22 is a flowchart showing the manner of operation of the image display device of the second embodiment.

Operations of respective parts in the projector 60 when the image is projected on the screen S in the projector 60 of the second embodiment having the different constitution from the constitution of the first embodiment is explained by reference to a flowchart shown in FIG. 22. Here, the explanation with respect to processing common with the constitution shown in FIG. 12 is omitted.

When the power switch of the projector 10 is turned on, the projection area A is picked up by the both CCD cameras 61a, 61b of the imaging unit 61, and the position of the center Bc of each divided region B is measured based on the picked-up image (S11). The measured position of the center Bc and a distance between the projector 10 and the position are stored in the center position memory part 42.

Next, the evaluation position arithmetic operation unit 22 of the controller 70 shown in FIG. 19 converts the position stored in the center position memory part 42 into a position expressed as a position with respect to the projection lens 14, and the position obtained by conversion is stored in the evaluation position memory part 43 as an evaluation position Pe of the corresponding divided region B (S12). Here, an evaluation distance Le may be obtained simultaneously and be stored in a suitable memory part.

After the evaluation position Pe is obtained, subsequently, the obstacle detection part 23 obtains a spaced-apart distance G of the evaluation position Pe of each divided region B from a line segment which constitutes reference (S13). The spaced-apart distance G is suitable for a numerical value for determining whether or not an obstacle W is present in the corresponding divided region B and whether or not unevenness is present in the corresponding divided region B. Here, steps for obtaining the spaced-apart distance G has been explained in detail using the flowchart shown in FIG. 14 which is used in the explanation of the above-mentioned embodiment. Accordingly, the detailed explanation is omitted here.

Further, the color arithmetic operation part 71 obtains the luminosity M and the hue N for each divided region B (S14). The luminosity M and the hue N are suitable as numerical values for determining whether or not a surface of the screen S is suitable for the projection surface.

After the spaced-apart distance G, luminosity M and hue N of the evaluation position Pe are obtained, first of all, the numerical value R2 for the aptitude value calculation is obtained by the aptitude value arithmetic operation part 24 based on the spaced-apart distance G, and the numerical value R3 for the aptitude value calculation is obtained based on the luminosity M and hue N (S15). Then, based on these numerical values R2, R3, an aptitude value R of each divided region B as a projection surface is obtained. Here, steps for obtaining the aptitude value R have been explained using the flowchart shown in FIG. 23 and hence, the explanation of steps is omitted.

After the aptitude values R for the respective divided regions B are obtained, subsequently, the candidate region determining part 25 determines a projection candidate region C from 16 divided regions B using the aptitude values R (S16). Next, a projection region D on which the image is actually displayed is selected out of the divided regions B determined as the projection candidate regions C by the projection region determining part 26 (S17). Then, the image processing part 27 performs the image processing so that the image can be displayed in a projection range constituted of the selected projection regions D (S18). Then, to display a clear image on the screen S, the focusing control part 28 adjusts the focusing of the projection lens 14 (S19) and, to display an image having brightness suitable for easy viewing on the screen S, the light quantity control part 29 adjusts a quantity of light from the light source 12a.

Due to such constitution, it is possible to display an easily viewable image having neither distortion nor stepped portions can be easily displayed on a region which has no obstacle W or unevenness and is suitable as the projection surface. The processing (S16 to S20) from the step in which the projection candidate region C is determined based on the aptitude value R of the respective divided region B to the step in which the light quantity is adjusted is substantially equal to the processing used in the projector 10 of the first embodiment and hence, the explanation of the processing is omitted here.

Here, in the projector 60 of the second embodiment, the unit includes the imaging point position arithmetic operation unit 61c. However, for example, the controller 70 may include the imaging point position arithmetic operation unit 61c. In the projector 60 of the second embodiment, a so-called matching processing method is used as a method for obtaining parallax quantity. However, the method is not limited to this method, and various methods such as the Hough transform processing method which do not require corresponding point determination processing, for example, may be used.

Further, the following techniques may be applicable to the projectors 10, 60 in both of the above-mentioned two embodiments.

For example, in this embodiment, a shape of the projection area A (see FIG. 2 and FIG. 3) and a shape of the divided region B has a laterally rectangular shape. However, the shapes are not limited to such shapes, and various shapes including a circular shape may be adopted. However, from a viewpoint of effective use of the projection area A, the divided region B favorably has a shape similar to the shape of the projection area A, and favorably has a quadrangular shape, particularly, rectangular shape or square shape. The number of the plurality of divided regions B is 16. However, the number has no upper limit and can be suitably determined if necessary.

Further, in this embodiment, the number of the places where the position is measured is only one place which is the center Bc for each divided region B, and the evaluation position Pe for each divided region B is obtained based on the one place. However, the method for obtaining the evaluation position Pe is not limited to such manner. For example, by measuring positions of a plurality of places in each divided region B, the evaluation position of the corresponding divided region B may be obtained based on the positions of the plurality of measured places, or an average position of the plurality of measured places may be used as the evaluation position Pe.

In the first embodiment, the distance sensors 19 the number of which is as same as the number of the divided regions B are provided and each distance sensor 19 measures a position (reflection point positions) of the center Bc of the corresponding divided region B. However, the distance sensors are not limited to such constitution. For example, by providing a distance sensor which can measure distances with respect to a large number of positions by scanning, the distance from the distance sensor to the centers Bc of the respective divided regions B may be measured by this distance sensor. Further, in the second embodiment, the number of positions for obtaining the parallax quantity may be plural. Here, the evaluation position Pe is expressed as a position which is determined with respect to the position of the projection lens 14 as the reference position. However, the reference position is not limited to the position of the projection lens 14, and various positions such as a position of the light source 12a, for example, may be used as the reference position.

Figure 14:
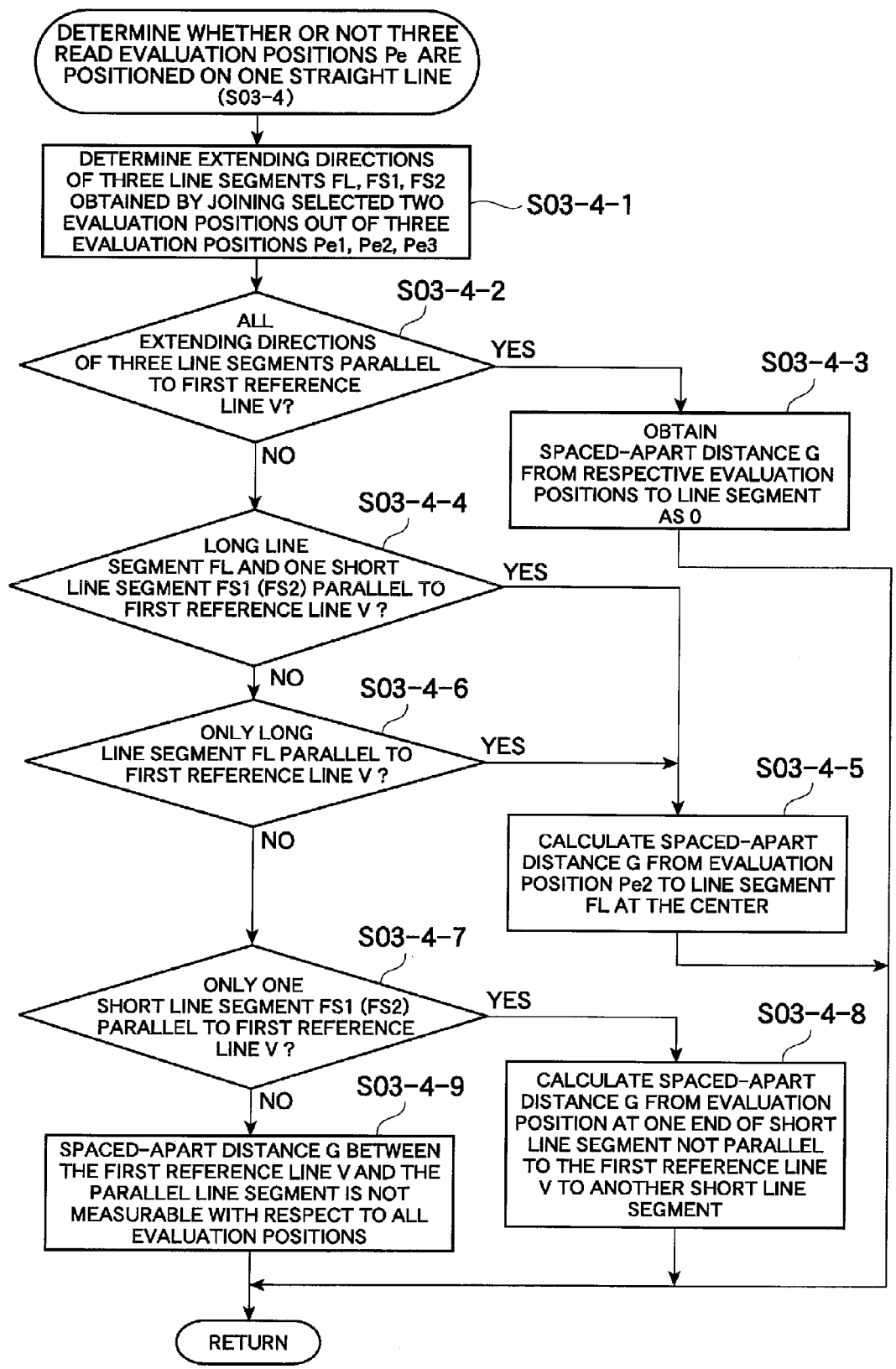
FIG. 14 is a flowchart showing processing for determining whether or not one remaining evaluation position is positioned on one straight line out of processing of the obstacle detection part.

Further, in the obstacle detection part 23 of the above-mentioned embodiment, as explained above, when all the line segments FL, FS1, FS2 are not parallel to the first reference line V, it is determined that the spaced-apart distances G is not measurable with respect to three evaluation positions Pe1, Pe2, Pe3 (see FIG. 14, S03-4-9). When it is determined that the spaced-apart distances G is not measurable, as shown in the spaced-apart distance table T2 in FIG. 7B, the numerical value R1 for calculating the aptitude value R is set to a low value of "1" and this case is similarly treated with the case in which an obstacle W or unevenness exists. For example, in a device which detects the obstacle W or the unevenness using obstacle detection part 23 after the screen S is arranged in a state that the directions of the whole screen S is orthogonal to the projection direction X, when it is determined that the measurement is impossible, there is a high possibility that the obstacle W or the unevenness exists in all of three selected divided regions B. Accordingly, the case in which the spaced-apart distances G is not measurable and the case in which the obstacle W or the unevenness exists can be treated similarly. However, when the obstacle W or the unevenness is detected without detecting a setting state of the screen S, it is necessary to take a case in which the whole screen S is inclined with respect to the projection direction X into consideration. That is, when the whole screen S is inclined with respect to the projection direction X, there may be a case in which, even though all the line segments FL, FS1, FS2 are not parallel to the first reference line V, three evaluation positions Pe1, Pe2, Pe3 are arranged on one straight line when focusing on only the evaluation positions Pe1, Pe2, Pe3 are focused.

Figure 24:
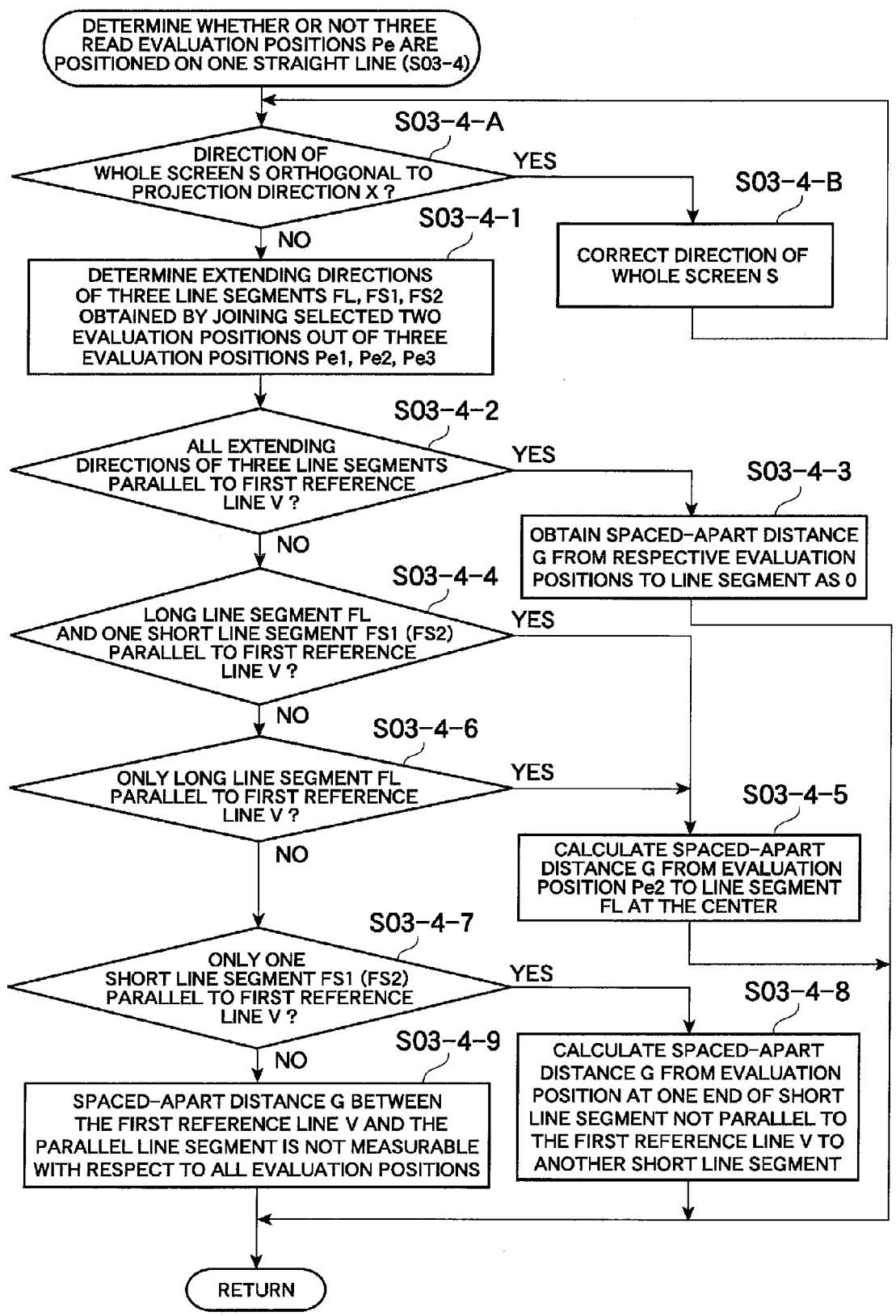
FIG. 24 is a flowchart showing processing for determining whether or not one remaining evaluation position is positioned on one straight line out of processing of the obstacle detection part.

Accordingly, when the obstacle W or the unevenness is detected without detecting the setting state of the screen S, as described in a flowchart shown in FIG. 24, before performing processing (S03-4-1) for selecting three evaluation positions Pe1, Pe2, Pe3 and specifying extending directions of three line segments FL, FS1, FS2, the obstacle detection part 23 performs, first of all, screen state determination processing (S03-4-A) for determining whether or not the direction of the whole screen S is orthogonal to the projection direction X. Various methods can be considered as the screen determination method. For example, a method which obtains the direction of the whole screen S based on the evaluation positions Pe of divided regions B11, B14, B41, B44 at four corners of the projection area A can be named.

When the direction of the whole screen S is orthogonal to the projection direction X as a result of such determination, as explained above, it is determined whether or not the three evaluation positions Pe are positioned on one straight line (after S03-4-1). On the other hand, when the direction of the whole screen S is not orthogonal to the projection direction X, the obstacle detection part 23 corrects the direction of the whole screen S so that the direction of the whole screen S is orthogonal to the projection direction X (S03-4-B), and the state of the screen S is determined again (S03-4-A). The correction method may be performed automatically or may be performed by a person who installs the projector as one step of a projector installing operation. By performing such a correction when necessary, even in a projector which imposes no restriction on a setting state of the screen S, the above-mentioned obstacle detection part 23 may be used.

Further, in the above-mentioned embodiment, both of the obstacle W and unevenness on the screen S are detected using the same reference. However, the obstacle W and unevenness may be detected based on different references. Although the obstacle W and unevenness are common with respect to a point that the obstacle W and unevenness impede proper image display, the obstacle W and unevenness differ from each other in influence on the image. Accordingly, when the aptitude value R is obtained, the different references may be used for the obstacle W and unevenness respectively. Various methods are considered as a method for detecting the obstacle W and unevenness based on different references. For example, in the above-mentioned embodiment, when the spaced-apart distance G obtained with respect to the evaluation position Pe of each divided region B is 20 mm or more, it is determined that an obstacle is detected, while the spaced-apart distance G is less than 20 mm, it is determined that unevenness on the screen S is detected. Further, the determination based on different references also brings about an advantage that in performing weighting, the weighting can be performed more properly.

In the above-mentioned embodiment, the obtained numerical values R1, R2, R3 for calculating the aptitude value are summed to obtain the aptitude value R. However, the aptitude value R may be obtained using the numerical value to which weighting corresponding to the degree of significance is applied. For example, when weighting is applied to the numerical value R2 for calculating the aptitude value based on the spaced-apart distance G, a value obtained by multiplying the obtained numerical value R2 by weighting coefficient is actually used as the numerical value R2 for calculating the aptitude value. Due to such a method, the more practical aptitude value can be obtained and hence, the projection candidate region C can be determined based on the more practical reference.

The method for obtaining the aptitude value R of each divided region B as the projection surface is not limited to the method used by the projectors 10, 60 of the above-mentioned two embodiments. For example, it may be possible to adopt a method which obtains the aptitude value R based on the numerical value R1 for calculating the aptitude value R1 obtained based on the evaluation distance Le, the numerical value R2 for calculating the aptitude value R2 obtained based on the spaced-apart distance G and the numerical value R3 for calculating the aptitude value obtained based on the luminosity. In this case, Tables T1, T2, T3 for obtaining the three numerical values R1, R2, R3 and a reference aptitude value Rc corresponding to the method are provided.

In the above-mentioned embodiment, when the projection region D is selected from the projection candidate regions C, the projection region D is selected such that the projection range in which the image is actually displayed is explained as large as possible. However, other selection reference may be used. For example, it is possible to adopt a selection reference which allows the selection of the projection region D in a state that the projection range preferably includes the center of the projection area A and, even when the projection range does not includes the center of the projection area A, the projection range is preferably arranged close to the center. When a large projection range is ensured, a larger image can be displayed and hence, more easily viewable image can be displayed. On the other hand, using the selection reference which allows the selection of the projection region D such that the position of the projection range is preferably arranged closer to the center of the projection area A, the projection light L including images can be projected using a center portion of the optical system of the projection lens part 12. In the optical system, in general, the closer a portion of an optical system to the center portion, the better the optical performance becomes. When the projection light L including the image can be projected using the center portion of the optical system, the more easily viewable image can be displayed. Either one of selection references may be adopted, or both selection references may be adopted. When both selection references are adopted, priority is assigned to either of selection references may precede.

As a method for selecting the projection region D so that the projection range is preferably positioned as close as possible to the center of the projection area A, for example, the following method can be named. When all divided regions B are determined as the projection candidate regions C, it is sufficient to display the image in the whole projection area A and hence, this method is used when the divided region B which is not determined as the projection candidate region C exists. First of all, the projection candidate region C which is positioned closest to the center of the projection area A is detected out of the projection candidate regions C. Then, the projection region selection region Dd having the largest size is detected under the condition that the projection region selection region Dd includes the projection candidate region C, has a shape similar to the shape of the projection area A and, further, does not overlap with then on-projection candidate region UC. Then, the projection candidate region C which overlaps with the projection region selection region Dd may be selected as the projection region D.

The method for controlling the projection direction of the projection light L so that the image is projected on the projection range determined by the projection region D is not limited to the above-mentioned method which controls the projection direction of the projection light L using the projection direction control part 27b, and various methods may be used. For example, the projection direction of the projection light L may be controlled such that an optical system of the projection lens part 13 of the projector 10 which includes the light source 12a and projection lens part 13 is mounted on the projector body 10 in a state that the projection direction X is changeable and, at the same time, by mounting a drive unit such as an actuator which moves the projection lens part 13 is provided and is operated by the drive unit such as the actuator if necessary whereby the projection direction is changed.

The projectors 10, 60 of the above-mentioned embodiments are formed of a portable-type projector and display the image on a projection surface such as a screen S which extends vertically. However, the projectors may be formed of a projector of a type other than the portable type such as an installation-type projector.

Figure 25:
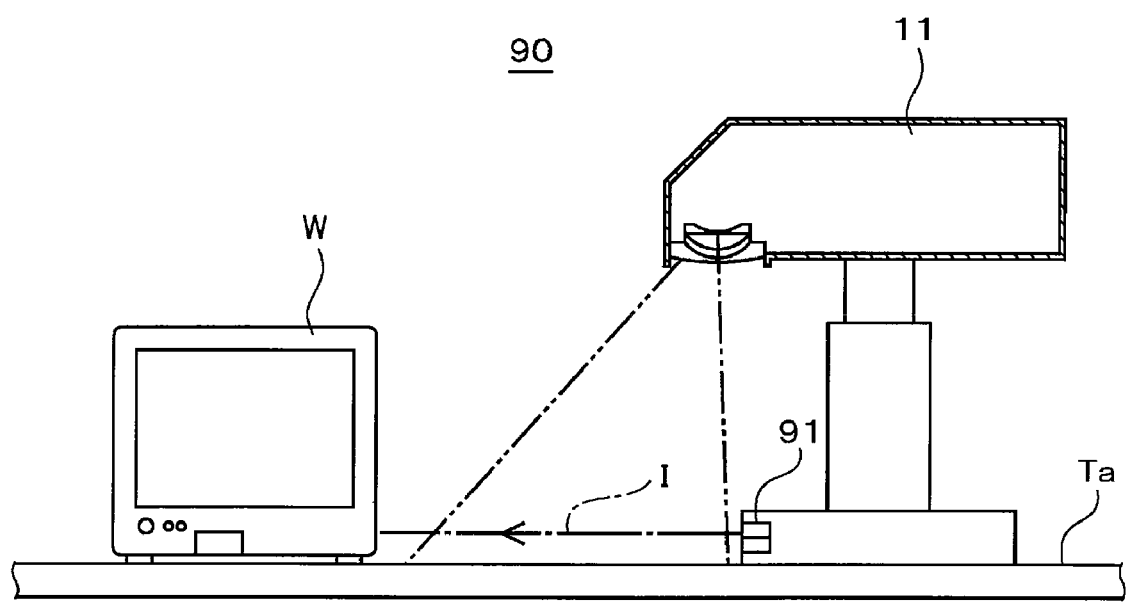
FIG. 25 is a side view of a desktop-type image display device.

For example, as shown in FIG. 25, the present invention is also applicable to a projector 90 of a type which displays the image on a screen S which extends horizontally on a table Ta. Further, in this type of projector 90, as shown in FIG. 25, if necessary, a sensor 91 for radiating detection waves such as infrared rays Ir in the direction parallel to the extending direction of the screen S is provided to detect the obstacle W on the screen S.

Figure 26A:
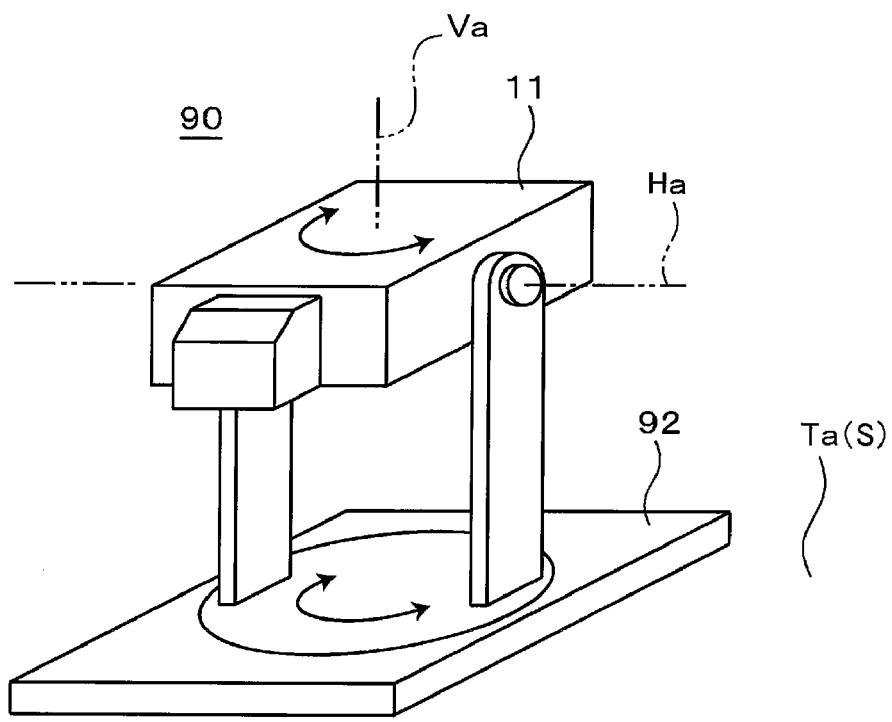
FIG. 26 is a side view of another desktop-type image display device.

As shown in FIG. 26A, in the projector 90 of the type which is mounted on the table Ta, the projector body 11 which includes the light source 12a and the projection lens 14 for projecting light toward the screen S on the table Ta may be mounted in a state that the projector body 11 is rotated about a vertical axis Va as a rotation axis with respect to the pedestal 92 or may be mounted in a state that the projector body 11 is rotated about a horizontal axis Ha as a rotation axis. By mounting the projector body 11 in this manner, after the projector 90 is installed on the table Ta, by rotating the projector body 11 about the vertical axis Va or the horizontal axis Ha, the better projection surface can be easily selected.

Figure 26B:
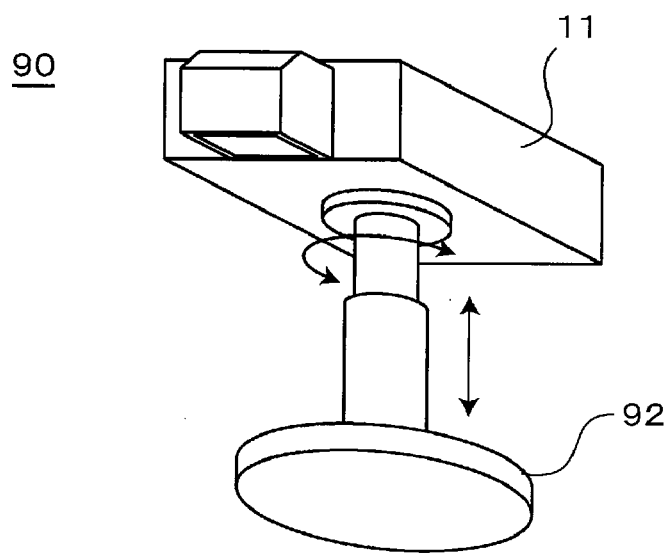

As shown in FIG. 26B, the projector body 11 may be mounted in a vertically movable manner with respect to the pedestal 92. By mounting the projector body 11 in this manner, by vertically moving the projector body 11 after the projector 90 is installed on the table Ta, a size of the range of the image to be projected on the screen S can be easily adjusted.

Figure 27:
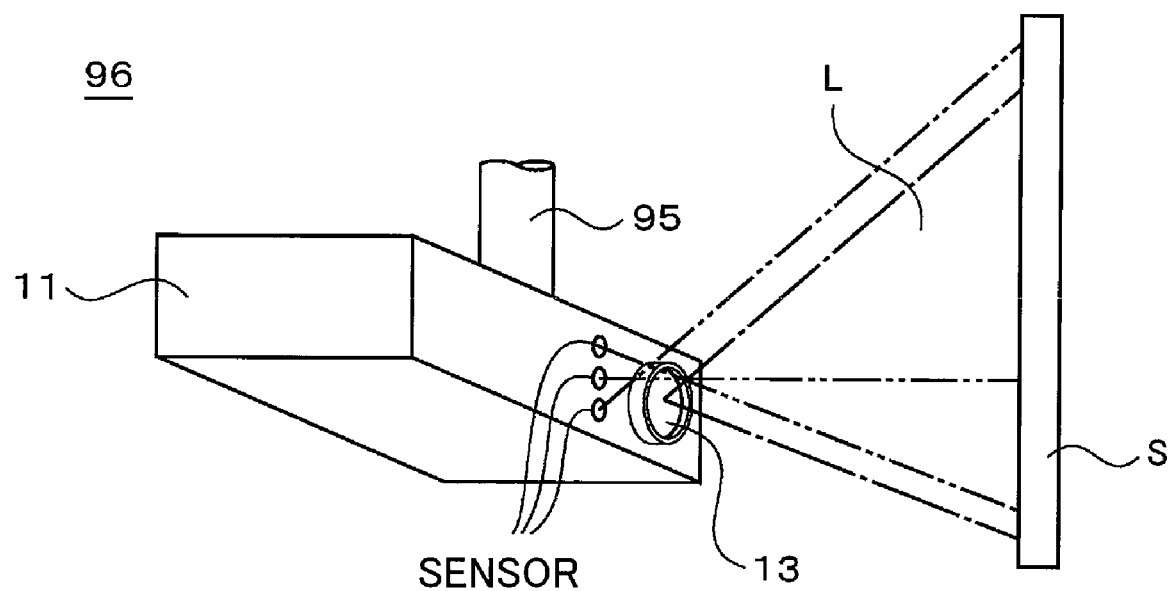
FIG. 27 is a side view of still another ceiling-installing-type image display device.

FIG. 27 shows a projector 96 of a type suspended downwardly from a ceiling by a support member 95, and this type may be used as the projector in the present invention. The projector 96 shown in FIG. 27 includes three sensors as shown in FIG. 27 as means for detecting the obstacle W or unevenness (a lower-end distance sensor, a middle-stage distance sensor, an upper-end distance sensor). Here, as shown in FIG. 27, the projector may be a projector which projects an image on a screen S of a type which allows viewing of the image on the screen S from the side from which the projection light L is projected, or may be a projector which projects an image on a screen S of a type which allows viewing of the image on the screen S from the side opposite to the side from which the projection light L is projected.

Third Embodiment

Figure 28:
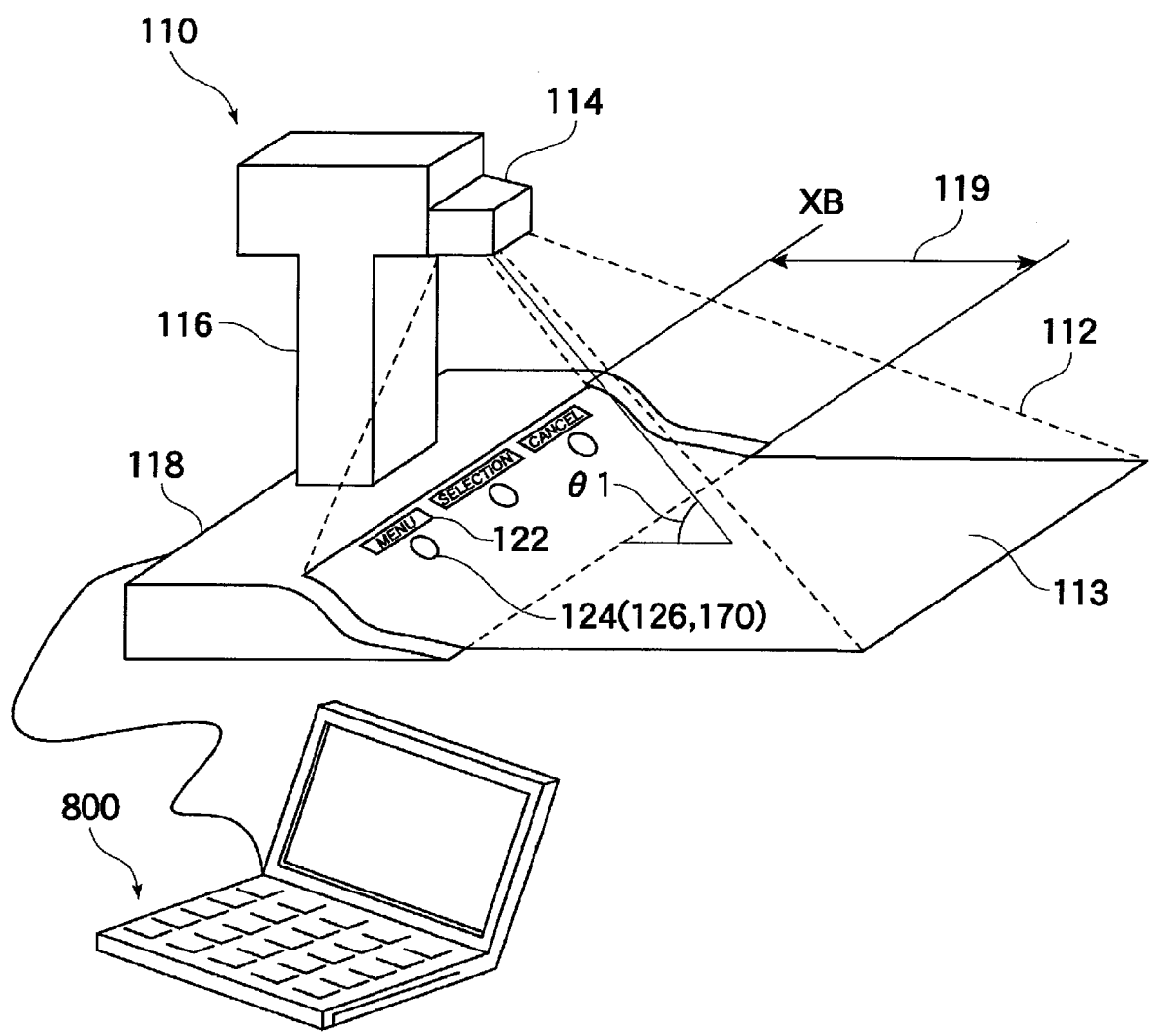
FIG. 28 is a perspective view of appearance of an image display device of a third embodiment of the present invention.

FIG. 28 is a perspective view of appearance of an image display device of a third embodiment.

As shown in FIG. 28, an image display device 110 is a projection device which includes a projection part 114 which generates a projection light 112 based on a video signal and projects an image 113 on a table, a support column 116 which supports a projection part 114 and a pedestal 118 which mounts the projection part 114 and a support column 116 thereon in an erected manner. The image display device 110 receives inputting of video signals such as RGB signals from a computer device 800, and projects the projection light 112 generated based on the inputted video signals in the direction toward the table.

A projection part 114 radiates the projection light 112 such that at least a portion of the projection light 112 reaches the pedestal 118. By forming a projection region 119 where a portion of an image 113 can be formed due to the projection light 112 on the pedestal 118, it is possible to radiate the projection light 112 at an angle close to a right angle with respect to the table. Accordingly, it is possible to display the easily-viewable image 113 with small distortion.

The projection region 119 is a region which receives a portion of the projection light 112 for displaying a portion of an image using a scattered light of the projection light 112, and also is a region which constitutes a portion of a screen.

Since the projection region 119 is a region which displays a portion of the image 113, it is desirable to form the projection region 119 into a shape having no stepped portion for preventing the generation of a shadow attributed to the projection light 112 (see FIG. 29 and FIG. 30 described later). Further, it is desirable to form the projection region 119 into a smooth shape for reducing a distortion of an image to be displayed.

Further, with the provision of the projection region 119 to the pedestal 118, a mounting surface of the pedestal 118 can be set such that the large mounting surface is ensured on an image side. Due to such a constitution, compared to the conventional image display device, the projection part 114 and the support column 116 can be mounted in an erected manner close to the center of gravity of the pedestal. Accordingly, the stability of the image display device 110 can be increased when the image display device 110 is mounted on a table and hence, falling of the image display device 110 can be prevented.

Further, in an example shown in FIG. 28, the pedestal 118 is provided with a photo detector 126 which functions as an operation switch 124 when a user performs an operation associated with the image 113. The photo detector 126 is a device which outputs received light information corresponding to quantity of received light.

When the user interrupts the projection light 112 which the photo detector 126 receives by extending his/her finger to a position above the photo detector 126, the received light information which is outputted from the photo detector 126 is changed and hence, the image display device 110 can detect that the photo detector 126 (operation switch) is operated by the user.

Further, the image display device 110 projects operation function information 122 for informing functions allocated to the operation switch 124 to the user on a portion of the projected image 113 thus enhancing easy-to-use property enjoyed by the user. Further, to show the presence of the operation switch 124, a switch identification display for identifying a range or a periphery of the operation switch 124 may be performed on a portion of the projected image 113. The switch identification display may preferably be performed with a high complementary color or high contrast with respect to a background. Further, when the photo detector 126 is used as the operation switch 124, the switch identification display may preferably be performed by projecting a light having a wavelength which is not included in a light having high brightness such as a white light, or an illumination such as a fluorescent lamp.

The embodiment shown in FIG. 28 is directed to a mode in which the operation switch 124 is provided within the projected image 113. However, a position of the operation switch 124 is not limited to the above-mentioned position, and the operation switch 124 may be provided outside the image 113. Further, instead of using the photo detector 126 as the operation switch 124, an input unit such as a push button switch can be used as the operation switch 124.

Figure 29:
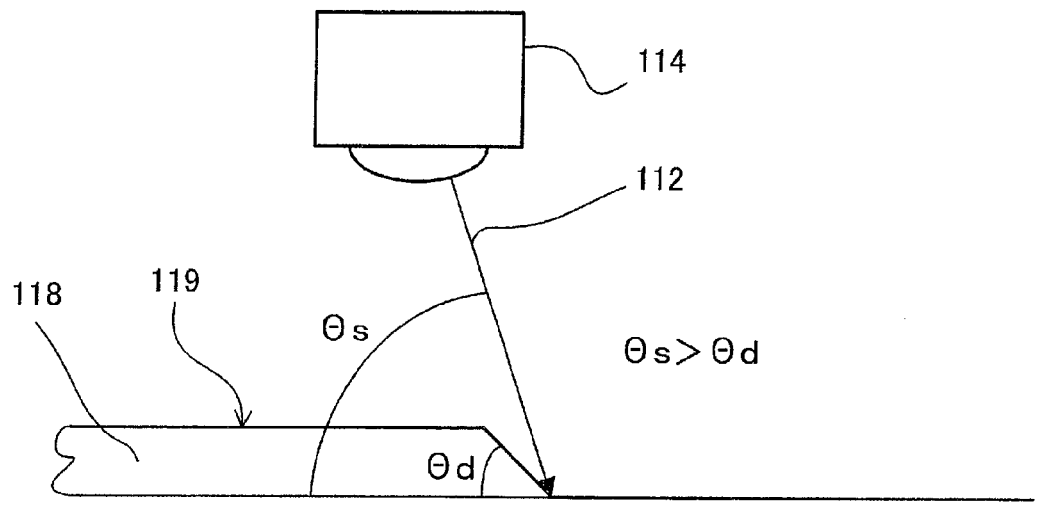
FIG. 29 is a side view showing the relationship between a projection angle θs of a projection light projected from a projection portion and an inclination angle θd made of an acute angle in a projection region.
Figure 30:
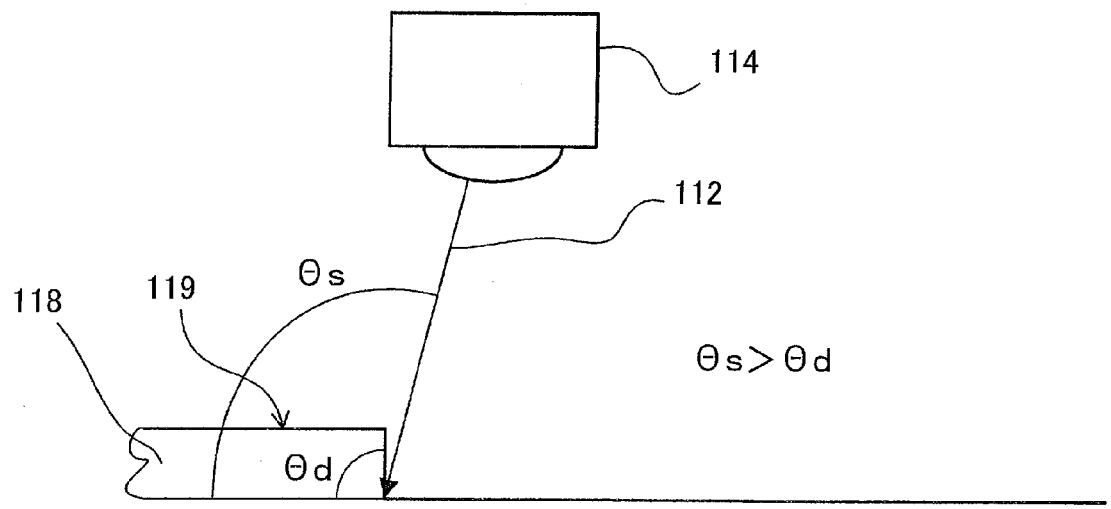
FIG. 30 is a side view showing the relationship between the projection angle θs of a projection light projected from a projection portion and the inclination angle θd in the projection region.

FIG. 29 and FIG. 30 are side views showing the relationship between a projection angle θs of the projection light 112 projected from the projection part 114 and an inclination angle θd in the projection region 119. As shown in FIG. 29, when a stepped portion or the like having the inclination angle θd made of an acute angle is present in the projection region 119 of the pedestal 118, and the relationship of θs<θd is established between the inclination angle θd and the projection angle θs, a shadow due to the projection light 112 is generated and hence, the image 113 is hardly observed. Accordingly, by making the projection angle θs larger than the inclination angle θd (θs>θd), the projection part 114, the inclination angle θd and the position of the projection part 114 are determined. Further, to reduce a distortion of an image to be displayed, it is desirable to make the inclination angle θd in the projection region 119 as small as possible and, at the same time, to form the projection region 119 into a smooth shape.

Further, as shown in FIG. 30, by making the projection angle θs larger than the inclination angle θd (θs>θd) also in a region in which the projection angle θs is formed of a right angle or an obtuse angle, it is possible to prevent the generation of a shadow due to the projection light 112. Further, to reduce a distortion of an image to be displayed, it is desirable to make the inclination angle θd in the projection region 119 as small as possible and, at the same time, to form the projection region 119 into a smooth shape.

Figure 31:
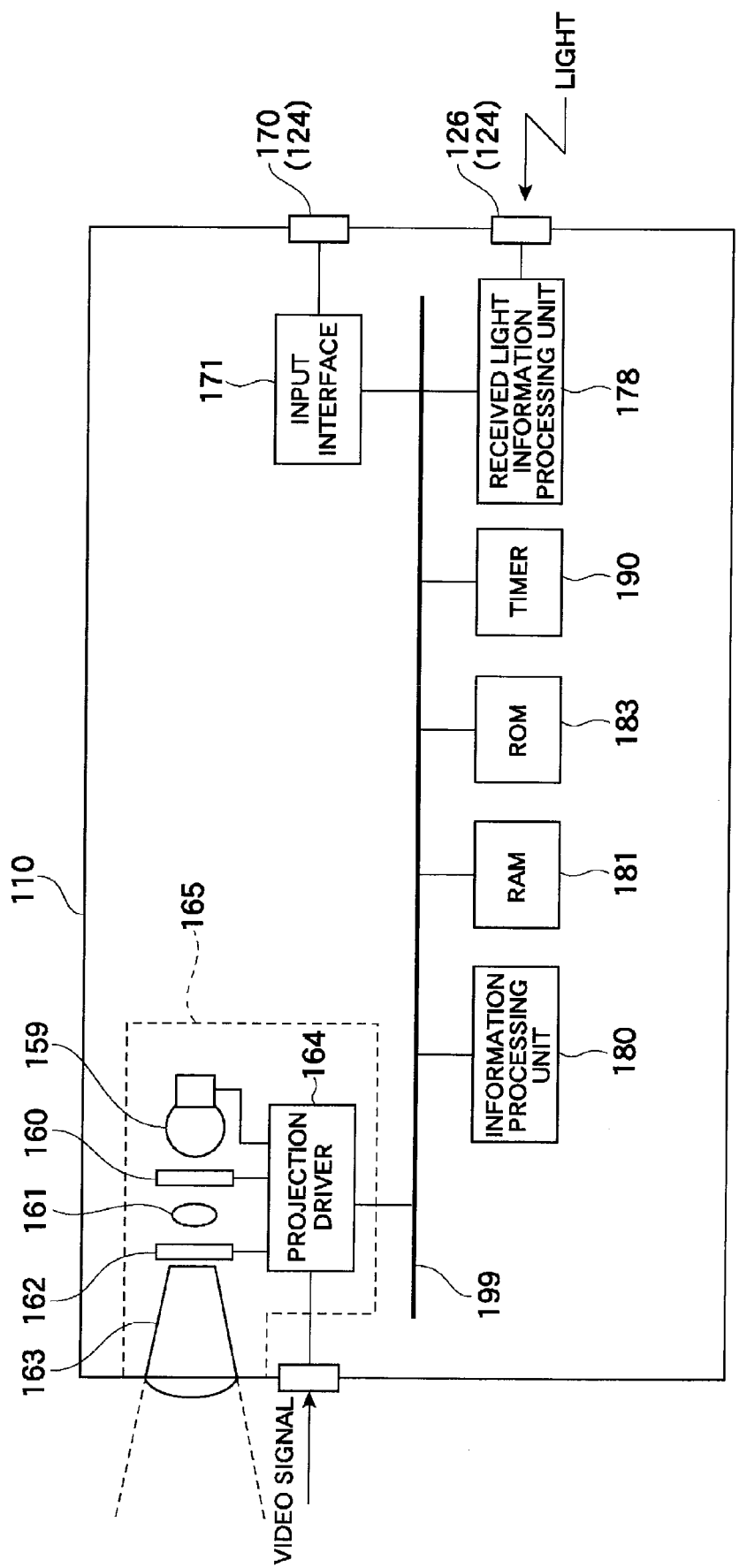
FIG. 31 is a block diagram of a signal processing system of the image display device shown in FIG. 28.

FIG. 31 is a block diagram of a signal processing system of the image display device 110. As shown in FIG. 31, a projection part 165 of the image display device 110 includes a light emission unit 159 which constitutes a light emitting source for emitting a projection light, a stop 160 for adjusting a quantity of light emitted from the light emission unit 159, an illumination optical system 161 for adjusting an illumination light emitted from the light emission unit 159 to a parallel light, a light modulation unit 162 such as liquid crystal for forming a projection image with respect to the illumination light emitted from the light emission unit 159, and a projection optical system 163 for forming the projection light 112 by expanding the projection image.

Further, the projection part 165 of the image display device 110 includes a projection driver 164 which, by inputting video signals such as RGB signals in the projection driver 164 from a computer device 800, performs outputting of a drive signal to the light modulation unit 162, the adjustment of the stop 160, and the adjustment of a light emission quantity of the light emission unit 159 and, at the same time, adjusts brightness or coloration of the image which is projected from the image display device 110, and synthesizes operation function information, a menu image, or another projection information thus outputting these information to the light modulation unit 162. In this manner, the projection driver 164 functions as a function information generation unit which generates video signals including operation function information for projecting functions allocated to the operation switch 124 and outputs the generated video signals to the projection part 114.

Further, the image display device 110 includes an input unit 170 for outputting operation information when the user performs operations associated with an image such as brightness or coloration of the image 113, or when the user performs various operations associated with the image display device 110, an input interface 171 for transmitting the operation information outputted from the input unit 170 to an information processing unit 180 by way of a bus 199, a photo detector 126 which outputs received light information such as a voltage signal corresponding to a quantity of received light and is allowed to function as the operation switch 124, and a received light information processing unit 178 which obtains the received light information outputted from the photo detector 126 and transmits the outputted received light information to the information processing unit 180.

Further, image display device 110 includes the information processing unit 180 which performs projection of a help image with respect to handling of the image display device 110, setting of a projection language, setting of a projection time, setting of a menu image, setting of selection switch, electricity supply/interruption processing, other controls relating to the image display device 110, or a processing of the image 113 which is projected from the image display device 110 on the adjustment of projection position, size, brightness, contrast, gamma, color temperature, tone, sharpness, horizontal position or vertical position of the image 113. An aptitude detection part for detecting an aptitude as a projection surface is constituted of a photo detector 126, a received light information processing unit 178 and the information processing unit 180. The aptitude detection part possesses a function of a distance information generation unit which generates video signals including distance information on the image 113 formed by the projection light corresponding to a distance from a pedestal-118-side projection end, and outputs the generated video signals to the projection part 114. Further, the information processing unit 180 also functions as a projection control part for changing a size of the image 113, or a projection position of the image 113 based on the received light information outputted from the photo detector 126.

Further, the image display device 110 includes a RAM 181 which is used as an operation field when the information processing unit 180 executes processing, a ROM 183 for storing various information such as a processing program executed by the information processing unit 180 or constants, and a timer 190 for counting time.

In the inside of the image display device 110, the information processing unit 180, a received light information processing unit 178, a projection driver 164, respective peripheral circuits including an input interface 171, the RAM 181, the ROM 183, the timer 190 and the like are connected to each other by way of the bus 199, and based on the processing program executed by the information processing unit 180, the information processing unit 180 can control the respective peripheral circuits. Here, the processing program executed by the information processing unit 180 can be provided using a recording medium or a communication. Further, respective peripheral circuits can be constituted of an ASIC or the like.

Next, the manner of operation of the image display device 110 is explained. When the video signal such as the RGB signals are inputted from the computer device 800, the projection driver 164 outputs a drive signal for forming an image to the light modulation unit 162, and instructs the light emission unit 159 to emit a quantity of light. Due to such an operation, the projection light 112 for the image is formed and hence, it is possible to project the image 113 to a screen.

In adjusting the projection position, the size, the brightness, the contrast or the like of the image 113 projected by the image display device 110, a user instructs the projection of a menu image by operating the operation switch 124. The received light information processing unit 178 or the input interface 171 acquires the operation information on the operation switch 124 operated by the user, and transmits the obtained operation information to the information processing unit 180.

Then, the information processing unit 180 generates projection information for performing the projection of the menu image, and outputs the generated projection information to the projection driver 164. The projection driver 164 which acquires the projection information synthesizes information of the menu image with the video signal acquired from the computer device 800, and outputs the synthesized information to the light modulation unit 162. The user can operate the operation switch 124 while looking at the projected menu to adjust the projection position, the size, the brightness, the contrast or the like of the image projected by the image display device 110.

Figure 32:
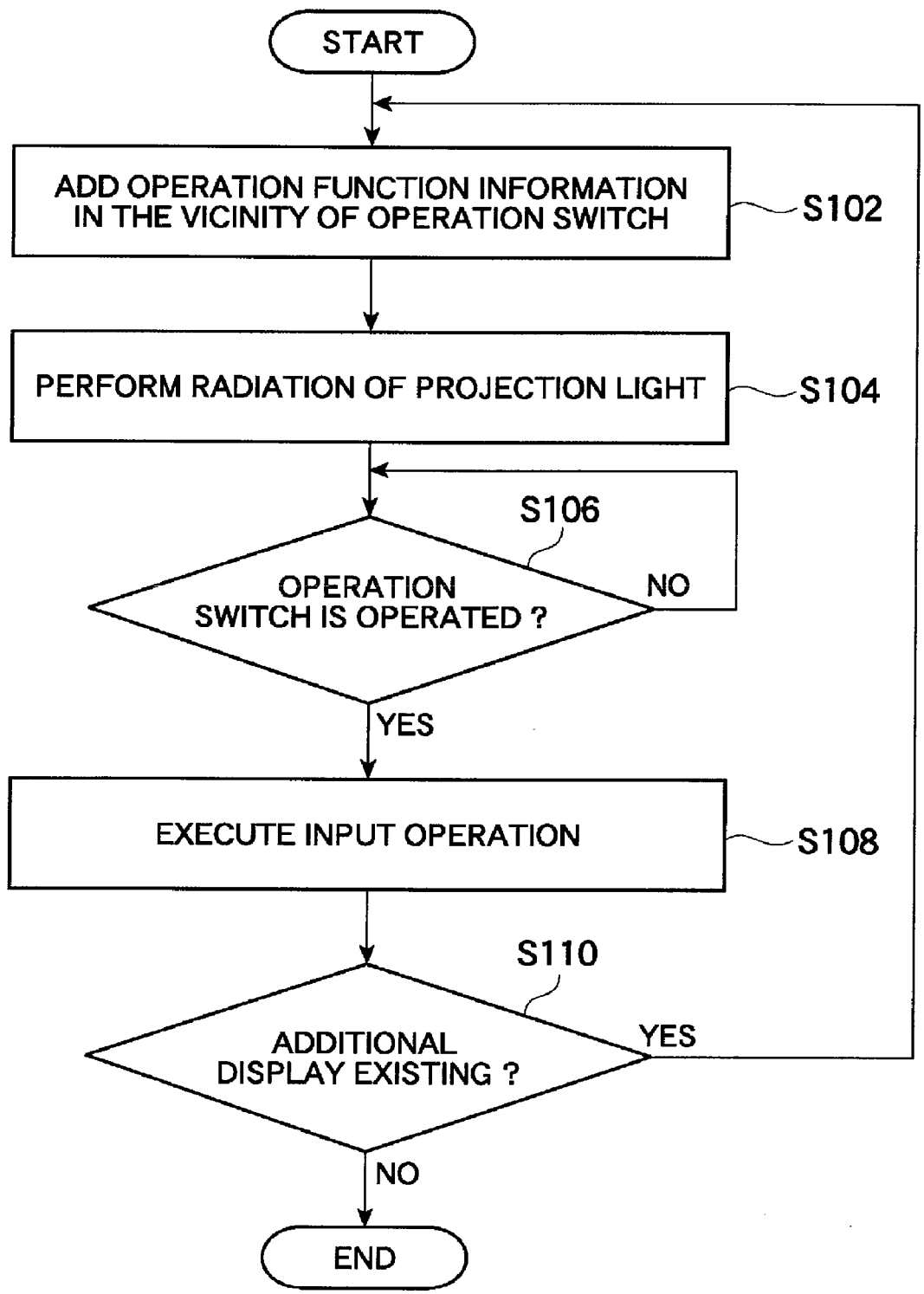
FIG. 32 is a flowchart of processing for projecting operation function information.

Next, the explanation is made with respect to processing for projecting operation function information 122 to the image 113. FIG. 32 is a flowchart of processing for projecting operation function information 122 to the image 113.

In the image display device 110, when the user is allowed to operate the menu switch, the help switch, or other switch, the processing which is executed by the information processing unit 180 advances to step S102 "add operation function information in the vicinity of operation switch" (herein after, abbreviated as S102).

In step S102, the information processing unit 180 generates operation function information for projecting functions currently allocated to respective operation switches 124 to the image 113, and outputs the generated information to the projection driver 164. The projection driver 164 executes a processing for synthesizing the operation function information acquired from the information processing unit 180 with the video signals such as the RGB signals acquired from the computer device 800, and outputs a drive signal to the light modulation unit 162. Then the processing advances to next step S104 "radiate projection light".

In S104, the information processing unit 180 instructs the projection driver 164 to allow the light emission unit 159 to emit light thus performing the radiation of the projection light 112. Then, the processing advances to next determination step S106 "operation switch operated?".

In S106, the information processing unit 180 executes processing of waiting for the user to operate the operation switch 124. When the operation switch 124 is operated by the user, the information processing unit 180 obtains the information via the light information processing unit 178 or the input interface 171. Then, the processing advances to next step S108 "execute input operation".

In S108, the information processing unit 180 executes processing corresponding to the content of the operation by the user. For example, when the user operates the operation switch 124 to instruct the menu projection, the information processing unit 180 generates projection information on the menu and output the projection information to the projection driver 164. After the outputting of the projection information is finished, the processing advances to next determination step S110 "additional display existing?".

In S110, the information processing unit 180 determines whether or not an additional display exists based on the input operation by the user. When the information processing unit 180 determines that the additional display exists, the processing is branched to S102 and the processing for projecting the additional operation function information in the vicinity of the operation switch 124 is performed. When the additional display does not exist, the processing for projecting the operation function information 122 is finished and the processing returns to the original routine.

Figure 33:
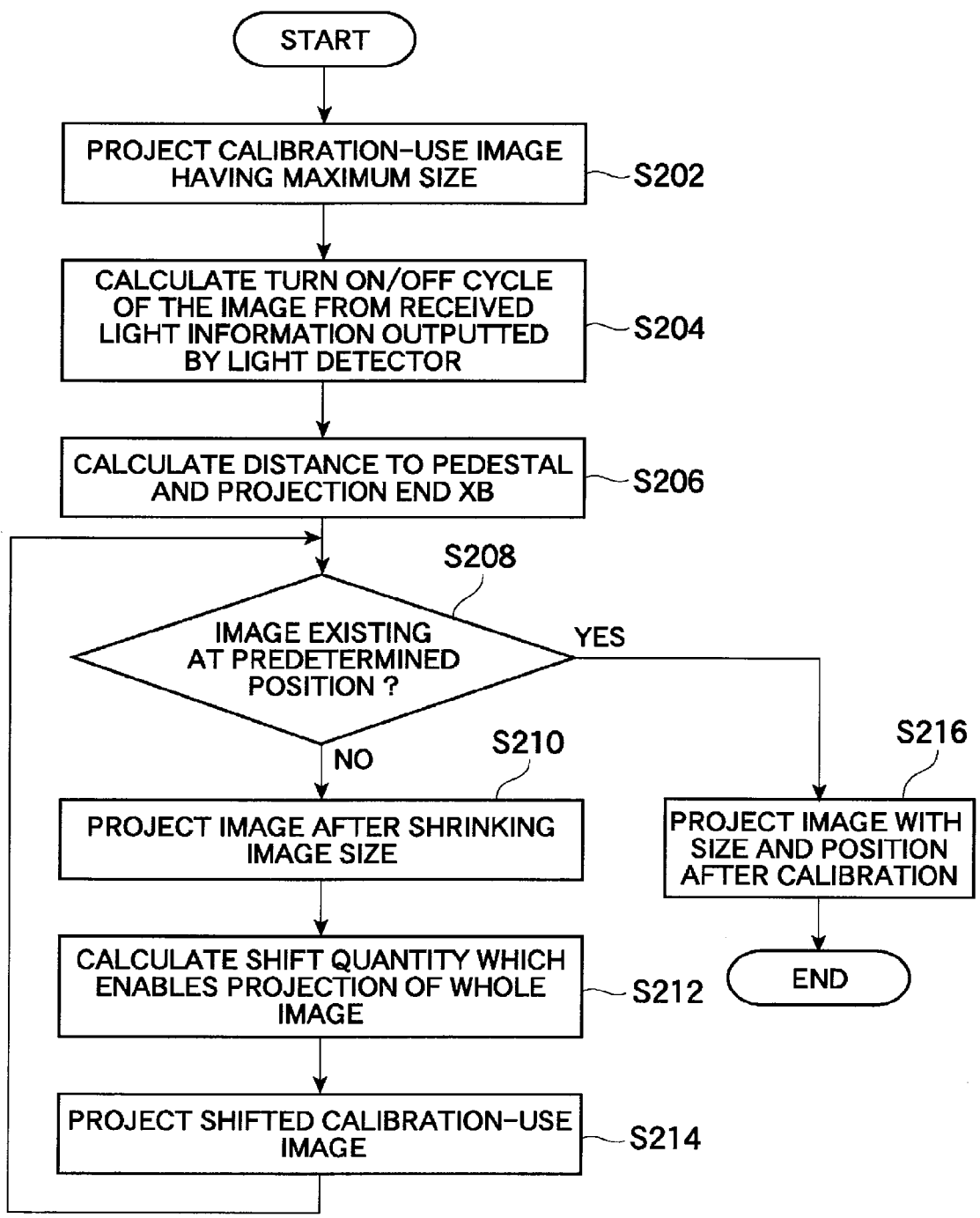
FIG. 33 is a flowchart of processing for executing adjustment of an image size and adjustment of a projection position.

Next, processing for adjusting the image size and the projection position of the image 113 is explained. FIG. 33 is a flowchart of processing in which aptitude as the projection surface is detected based on the received light information received by the photo detector 126 and the adjustment of the image size and the adjustment of the projection position are executed.

When the adjustment of the image size and the projection position is instructed by a user, for example, when electricity is supplied to the image display device 110 or after a height of the projection part 114 is changed relative to the pedestal 118, the processing executed by the information processing unit 180 advances to processing in step S202 "project calibration-use image having maximum size".

In S202, the information processing unit 180 generates the video signal including distance information which differs in a projecting manner depending on the distance from the projection end XB on a pedestal side and output the video signal to the projection driver 164. The projection driver 164, in place of the video signals such as the RGB signals obtained from the computer device 800, outputs the drive signal for projecting the calibration-use image 130 including the distance information obtained from the information processing unit 180 to the light modulation unit 162.

Then, the information processing unit 180 instructs the projection driver 164 to allow the light emission unit 159 to emit light and to set the stop 160. Then, the projection part 165 performs the radiation of the projection light to project the calibration-use image 130.

Here, the appearance of the image display device 110 when the image display device 110 adjusts the image size using the calibration-use image 130 including the distance information is explained in conjunction with FIG. 34. FIG. 34 is a side view of the image display device 110 for explaining a state that the photo detector 126 receives the calibration-use image 130 including the distance information and the adjustment of the image size is performed based on the received light information obtained as a result of reception of the calibration-use image 130.

Figure 34A:
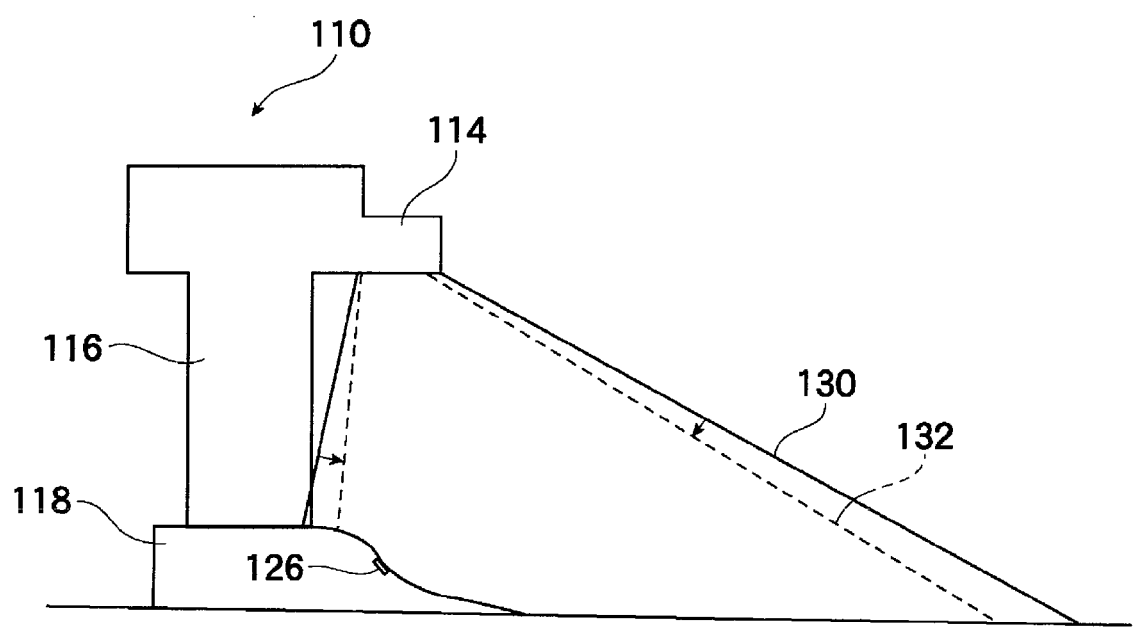

In the example shown in FIG. 34A, the image display device 110, in performing the change of the size of the image to be projected, first of all, projects the calibration-use image 130 having the maximum size. The calibration-use image 130 is, as shown in FIG. 34B, for example, an image having characteristic which makes the turn ON/OFF cycle of the image different depending on a distance from the projection end XB. As other example of the distance information in the calibration-use image, the image which changes the density of a stripe pattern or lattice pattern depending on the distance from the projection end XB may be projected. Further, the distance information of the calibration-use image may have a characteristic that the calibration-use image is arranged parallel to the projection end XB on the pedestal 118 side. Further, the distance information may be an image which is projected only in the vicinity of the photo detector 126 or may be an image which is projected only within a range of predetermined distance from the projection end XB on the pedestal 118 side.

In S202 shown in FIG. 33, when the calibration-use image 130 is projected, the processing executed by the information processing unit 180 advances to next step S204 "calculate turn ON/OFF period of the image from received light information outputted by photo detector". The photo detector 126 which receives a portion of the calibration-use image 130 converts the received light into received light information and outputs the received light information to the information processing unit 180 via the bus 199.

In S204, the information processing unit 180 performs processing for calculating the ON/OFF periods based on the received light information outputted by the photo detector 126. In calculating the Turn ON/OFF cycle, the Turn ON/OFF cycle can be calculated by counting the number of time that the brightness is changed while the timer 190 counts a predetermined time, for example. Then, the processing advances to next step S206 "calculate distance to pedestal and projection end XB".

In S206, the information processing unit 180 calculates the distance between the photo detector 126 and the projection end XB on the pedestal side based on the Turn ON/OFF cycle calculated based on the distance information which changes a projection manner depending on the distance from the projection end XB on the pedestal side and the received light information. In calculating this distance, the information processing unit 180 may obtain and use the information associated with the height of the projection part 114 relative to the pedestal 118. Then, the processing advances to next determination step S208 "image existing at predetermined position?".

In S208, the information processing unit 180 determines whether or not the distance between the photo detector 126 and the projection end XB on the pedestal side falls within a predetermined distance range and determines whether or not the image exists at the predetermined position. When the information processing unit 180 determines that the distance between the photo detector 126 and the projection end XB does not fall within the predetermined distance range, the processing advances to next S210 "project image after shrinking image size".

In S210, the information processing unit 180 instructs the projection driver 164 to output the drive signal for projecting the calibration-use image 132 having a shrunken size based on the distance between the photo detector 126 and the projection end XB on the pedestal side and, at the same time, instructs the projection driver 164 to radiate the projection light whereby the projection part 165 projects the calibration-use image 132 shown in FIG. 34A.

Figure 35:
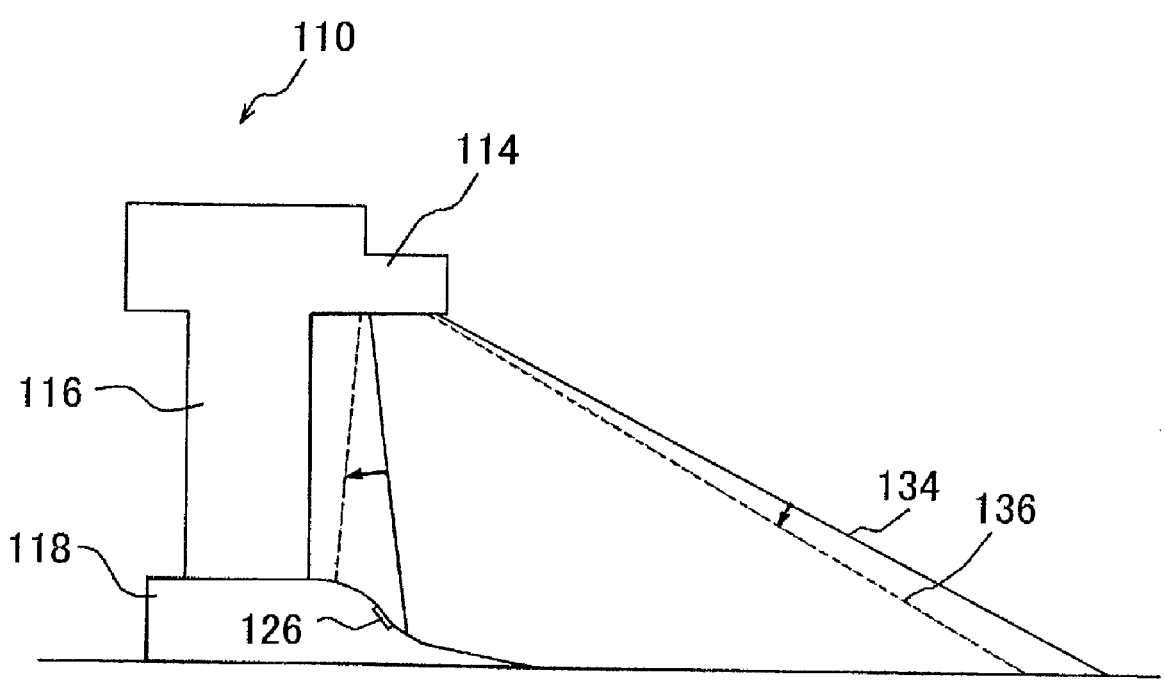
FIG. 35 is a view for explaining a state in which the projection position is shifted.

Here, the appearance of the image display device 110 when the image display device 110 shifts the projection position using the calibration-use image 130 including the distance information is explained in conjunction with FIG. 35. FIG. 35 is a side view of the image display device 110 for explaining a state that the projection position is shifted based on the received light information outputted by the photo detector 126 which receives the calibration-use image.

As shown in FIG. 35, the image display device 110, in changing the projection position to which the image is projected, first of all, projects and displays the calibration-use image 134. As the calibration-use image 134, for example, an image having the characteristic shown in FIG. 34B is used.

In S210 shown in FIG. 33, after the calibration-use image 134 is projected, the processing executed by the information processing unit 180 advances to next step S212 "calculate shift quantity which enables projection of whole image". The photo detector 126 which receives a portion of the calibration-use image 130 converts the received light into received light information and outputs the received light information to the information processing unit 180 via the bus 199. In S212, the information processing unit 180, after performing processing for calculating the Turn ON/OFF cycle based on the received light information outputted by the photo detector 126, calculates the shift quantity which enables the projection of whole image.

In next step S214, the information processing unit 180 instructs the projection driver 164 to output the drive signal for projecting the calibration-use image 136 (see FIG. 35) whose projection position is shifted to the light modulation unit 162 and, at the same time, instructs the projection driver 164 to radiate the projection light whereby the projection part 165 projects the shifted calibration-use image 136. Then, the processing returns to S208.

In S208, when the information processing unit 180 determines that the distance between the photo detector 126 and the projection end XB falls within the predetermined range, the processing advances to S216 "project image with size and position after calibration".

In S216, the information processing unit 180 outputs the information for projecting the video signals such as the RGB signals obtained from the computer device 800 with the predetermined size and position in place of the calibration-use image 130 to the projection driver 164. The projection driver 164 outputs the drive signal for projecting the video signals with the predetermined size and position to the light modulation unit 162. The information processing unit 180 instructs the projection driver 164 to allow the light emission unit 159 to emit light and to set the stop 160. Then, the projection light is radiated to project the image 113 whose projection size and projection position are adjusted. When the calibration of the projection size and projection position of the image 113 are finished, the processing executed by the information processing unit 180 returns to the original routine.

In this manner, the image display device 110 detects the aptitude of the projection surface by projecting the calibration-use image 130 which expresses the distance from the projection end XB on the pedestal side depending on the difference in Turn ON/OFF cycle and hence, it is possible to finish the calibration processing of the size or the projection position of the image in a short period. Further, by using a CCD or the like having the large number of pixels as the photo detector 126, the difference in an image pattern or a pattern of the calibration-use image 130 can be discriminated within a short period. Here, the change of the image size or the shifting of the projection position may be performed by adjusting the optical system or electrically.

Figure 36:
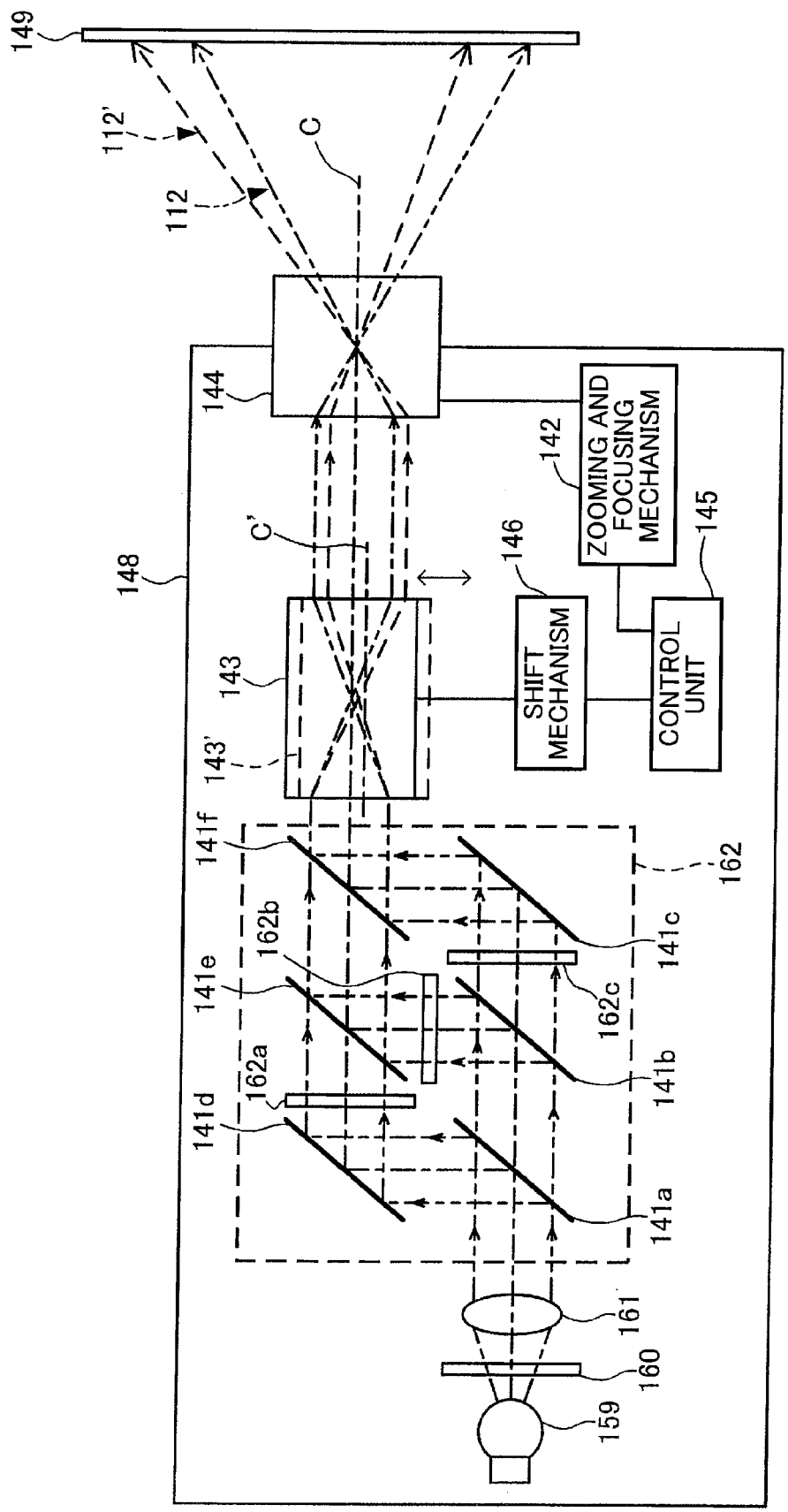
FIG. 36 is a view showing the arrangement of optical parts for realizing the change of the image size and the shifting of the projection position.

The arrangement of the optical parts in the inside of the projection part 114 for realizing the change of the image size or the shifting of the projection position is explained in conjunction with FIG. 36.

As shown in FIG. 36, the optical system 148 of the projection part 114 includes the light emission unit 159 for emitting projection light, the stop 160 for adjusting the light quantity of light emitted by the light emission unit 159, the illumination optical system 161 for adjusting the illumination light emitted by the light emission unit 159 to parallel light, the light modulation unit 162 which divides the illumination light emitted by the light emission unit 159, forms images for respective primary colors and synthesize the images, the projection lens 144 for projecting light modulated by the light modulation unit 162 to the screen 149 which constitutes the projection surface and a relay lens 143 arranged between the projection lens 144 and the light modulation unit 162 and is movable in the vertical direction.

The light modulation unit 162 includes dichroic mirrors 141a, 141b for splitting the illumination light to respective color components of three primary colors of R (RED), G (GREEN), B (BLUE), for example. Further, the light modulation unit 162 includes the light modulation units 162a, 162b, 162c which form images for respective split color components. The mirrors 141c, 141d have a function of changing the direction of light, and the mirror 141e, 141f have a function of synthesizing the respective primary color components.

The dichroic mirror 141a splits the white illumination light emitted by the light emission unit 159 into a B (BLUE) component on a short wavelength side and other components. In the embodiment explained in conjunction with FIG. 36, the dichroic mirror 141a reflects the B (BLUE) component and allows the B (BLUE) component to be incident on the light modulation unit 162a which forms an image having B (BLUE) color by way of the mirror 141d.

On the other hand, the light which passes through the dichroic mirror 141a is incident on the dichroic mirror 141b. The dichroic mirror 141b reflects the light having R (RED) component and allows the light having the R (RED) component to be incident on the light modulation unit 162b and allows the light having the G (GREEN) component to pass through the dichroic mirror 141b and allows the light having the G (GREEN) component to be incident on the light modulation unit 162c to form the images having R (RED) and G (GREEN) colors. The image having the B (BLUE) component and the light having the R (RED) component are synthesized by the mirror 141e and, further, the image having the G (GREEN) component is synthesized to the image by the mirror 141f to form a color image.

The relay lens 143 is telecentric with respect to both of a light modulation unit 162 side and a projection lens 144 side, and the projection lens 144 is telecentric with respect to a relay lens 143 side. In this manner, by configuring the relay lens 143 to be telecentric with respect to both of the light modulation unit 162 side and the projection lens 144 side even though the relay lens 143 is shifted to a position of a relay lens 143' in the direction perpendicular to the optical axis E, it is possible to prevent a drawback that the optical flux from the light modulation unit 162 side is displaced from the projection lens 144.

Further, the optical system 148 includes the shift mechanism 146 for displacing the relay lens 143 to the optical axis E' from the optical axis E, the zooming and focusing mechanism 142 for adjusting a focal length or focusing of the projection lens 144, and the control unit 145 for outputting an instruction to adjust the focal length or focusing to the zooming and focusing mechanism 142 and, at the same time, outputting an instruction to control a shift quantity of the optical axis E' to the shift mechanism 146.

The shift mechanism 146 is a controllable mechanism constituted of a drive mechanism such as a motor, and the shift quantity of the optical axis E' can be controlled based on the shift instruction outputted by the information processing unit 180 to the control unit 145.

The zooming and focusing mechanism 142 is a controllable mechanism constituted of a drive mechanism such as a motor, and the focal length or focusing position can be controlled based on the zooming instruction or the focusing instruction outputted by the information processing unit 180 shown in FIG. 31 to the control unit 145. The zooming and focusing mechanism 142 is constituted of, for example, a group of focusing lenses for performing an extending operation for focusing the image to be formed on the screen 149, a group of variation lenses moving along the optical axis E for performing an operation of changing the image size and a compensator lenses for correcting inaccurate focusing attributed to the zooming operation.

Due to the constitution of the optical system 138 shown in FIG. 36, by shifting the relay lens 143 parallel to the optical axis E, the image to be projected on the screen 149 can be translated. In an example shown in FIG. 36, by shifting the optical axis of the relay lens 143 to an optical axis E', the projection light 112 is displaced to a projection light 112' whereby the position of the image can be shifted. Further, by giving the zooming instruction to the control unit 145, the image size can be changed. Further, by giving the focusing instruction to the control unit 145, the focusing of the image can be adjusted.

Here, the example of realizing the change of the size of the image and the shifting of the projection position has been explained in conjunction with FIG. 36. However, the light modulation unit 162 may be constituted of a single-plate color liquid crystal display element, or may be constituted of a DMD (Digital Mirror Device) or a reflection-type liquid crystal element. However, in such a case, the constitution of the illumination optical system 161, the stop 160 and the light emission unit 159 are modified to correspond to the constitution of the light modulation unit 162. Further, to project the image as described in the embodiments explained in conjunction with FIG. 28 and the like, it is sufficient to arrange the light emission unit 159 to the illumination optical system 161 in the direction orthogonal to the optical axis E with respect to the dichroic mirror 141a. Further, to perform the change of the size of the image and the shifting of the projection position, it is not always necessary to provide the relay lens 143 shown in FIG. 36, and these operations can be performed by moving the projection lens 144 in the direction orthogonal to the optical axis E or by tilting the projection lens 144.

Further, the distance from the projection end XB on the pedestal side may be expressed by difference in projection mode such as difference in coloration or difference in brightness besides difference in Turn ON/OFF cycle as the calibration-use image. When the support column 116 of the image display device 110 includes a varying mechanism which can vary the height of the projection part 114 relative to the pedestal 118, the size of the image and the projection position can be changed along with the change of the height of the projection portion and hence, the adjustment of the image size and the projection position is performed every time the height of the projection part 114 is changed. Further, by supporting the projection part 114 on the support column 116 in a rotatable manner (not shown in the drawing), the projection position can be changed more easily.

Figure 37:
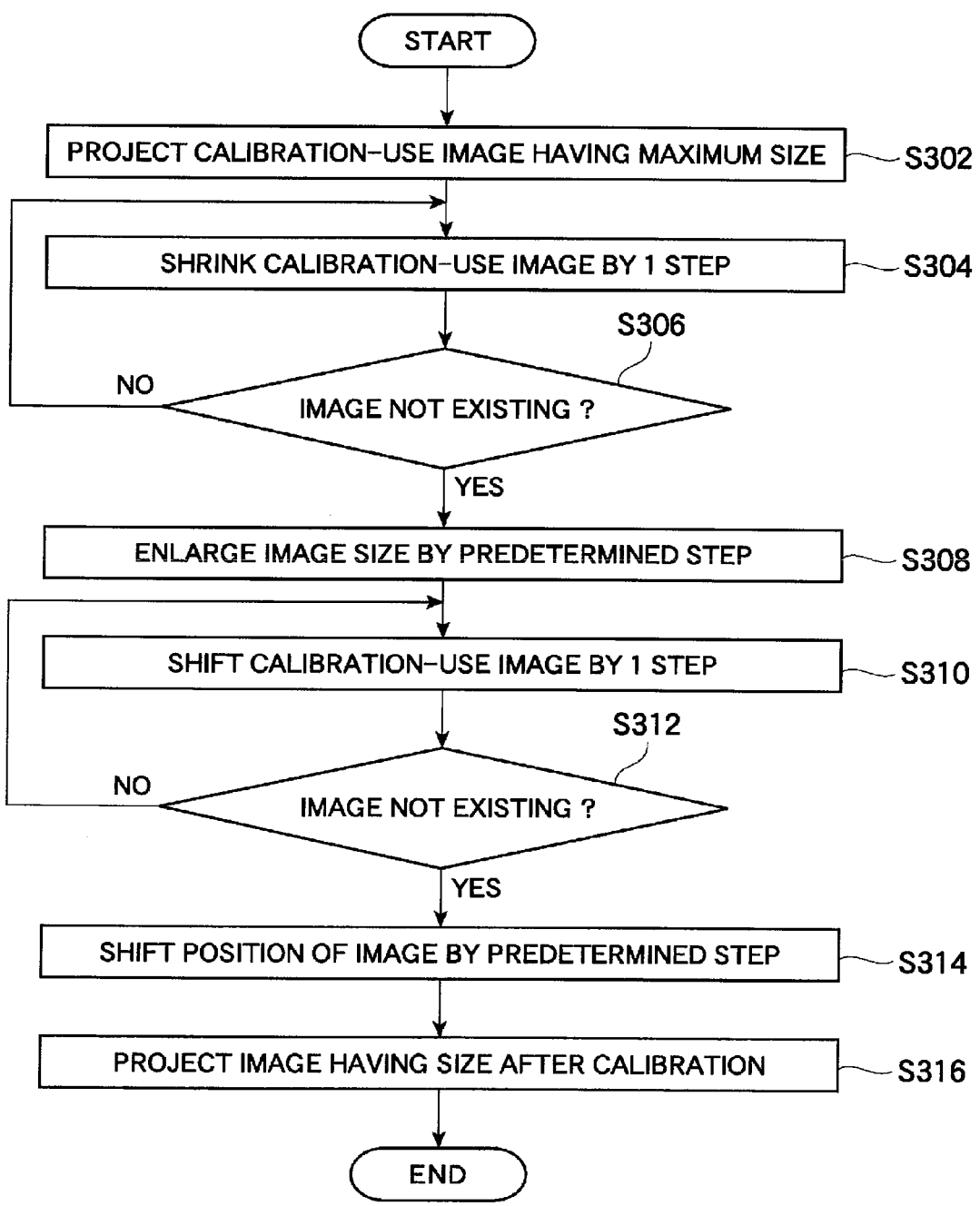
FIG. 37 is a flowchart of processing for executing the adjustment of the image size and the adjustment of the projection position based on whether or not a photo detector receives a projection light.

Next, another embodiment of processing for adjusting the image size and the projection position of the image 113 is explained. FIG. 37 is a flowchart of processing for executing the adjustment of the image size and the adjustment of the projection position based on whether or not the photo detector 126 receives the projection light.

When the adjustment of the image size and the projection position are instructed by a user, for example, when electricity is supplied to the image display device 110 is or after the height of the projection part 114 is changed relative to the pedestal 118, the processing executed by the information processing unit 180 advances to processing in step S302 "project calibration-use image having maximum size".

In S302, the information processing unit 180 generates the video signal of single color and outputs the video signal to the projection driver 164. The projection driver 164, in place of the video signals such as the RGB signals obtained from the computer device 800, outputs the drive signal for projecting the calibration-use image obtained from the information processing unit 180 to the light modulation unit 162.

Then, the information processing unit 180 instructs the projection driver 164 to allow the light emission unit 159 to emit light and to set the stop 160. Then, the projection part 165 performs the radiation of the projection light to display the calibration-use image. Then, the processing advances to next step S304 "shrink calibration-use image by 1 step".

In S304, the information processing unit 180 generates the video signal which is obtained by shrinking the size of the above-mentioned calibration-use image by 1 step and outputs the video signal to the projection driver 164. The projection part 165 performs the radiation of the projection light to display the calibration-use image which is shrunken by 1 step. Then, the processing executed by the information processing unit 180 advances to next determination step S306 "image not existing?".

In S306, the information processing unit 180 determines whether or not the photo detector 126 detects a portion of the calibration-use image projected in S304 and, thereafter, determines whether or not the image exists at a predetermined position. When the information processing unit 180 determines that the photo detector 126 detects a portion of the calibration-use image, the processing returns to S304. Further, when the information processing unit 180 determines that the photo detector 126 does not detect the calibration-use image, the processing advances to S308 "enlarge image size by predetermined step".

In step S308, the information processing unit 180 generates the video signals by enlarging the image size by the predetermined step so as to form a portion of the image 913 in the projection region 119 and outputs the video signals to the projection driver 164. The projection part 165 displays the calibration-use image which is enlarged by the predetermined step. Then, the processing executed by the information processing unit 180 advances to next step S310 "shift calibration-use image by 1 step".

In step S310, the information processing unit 180 generates the video signal which is obtained by shifting the projection position of the above-mentioned calibration-use image by 1 step and outputs the video signals to the projection driver 164. The projection part 165 performs the radiation of the projection light to display the calibration-use image which is shifted by 1 step. Then, the processing executed by the information processing unit 180 advances to next determination step S312 "video image not existing?".

In step S312, the information processing unit 180 determines whether or not the photodetector 126 detects a portion of the calibration-use image projected in S310 and thereafter, determines whether or not the image exists at a predetermined position. When the information processing unit 180 determines that the photo detector 126 detects a portion of the calibration-use image, the processing returns to step S310 and, when the information processing unit 180 determines that the photo detector 126 does not detect the calibration-use image, the processing advances to S314 "shift position of image by predetermined step".

In step S314, the information processing unit 180 generates the video signals by shifting the position of the image by the predetermined step so as to form a portion of the image 913 in the projection region 119 and outputs the video signals to the projection driver 164. The projection part 165 displays the calibration-use image which is enlarged by the predetermined step. Then, the processing executed by the information processing unit 180 advances to next step S316 "project image having size after calibration".

In step S316, the information processing unit 180 instructs the projection driver 164 to project the video signal such as the RGB signals obtained from the computer device 800 having the predetermined size and at the predetermined position in place of the calibration-use image 130. The projection driver 164 outputs the drive signal for projecting the video signals having the predetermined size and the predetermined position to the modulation unit 162. The information processing unit 180 instructs the projection driver 164 to allow the light emission unit 159 to emit light and to set the stop 160. Then, the projection light is radiated to project the image 113 whose projection size and projection position are adjusted. When the calibration of the projection size and the projection position are finished, the processing executed by the information processing unit 180 returns to the original routine.

In this manner, the image display device 110 can automatically change the size or projection position of the image based on whether or not the photodetector receives the projection light. Accordingly, the image display device 110 can project the image having suitable size or suitable position by changing the size or the projection position of the image without generating the calibration-use image including particular distance information.

Next, processing for allocating a function of operation associated with the image 113 to the operation switch 124 and processing for projecting operation function information 122 corresponding to the allocated function are explained. As the operation information associated with the image 113, information for designating a large number of items to be set such as a projection position of the image 113, a size of an image to be projected, brightness, contrast, gamma characteristic, color temperature, tone, sharpness, a horizontal position, a vertical position, a help, setting of a projection language, setting of a projection time, a menu, a selection switch, or a power source switch can be named.

A large number of operation switches 124 can be provided corresponding to the large number of items to be set. However, in performing a setting work, operability for the user is further enhanced when only necessary operation switches 124 are made effective.

Here, functions allocated to the operation switch 124 can be varied and, at the same time, the operation function information 122 on the operation switch 124 is projected in the vicinity of the operation switch 124 in order to inform the user of the operation function information 122.

The user can operate the operation switch 124 while looking at the projected operation function information 122 and hence, a large number of functions can be allocated to a small number of operation switches 124 thus reducing a cost of the image display device 110.

Figure 38:
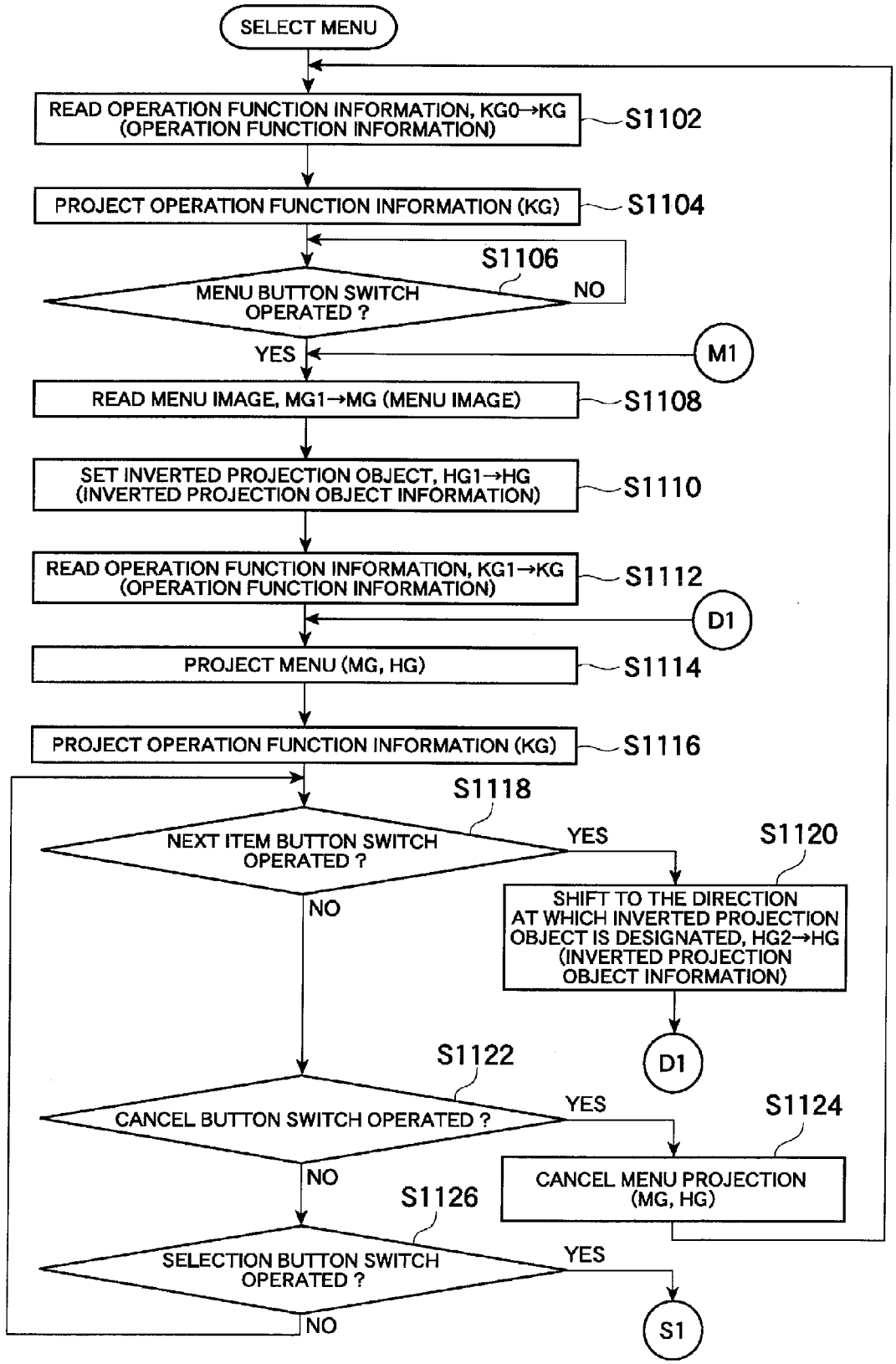
FIG. 38 is a flowchart for executing menu projection processing.
Figure 43:
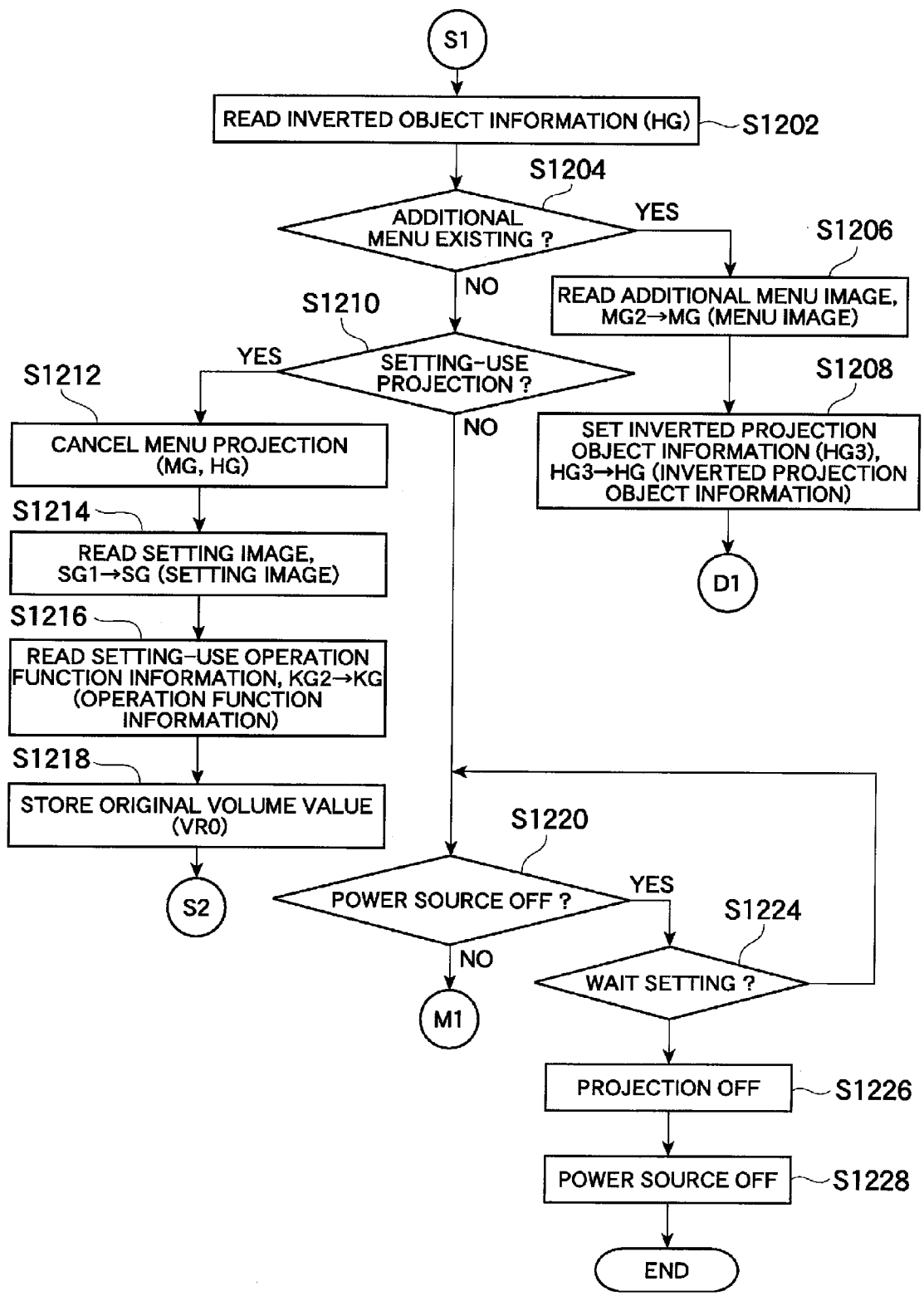
FIG. 43 is a flowchart of processing executed after the selection of an inverted object in menu projection processing shown in FIG. 38.
Figure 45:
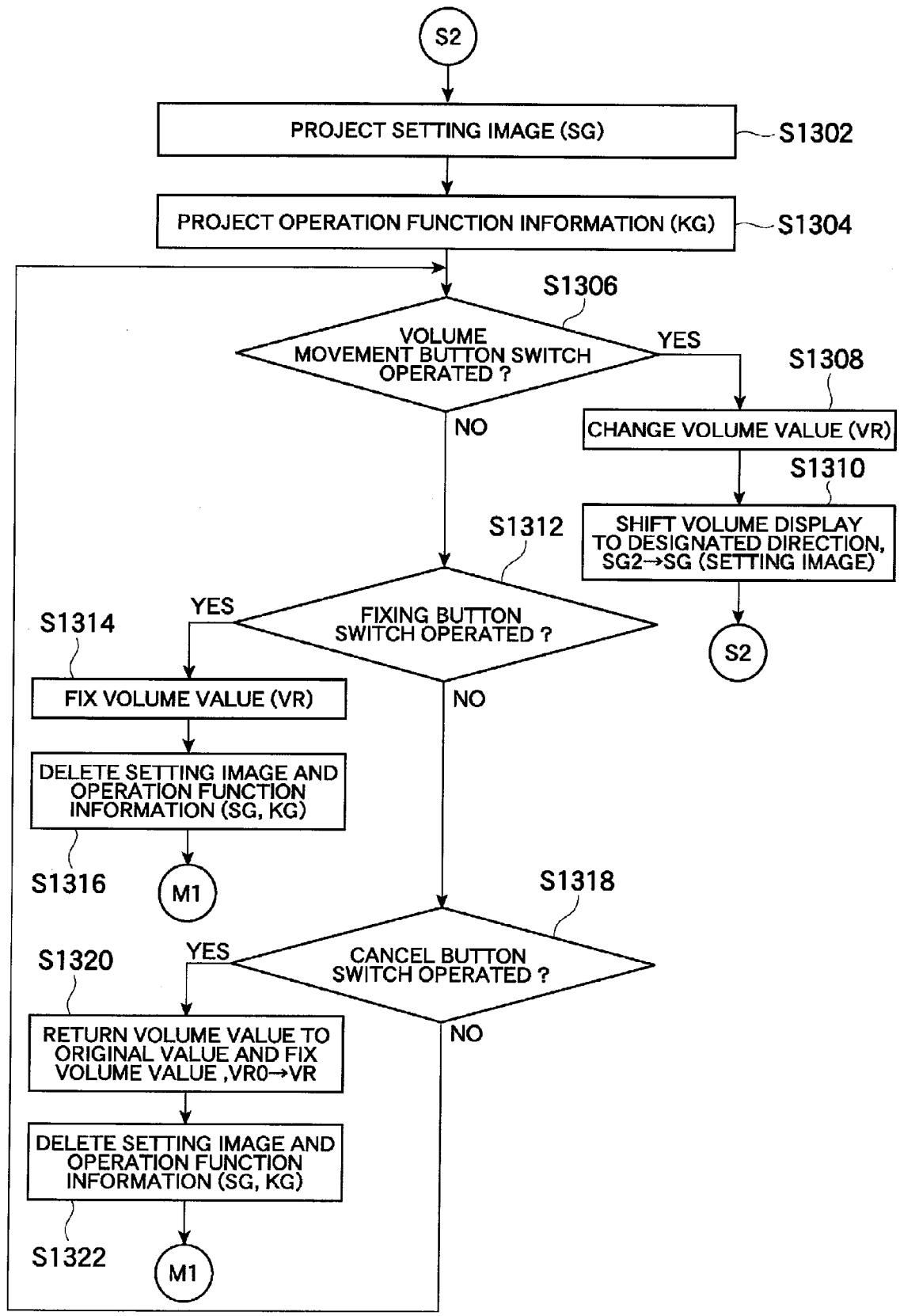

The explanation is made with respect to processing, in allocating various functions to the operation switches 124, for projecting the operation function information 122 corresponding to the allocated functions in conjunction with flowcharts shown in FIG. 38, FIG. 43 and FIG. 45.

FIG. 38 is a flowchart for executing menu projection processing. When the image display device 110 shown in FIG. 28 is started, the processing executed by the information processing unit 180 advances to step S1102 "read operation function information". In S1102, the information processing unit 180 reads data (KG0) for projecting the operation function information in an initial state from an ROM 183, generates information including operation function information which corresponds to the video signal, and substitutes the generated information for the operation function information (KG). In next step S1104 "project operation function information", the information processing unit 180 outputs the operation function information (KG) to the projection driver 164 and, at the same time, outputs an instruction to the projection driver 164 to perform the synthesized projection.

Figure 39:
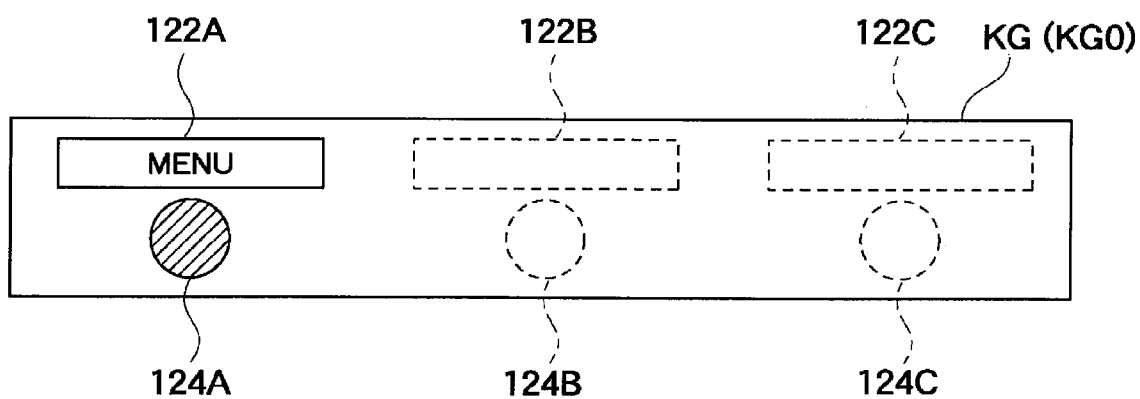
FIG. 39 is a view showing a projection example of operation function information.

The projection driver 164 synthesizes the operation function information (KG) acquired from the information processing unit 180 to the video signal such as the RGB signal acquired from the computer device 800 in the vicinity of the operation switch 124 or replaces the operation function information (KG) with the video signal, and outputs a drive signal to the light modulation unit 162. Then, the projection part 165 projects the projection light 112 generated by synthesizing the operation function information (KG) to the video signal such as the RGB signal acquired by the computer device 800 in the vicinity of the operation switch 124. FIG. 39 shows a projection example of the operation function information (KG=KG0).

In the projection example of the operation function information (KG=KG0) shown in FIG. 39, a state in which a function of projecting "menu" on setting of the image 113 is allocated to the operation switch 124A is described. Accordingly, in the vicinity of the operation switch 124A, "menu" is projected as the operation function information 122A. No functions are allocated to operation switches 124B, 124C and hence, neither operation function information 122B nor 122C is displayed. Here, the switch identification display for showing the presence of the operation switch 124A may be performed only at the operation switch 124A to which the function is allocated.

In next step S1106 "menu button switch operated?", the information processing unit 180 executes processing for waiting an operation by a user of the operation switch 124A to which a function of a menu button switch is allocated. When the user operates the operation switch 124A, the information processing unit 180 reads the information that the operation switch 124A is operated via a received light information processing unit 178 or an input interface 171. Then, the processing executed by the information processing unit 180 advances to next S1108 "read menu image".

In step S1108, the information processing unit 180 reads data (MG1) for displaying "menu" on setting of the image 113 from the ROM 183, generates information including the menu which corresponds to the video signal, and stores the generated information in the RAM 181.

In next step S1110 "set inverted projection object", the information processing unit 180 reads an item (HG1) "the inverted projection object" for instructing the items to beset, and stores the read item in the RAM 181 as an inverted projection object (HG).

In next step S1112 "read operation function information", the information processing unit 180 reads data (KG1) for projecting operation function information at the time of projecting the menu image from the ROM 183, generates information including operation function information which corresponds to the video signal, substitutes the generated information for the operation function information (KG), and stores the information in the RAM 181.

In next step S1114 "project menu", the information processing unit 180 designates and outputs the menu image (MG) and an inverted projection object (HG) in the menu image (MG) to the projection driver 164 and at the same time, outputs the instruction of synthesized projection.

Figure 40:
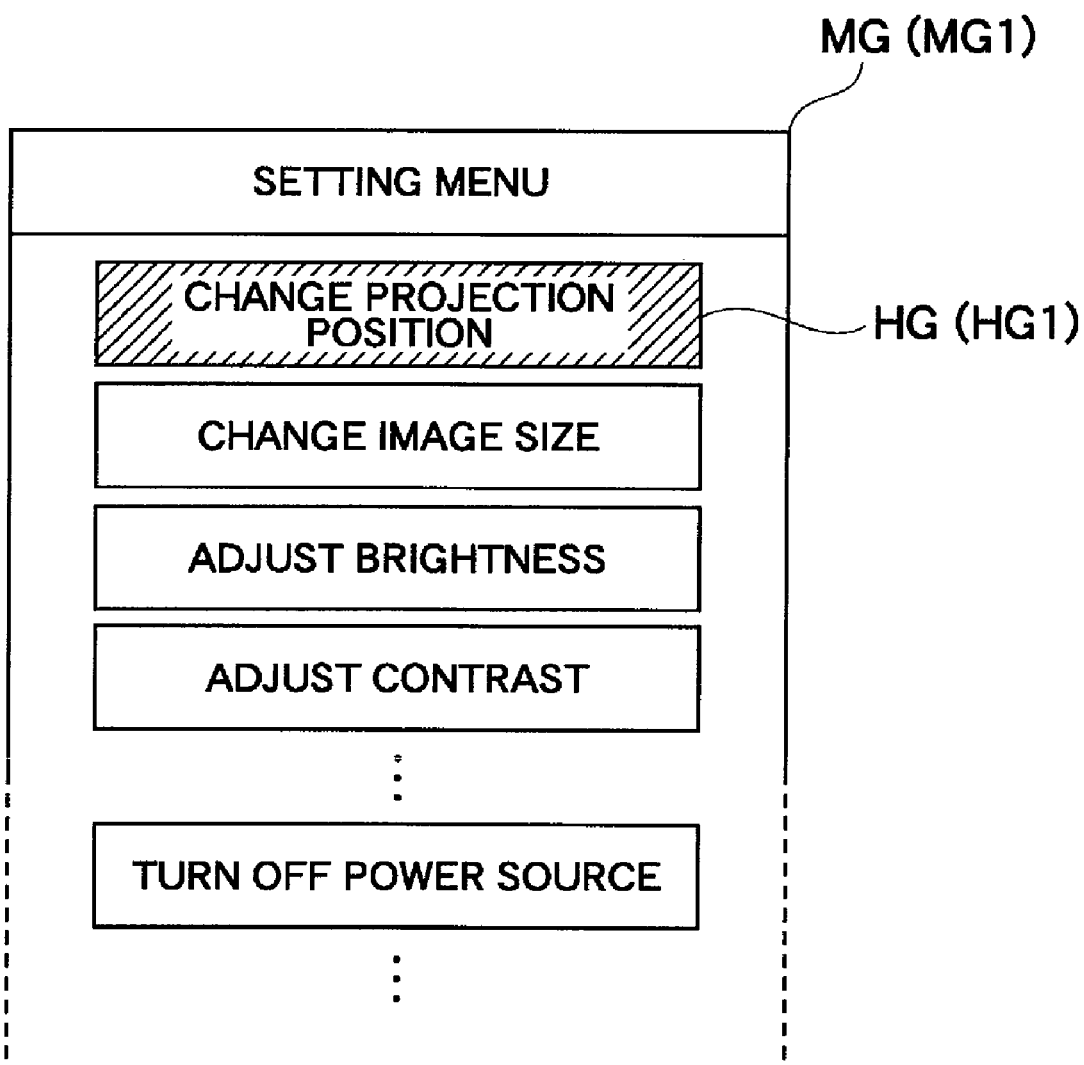
FIG. 40 is a view showing a menu image and a projection example of inverted projection object information in the menu image.

The projection driver 164 synthesizes menu image (MG) acquired from the information processing unit 180 and the inverted projection object (HG) of the menu image (MG) to the video signal such as the RGB signal acquired from the computer device 800 or replaces the menu image (MG) with the video signal, and outputs a drive signal to the light modulation unit 162. Then, the projection part 165 synthesizes and replaces the menu image (MG) with the video signals such as the RGB signals acquired from the computer device 800 and, at the same time, performs inverted projection processing such as projection using complementary color with respect to an inverted projection object (HG) in the menu image. FIG. 40 shows a projection example of the menu image (MG=MG1) and the inverted projection object (HG) of the menu image.

Next, the explanation is made with respect to the projection example of the operation function information in a state that the menu image (MG) is projected.

In next step S1116 "project operation function information", the information processing unit 180 outputs operation function information (KG) to the projection driver 164 and, at the same time, outputs an instruction of synthesized projection. The projection driver 164 synthesizes the menu image (MG) with the video signal such as the RGB signal acquired from the computer device 800 or replaces the menu image (MG) with the video signal, and designates the inverted projection object (HG) of the menu image. Further, the projection driver 164 synthesizes the operation function information (KG) to the vicinity of the operation switch 124 or replaces the operation function information (KG) with the operation function information (KG), and outputs a drive signal to the light modulation unit 162.

Figure 41:
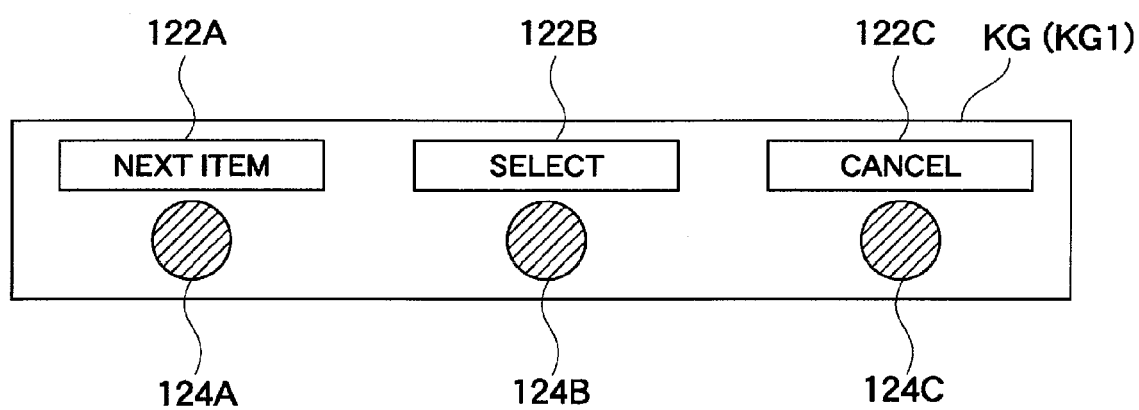
FIG. 41 is a view showing a projection example of operation function information projected together with the menu image shown in FIG. 40.

Then, the projection part 165 synthesizes the menu image (MG) with the video signals such as the RGB signals acquired from the computer device 800 or replaces the menu image (MG) with the video signal, and performs inverted projection processing such as projection using complementary color to the inverted projection object (HG) of the menu image. At the same time, the projection part 165 projects the projection light 112 generated by synthesizing the operation function information (KG) with the video signal in the vicinity of the operation switch 124. FIG. 41 shows a projection example of the operation function information (KG=KG1) projected together with the menu image (MG=MG1) shown in FIG. 40.

As shown in FIG. 41, a function which allows the inverted projection object information (HG) to move to the next item is allocated to the operation switch 124A and hence, "next item" is projected as the operation function information 122A. In FIG. 41, for example, although the item "change projection position" is inversely projected (in FIG. 40, the item is projected in a meshed manner), when the user operates the operation switch 124A, the inverted projection moves to the projected item "change image size" projected below the operation switch 124A.

On the other hand, a function of selecting the item "inverted projection object information (HG)" is allocated to the operation switch 124B and hence, an operation switch 124B projects "selection" as operation function information 122B. When the user operates the operation switch 124B in a state shown in FIG. 41, processing of the inversely projected item "change projection position" is selected, and the user can change the projection position.

On the other hand, a function of canceling an operation of setting of the image 113 is allocated to the operation switch 124C and hence, "cancel" is projected as the operation function information 122C. When the user operates the operation switch 124C in a state shown in FIG. 41, the projection of the menu image (MG) shown in FIG. 40 is canceled and, at the same time, processing for making the projection of the operation function information (KG) return to a content shown in FIG. 39 is executed. These processing are executed by carrying out steps S1118 to S1126 shown in FIG. 38, and the explanation of these steps is made herein after.

In step S1118 "next item button switch operated?", the information processing unit 180 determines whether or not the operation switch 124A to which the function which allows the inverted projection object information (HG) to move to next item is allocated is operated by the user. When it is determined that the operation switch 124A is operated by the user, the processing which is executed by the information processing unit 180 is branched to step S1120 "shift in the direction at which inverted projection object is designated". Further, in step S1118, when it is determined that the operation switch 124A is not operated by the user, the processing advances to a determination step S1122 "cancel button switch operated?".

Figure 42:
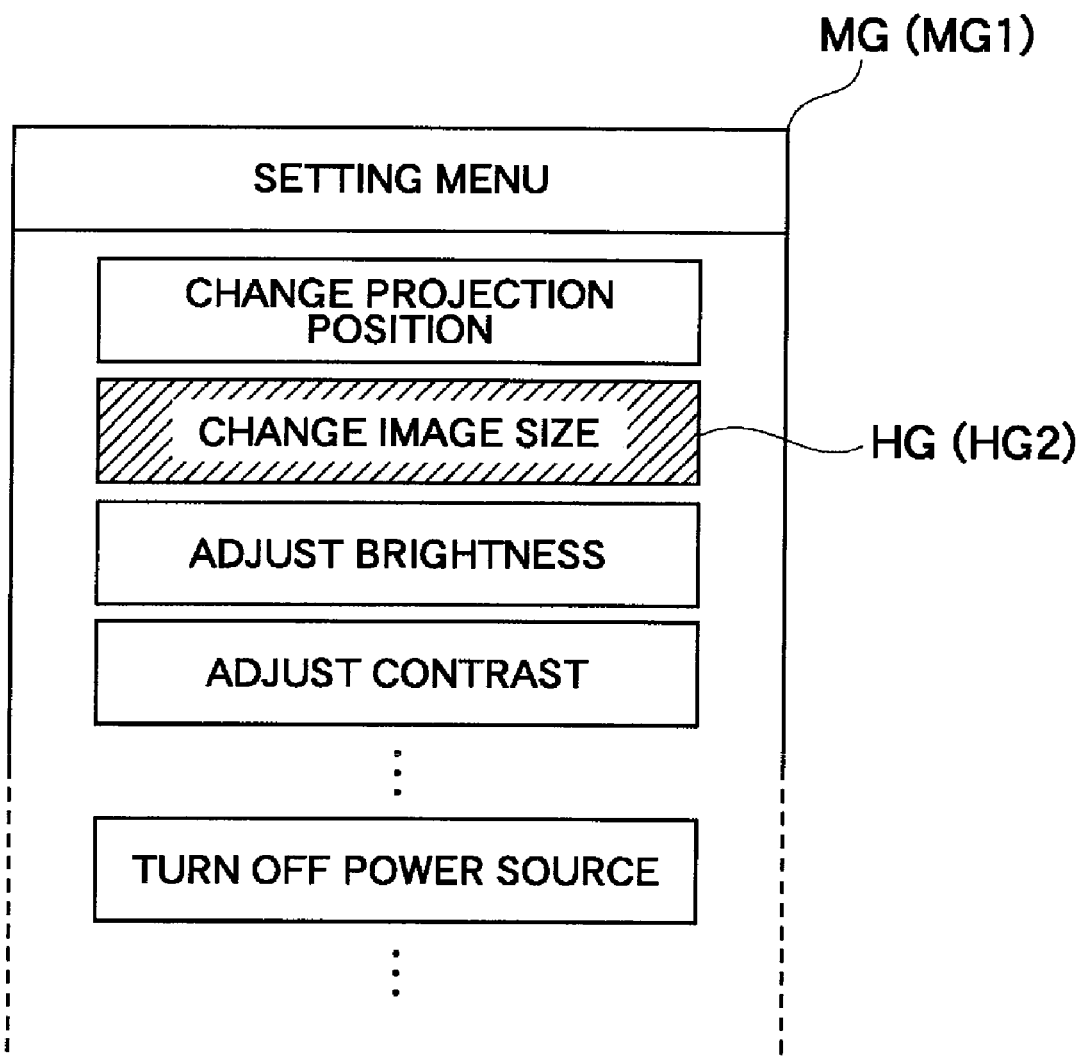
FIG. 42 is a view showing a menu image and a projection example of inverted projection object information in the menu image.

In step S1120, the information processing unit 180 reads the next item of the inverted projection object (HG2) for instructing a setting item, and stores the read item to the RAM 181 as the inverted projection object (HG). The processing returns to step S1114, and the information processing unit 180 instructs the projection driver 164 to perform the projection of menu and the projection of operation function information. Then, the menu image (MG=MG1) shown in FIG. 42 and inverted projection object information (HG=HG2) of the menu image are projected.

On the other hand, in step S1122, the information processing unit 180 determines whether or not a cancel button switch is operated. When it is determined that the cancel button switch is operated, the processing is branched to step S1124 "cancel menu projection". When it is determined that the cancel button switch is not operated, the processing advances to the determination step S1126 "selection button switch operated?".

In step S1124, the information processing unit 180 instructs the projection driver 164 to cancel the projection of the menu image (MG) projected in step S1114. Then, the projection driver 164 projects the projection light 112 generated by synthesizing only the operation function information (KG) with the video signal such as the RGB signal acquired from the computer device 800. When the processing in step S1124 is finished, the processing executed by the information processing unit 180 returns to S1102, and the projection driver 164 performs the projection of the operation function information (KG=KG0) in an initial state.

On the other hand, in step S1126, the information processing unit 180 determines whether or not the selection button switch is operated. When it is determined that the selection button switch is operated, the processing is branched to step S1202 "read inverted information" shown in FIG. 43. When it is determined that the selection button switch is not operated, the processing returns to step S1118, and waits inputting by the user.

Next, the processing executed when the selection button switch is operated is explained in conjunction with FIG. 43. In an example shown in FIG. 41, a function of a selection button switch is allocated to the operation switch 124B.

In step S1202, the information processing unit 180 executes processing for reading the currently inverted object information (HG) from the RAM 181 and, at the same time, executes processing for reading information on the presence or the non-presence of additional menu associated with the currently inverted object (HG), or information on the presence or the non-presence of setting-use projection from the ROM 183. Then, the processing advances to the next determination step S1204 "additional menu present?".

In step S1204, the information processing unit determines whether or not the additional menu associated with selected inverted object information is present based on the information read in step S1202. When it is determined that the additional menu associated with the selected inverted object information is present, the processing is branched to step S1206 "read additional menu image", and the lower hierarchical processing is executed, that is, projection processing of the menu image is executed. When it is determined that the additional menu is not present, the processing advances to the next determination step S1210 "setting-use projection?".

In step S1206, the information processing unit 180 reads data (MG2) for displaying "additional menu" on setting of the image 113 from the ROM 183, generates information including a menu which corresponds to the video signal, and stores the generated information in the RAM 181.

Figure 44:
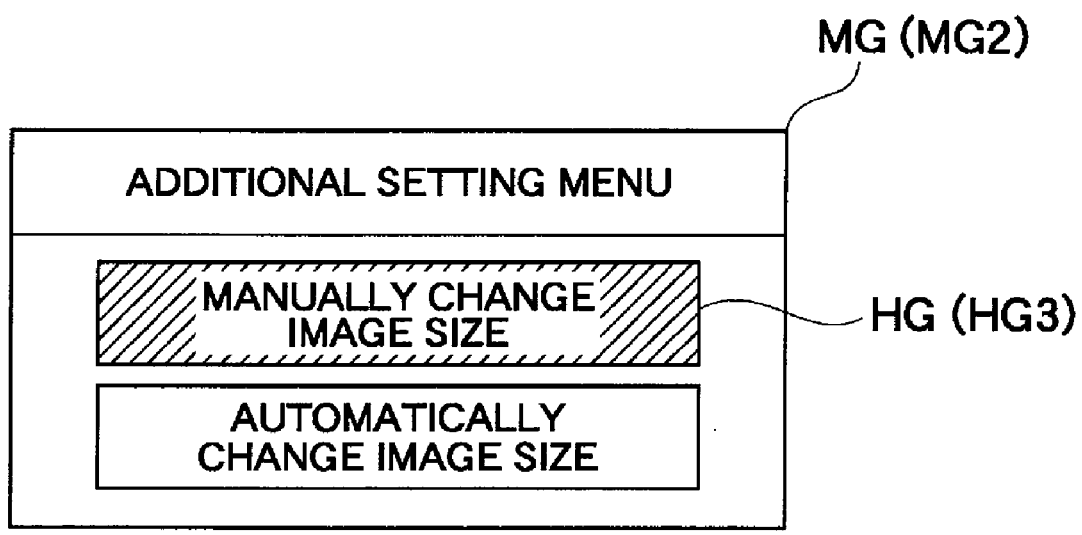
FIG. 44 is a view showing a projection example of an additional menu image.

In next step S1208 "set inverted projection object", the information processing unit 180 reads an item of the inverted projection object (HG3) of the additional menu for instructing the setting item from the ROM 183, and stores the read item in the RAM 181 as the inverted projection object (HG). Thereafter, the processing returns to S1114 shown in FIG. 38, and the information processing unit 180 designates and outputs the additional menu image (MG) and the inverted projection object (HG) of the additional menu image (MG) to the projection driver 164 and, at the same time, instructs the projection driver 164 to perform the synthesized projection. FIG. 44 shows a projection example of the additional menu image (MG) projected in this manner.

In the embodiment shown in FIG. 44, as the additional menu of the setting item "change image size", two kinds of items "manually change image size" and "automatically change image size" are projected, wherein the item "manually change image size" is inversely projected (in FIG. 44, the item is projected in a meshed manner).

On the other hand, in step S1210, the information processing unit determines whether or not the selected inverted object information is projected for setting based on the information read in step S1202. When it is determined that the inverted object information is projected for setting, the processing is branched to step S1212 "cancel menu projection". When it is determined that the inverted object information is not projected for setting, the processing advances to the next determination step S1220 "power source OFF?".

In step S1212, the information processing unit 180 instructs the projection driver 164 to cancel the projection of the menu image (MG) projected in step S1114. Then, the projection driver 164 projects the projection light 112 generated by synthesizing only the operation function information (KG) with the video signals such as the RGB signals acquired from the computer device 800. When the processing in S1212 is finished, the processing advances to next step S1214 "read setting-use image".

In step S1214, the information processing unit 180 reads data (SG1) for displaying "setting-use image" on setting of the image 113 from the ROM 183, generates information of the set image (SG) corresponding to a setting-use video signal, and stores the generated information in the RAM 181.

In next step S1216 "read setting-use operation function information", the information processing unit 180 reads data (KG2) for projecting operation function information at the time of projecting the set image from the ROM 183, generates information including operation function information which corresponds to the video signal, substitutes the generated information for the operation function information (KG), and stores the information in the RAM 181.

In next step S1218 "store original volume value", the information processing unit 180 executes the processing for storing an original volume value (VR0) before setting in the RAM 181. The original volume value is a value which is explained herein after, for example.

When the user selects "change image size" in the setting menu for changing the image size, a set value of the image size before changing substitutes for a volume value (VR0). When storing processing of the original volume value (VR0) is finished, the processing advances to step S1302 "project set image" shown in FIG. 45.

FIG. 45 is a flowchart for explaining processing for projecting an image for setting a projection position of the image 113, an image size, brightness and the like.

In step S1302, the information processing unit 180 reads the setting-use image (SG) stored in the RAM 181 in S1214 and outputs the read setting-use image to the projection driver 164 and, at the same time, instructs the projection driver 164 to perform the synthesized projection.

The projection driver 164 synthesizes the set image (SG) acquired from the information processing unit 180 with the video signal such as the RGB signal acquired from the computer device 800 or replaces the set image (SG) with the video signal, and outputs a drive signal to the light modulation unit 162. Then, the projection part 165 projects the projection light 112 generated by synthesizing the set image (SG) with the video signal such as the RGB signal acquired from the computer device 800 or replacing the set image (SG) with the video signal.

Figure 46:
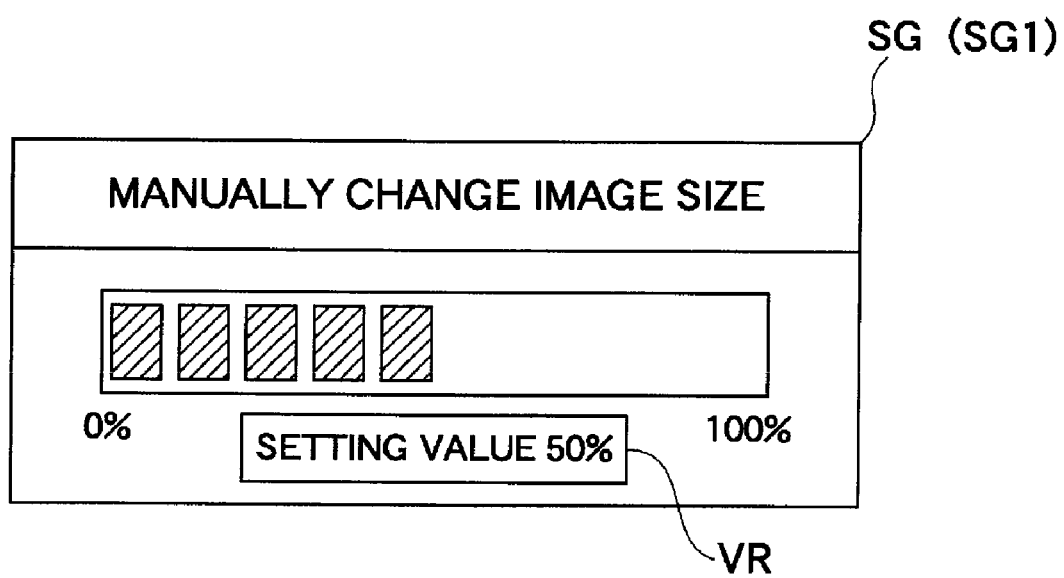
FIG. 46 is a view showing a projection example of a setting image used for manually changing an image size.

FIG. 46 shows a projection example of the set image (SG). FIG. 46 shows a projection example of the set image (SG) used for manually changing an image size. The example shown in FIG. 46 shows a state that, as a set value of the original image size before change, the volume value (VR0) of 50% is set, and five volume displays indicative of the volume value of 50% are performed.

Next, the explanation is made with respect to a projection example of the operation function information in a state that the setting-use image (SG) is projected.

In S1304 "project operation function information" shown in FIG. 45, the information processing unit 180 reads the operation function information (KG) stored in the RAM 181 in step S1216 and outputs the read information to the projection driver 164 and, at the same time, instructs the projection driver 164 to perform the synthesized projection.

Figure 47:
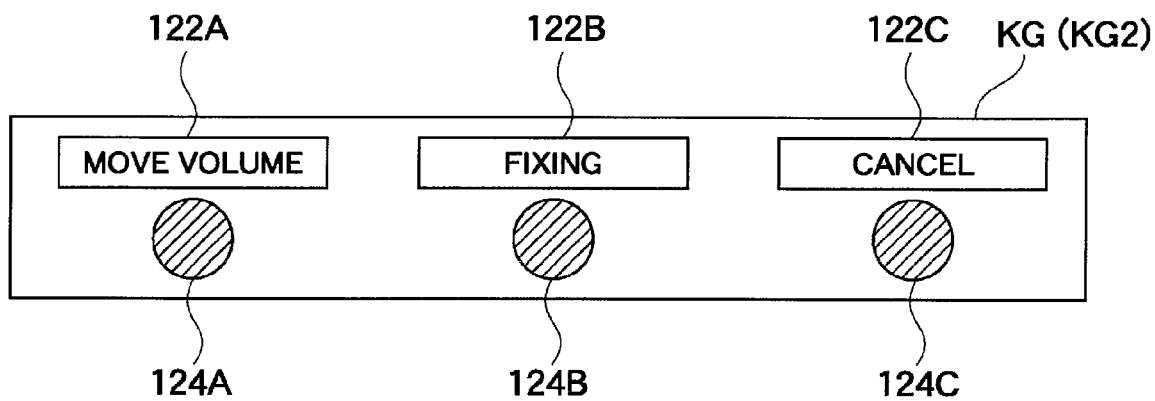
FIG. 47 is a view showing a projection example of operation function information projected together with the setting image shown in FIG. 46.

The projection driver 164 synthesizes the operation function information (KG) with the video signal such as the RGB signal acquired from the computer device 800 in the vicinity of the operation switch 124 or replaces the operation function information (KG) with the video signal, and outputs a drive signal to the light modulation unit 162. Then, the projection part 165 projects the projection light 112 generated by synthesizing the menu image (MG) with the video signal such as the RGB signal acquired from the computer device 800 or replacing the menu image (MG) with the video signal, and synthesizing the operation function information (KG) with the video signal in the vicinity of the operation switch 124. FIG. 47 shows a projection example of operation function information (KG=KG2) projected together with the set image (SG=SG1) shown in FIG. 46.

Figure 48:
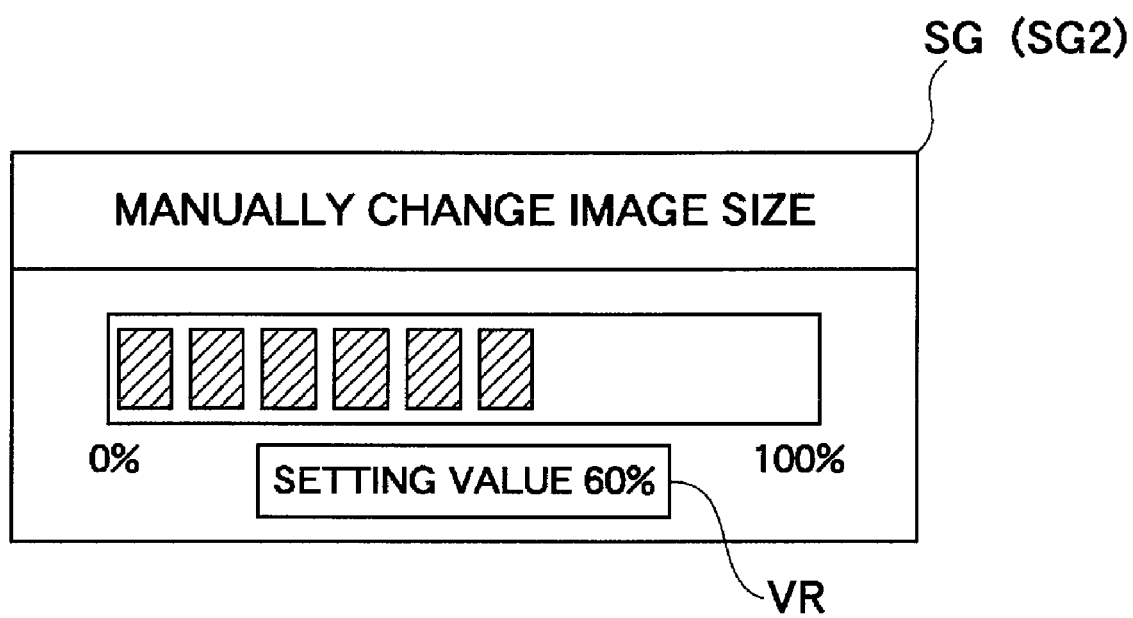
FIG. 48 is a view showing a projection example of a setting image.

As shown in FIG. 47, a function which allows the volume display to move is allocated to the operation switch 124A and hence, "move volume" is projected as the operation function information 122A. When the user operates the operation switch 124A in a state shown in FIG. 46 that the set image (SG) is projected, for example, the volume display is moved and, at the same time, the volume value (VR1) of 60% can be set as shown in FIG. 48. These processing are executed by carrying out steps S1308 to S1310 shown in FIG. 45.

Further, in an example shown in FIG. 47, a function of fixing a volume value at a currently-set volume value is allocated to the operation switch 124B and hence, "fixing" is projected as the operation function information 122B. When the user operates the operation switch 124B in a state shown in FIG. 47, the volume value which is currently projected is determined, and the value is set as the volume value. These processing are executed by carrying out steps S1314 to S1316 shown in FIG. 45.

Further, a function of cancelling the operation on setting of the image 113 is allocated to the operation switch 124C and hence, "cancel" is projected as the operation function information 122C. When the user operates the operation switch 124C in a state shown in FIG. 47, the volume value which is currently projected is canceled, and the processing for making the volume value return to the original volume value shown in FIG. 46 is executed. These processing are executed by carrying out steps S1320 to S1322 shown in FIG. 45.

Hereinafter, the explanation is made with respect to the processing executed when the operation switches 124A to 124C are operated by the user.

In step S1306 "volume movement button switch operated?" shown in FIG. 45, the information processing unit 180 determines whether or not the operation switch 124A to which a function of changing the volume value (VR) is allocated is operated by the user. When it is determined that the operation switch 124A is operated by the user, the processing which is executed by the information processing unit 180 is branched to step S1308 "change volume value". Further, when it is determined that the operation switch 124A is not operated by the user in step S1306, the processing advances to a determination step S1312 "fixing button switch operated?".

In step S1308, the information processing unit 180 reads the current volume value (VR) from the RAM 181, executes processing for adding a predetermined volume value to the current volume value (VR) or subtracting a predetermined volume value from the current volume value (VR), and executes processing for storing the acquired value as a new volume value in the RAM 181.

Then, in the next step S1310 "shift volume display in the designated direction", the information processing unit 180 generates a video signal (SG2) for shifting the volume display in the designated direction, and instructs the projection driver 164 to project the video signal (SG2) as the set image (SG). Then, the set image (SG=SG2) shown in FIG. 48 is projected. The example shown in FIG. 48 shows a state that, as a set value of the image size after change, the volume value (VR) of 60% is set, and six volume displays indicative of the volume value of 60% are performed.

On the other hand, in step S1312, the information processing unit 180 determines whether or not the fixing button switch is operated. When it is determined that the fixing button switch is operated, the processing is branched to step S1314 "fix volume value". When it is determined that the fixing button switch is not operated in step S1312, the processing advances to the next determination step S1318 "cancel button switch operated?".

In step S1314, the information processing unit 180 executes the processing which fixes the volume value (VR) to the currently-set volume value, and changes the setting of the image 113. When the image size is manually changed, for example, the information processing unit 180 executes the processing for outputting the instruction for changing the image size to a currently-set image size corresponding to the volume value (VR) to the projection driver 164.

In next step S1316 "delete set image and operation function information", the information processing unit 180 instructs the projection driver 164 to cancel the projection of the setting-use image (SG) and the operation function information (KG) projected in step S1302 and step S1304. Then, the projection driver 164 projects the projection light 112 generated using the video signal such as the RGB signal acquired from the computer device 800. When the processing in step S1316 is finished, the processing returns to step S1108 shown in FIG. 38, and projects the menu image (MG) and the operation function information (KG) corresponding to the menu image (MG).

On the other hand, in step S1318, the information processing unit 180 determines whether or not the cancel button switch is operated. When it is determined that the cancel button switch is operated, the processing is branched to step S1320 "return volume value to the original value and fix the volume value". When it is determined that the cancel button switch is not operated, the processing returns to S1306, and executes processing for waiting the selection button switch to be operated by the user.

In step S1320, the information processing unit 180 executes the processing which cancels the currently-set volume value (VR), reads the original volume value (VR0) stored in the RAM 181 and fixes the volume value, and returns the setting of the image 113 to the original setting. When the image size is manually changed, for example, the information processing unit 180 outputs the instruction for returning the image size to the original image size before setting corresponding to the volume value (VR0) to the projection driver 164.

In next step S1322, the information processing unit 180 instructs the projection driver 164 to cancel the projection of the setting-use image (SG) and the operation function information (KG) projected in S1302 and S1304. Then, the projection driver 164 projects the projection light 112 generated using the video signal such as the RGB signal acquired from the computer device 800. When the processing in S1316 is finished, the processing returns to S1108 shown in FIG. 38, and projects the menu image (MG) and the operation function information (KG) corresponding to the menu image (MG).

By making a function allocated to the operation switch 124 variable and, at the same time, by projecting the operation function information 122 of the operation switch 124 in the vicinity of the operation switch 124 as described above, it is possible to easily set a projection position of the image 113, a size of the image to be projected, brightness, contrast, gamma, color temperature, tone, sharpness, a horizontal position, a vertical position, projection of a help-image, setting of a projection language, setting of a projection time, projection of a menu-image, a selection switch, a power source switch or the like.

Next+, a varying mechanism capable of changing a height of the projection part in the image display device is explained.

Figure 49:
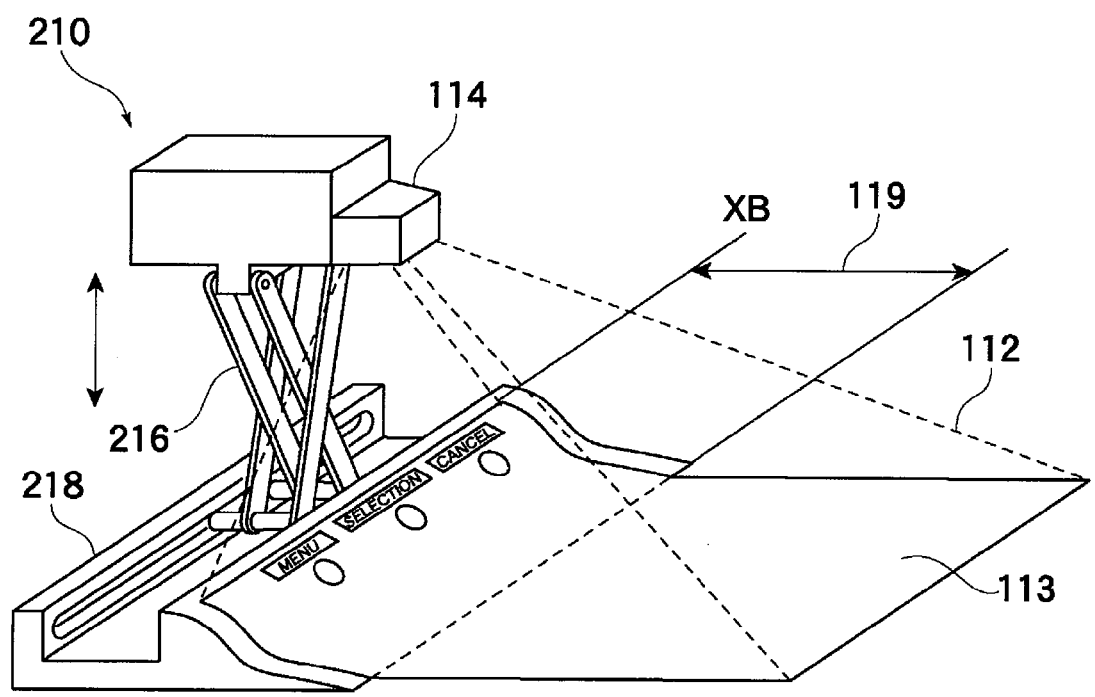
FIG. 49 is a view showing an embodiment of an image display device provided with a bearing mechanism for changing a height of a projection portion.

FIG. 49 shows an embodiment of an image display device 210 which includes a varying mechanism capable of changing the height of the projection part 114 relative to a pedestal 218 in place of the support column 116 of the image display device 110 shown in FIG. 28.

As shown in FIG. 49, the projection part 114 of the image display device 210 receives inputting of a video signal such as an RGB signal from a computer device, generates a projection light 112 based on the inputted video signal, and projects the projection light to a table.

In this manner, in the image display device 210 of this embodiment, the projection part 114 is vertically movably mounted on the pedestal 218 in an erected manner using a pantograph-type varying mechanism 216. Accordingly the height of the projection part 114 can be changed and hence, the height of the projection part 114 relative to the pedestal 218 is lowered at the time of housing the image display device 210 so that the image display device 210 can be housed in a compact manner.

Further, as shown in FIG. 49, with the provision of the varying mechanism capable of changing the height of the projection part 114 relative to the pedestal 218, it is possible to adjust a size of the image 113 to be projected. Here, as a varying mechanism which changes the height of the projection part 114 relative to the pedestal 218, a slide-type varying mechanism, an arm-type varying mechanism or the like can be used.

Further, by forming a projection region 119 where a portion of the image 113 can be formed by the projection light 112 on the pedestal 218, it is possible to mount the projection part 114 in an erected manner at a position closer to the center of gravity of the pedestal 218. Accordingly, the stability of the image display device 210 when the image display device 210 is mounted on a table is increased. Further, a projection angle of the projection light 112 is made to approximate a right angle and hence, the image display device 210 can form an image with small distortion.

Figure 50:
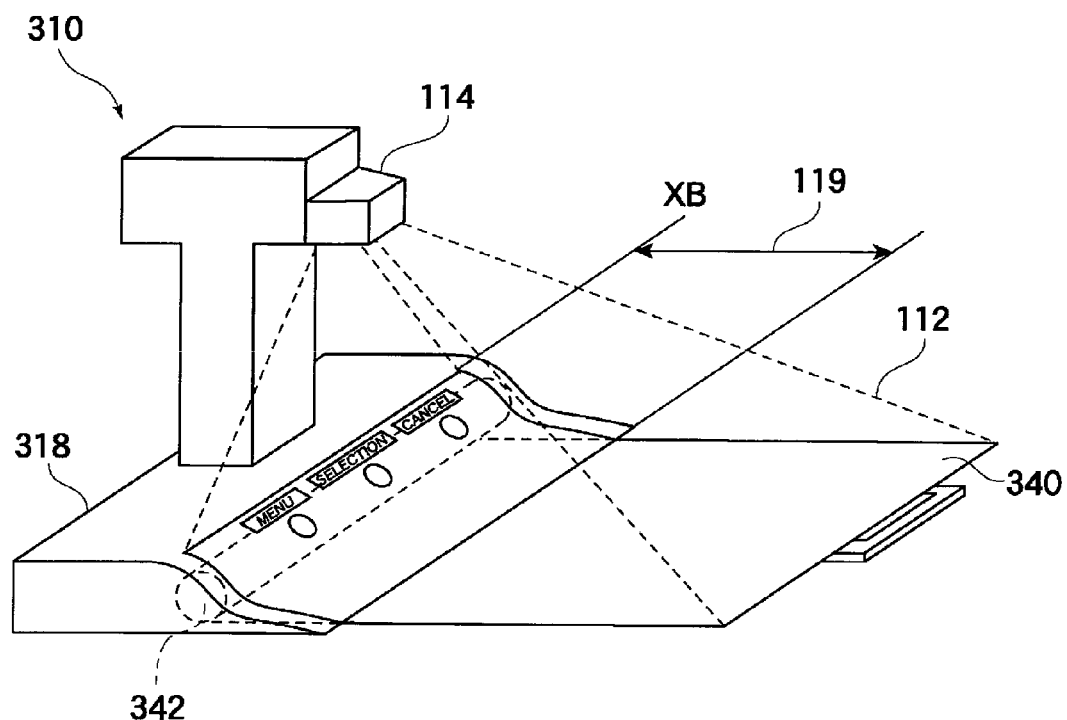
FIG. 50 is a view showing an embodiment of an image display device provided with a mechanism for accommodating a screen.

FIG. 50 is a view showing an embodiment of an image display device 310 having a mechanism for storing the screen 340 on the pedestal 118 of the image display device 110 shown in FIG. 28.

As shown in FIG. 50, a projection region 119 where a portion of an image can be formed by the projection light 112 is formed on the pedestal 318 of the image display device 310 and, at the same time, the pedestal 318 includes a winding-type storage mechanism 342 for storing the screen 340 in the inside thereof.

In this manner, the image display device 210 of this embodiment includes the winding-type storage mechanism 342 for storing the screen 340 in the inside of the pedestal 318 and hence, it is possible to store the screen 340 in the inside of the pedestal 318 in a compact manner. A position where the winding-type storage mechanism 342 is arranged is not limited to a lower portion of the projection region 119 as shown in FIG. 50. Here, by arranging the winding-type storage mechanism 342 below the projection region 119 or a photo detector in an overlapping manner, it is possible to make the pedestal 318 small-sized.

Further, by forming the projection region 119 on a portion of the pedestal 118, it is possible to mount the projection part 114 in an erected manner at a position closer to the center of gravity of a pedestal 318 and hence, stability of the image display device 310 when the image display device 310 is mounted on a table is increased. Further, it is possible to make the radiation angle of the projection light 112 to approximate a right angle and hence, the image with small distortion can be formed. Here, the storage mechanism of the screen 340 can be used in combination with a varying mechanism such as the pantograph-type varying mechanism 216 shown in FIG. 49.

Figure 51:
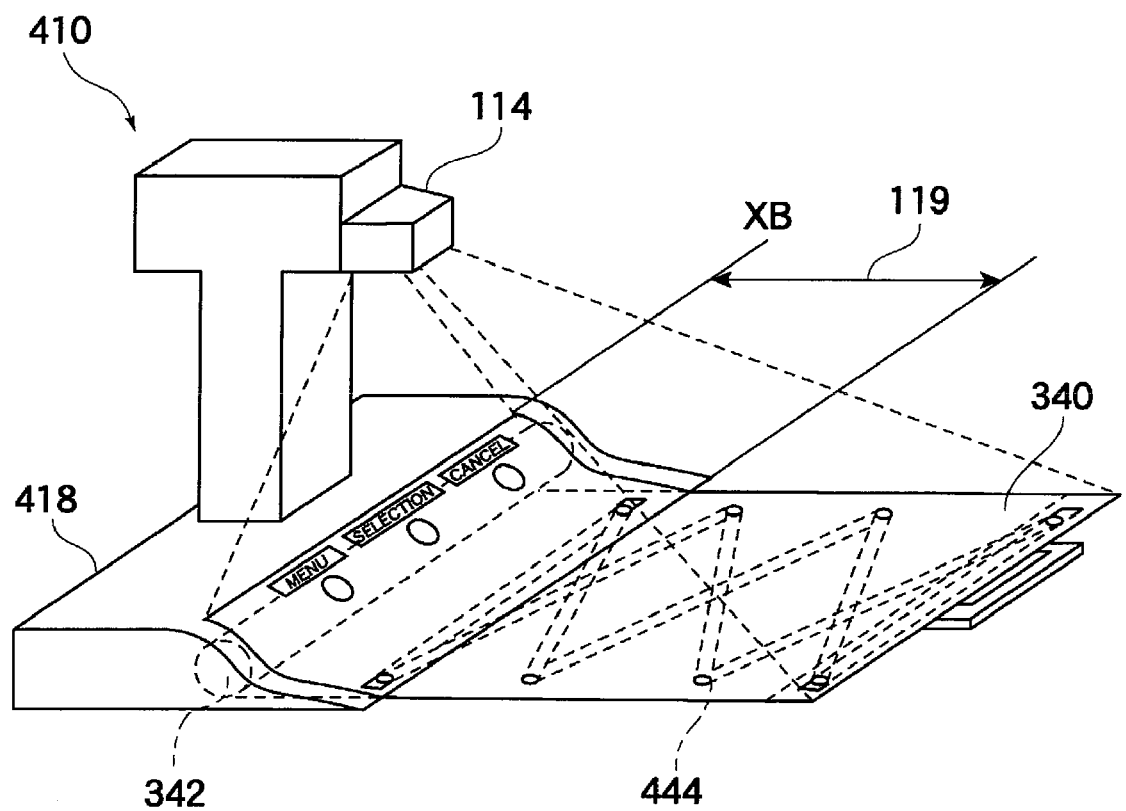
FIG. 51 is a view showing an embodiment of an image display device provided with a stylizing member for preventing an overturn of the image display device together with a mechanism for accommodating a screen.

FIG. 51 is a view showing an embodiment of an image display device 410 which is formed by mounting a stabilizing member for preventing falling of the image display device 410 on the pedestal 318 having a mechanism for storing a screen 340.

As shown in FIG. 51, the pedestal 418 of the image display device 410 includes a winding-type storage mechanism 342 for storing the screen 340 in the inside of the pedestal 418 and a pantograph type stabilizing member 444 for preventing the image display device 410 from falling thus increasing stability of the image display device 410 in use. By forming the pantograph-type stabilizing member 444 on a portion of the pedestal 418, it is possible to increase stability of the image display device 410 in use and, at the same time, the image display device 410 can be stored in a compact manner.

A position where the winding-type storage mechanism 342 is arranged and a position where the pantograph type stabilizing member 444 is arranged are not limited to positions below the projection region 119 shown in FIG. 51. However, by arranging the storing portion for storing the winding-type storage mechanism 342 and the pantograph type stabilizing member 444 below the projection region 119 or below the photo detector in an overlapping manner, the pedestal 418 can be miniaturized. Here, the storing portion for storing the pantograph type stabilizing member 444 may be arranged below the winding-type storage mechanism 342 in an overlapping manner.

Figure 52:
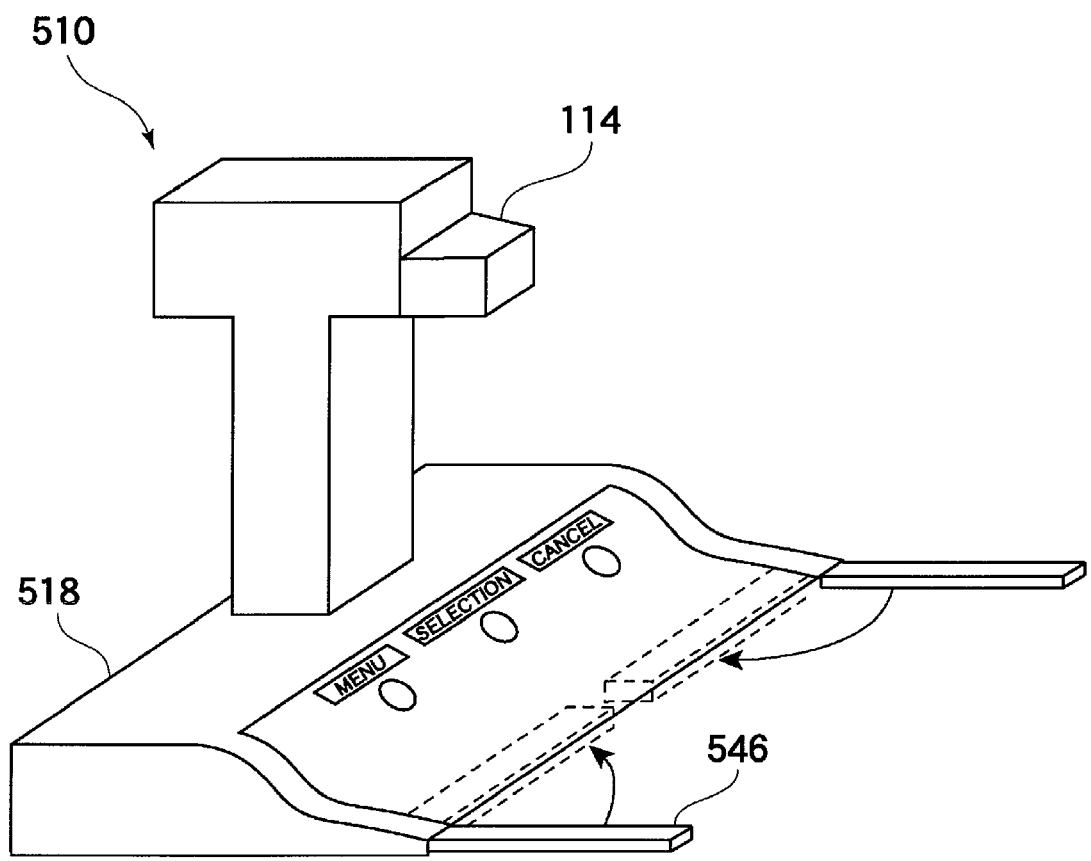
FIG. 52 is a view showing an embodiment of an image display device provided with a stylizing member for preventing an overturn of the image display device on a pedestal.

FIG. 52 is a view showing an embodiment of an image display device 510 which is formed by mounting a stabilizing member for preventing falling on a pedestal 118 of the image display device 110 shown in FIG. 28.

As shown in FIG. 52, the pedestal 518 of the image display device 510 includes a storable storing stabilizing member 546 for enhancing the stability of the image display device 510 in use thus preventing the falling of the image display device 510. By forming the storable stabilizing member 546 on the projection region of the pedestal 518, it is possible to store the image display device 510 in a compact manner while enhancing the stability of the image display device 510 in use. Further, in the inside of the pedestal 518, the winding-type storage mechanism 342 shown in FIG. 50 may be arranged in parallel.

In the example shown in FIG. 52, the stabilizing member 546 which is storable in the direction toward the center is mounted on both end portions of the pedestal 518. However, the mounting of the storable stabilizing member 546 is not limited to such a configuration and the storable stabilizing member 546 may be mounted on the center portion of the pedestal 518.

Fourth Embodiment

Figure 53:
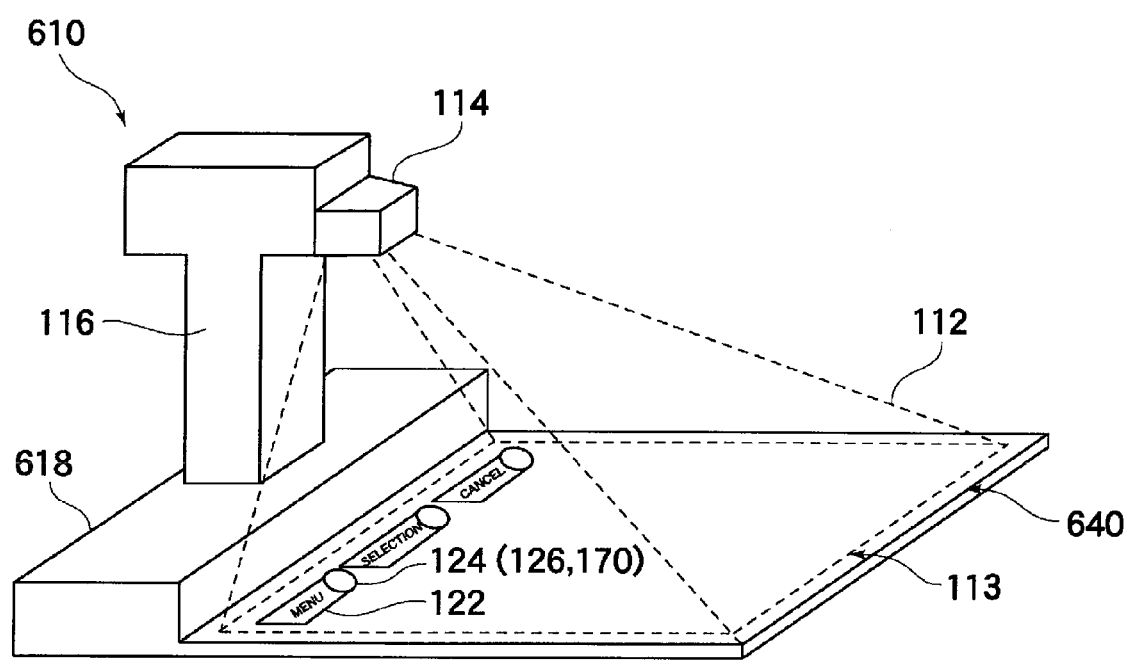
FIG. 53 is a view showing an embodiment of an image display device imparting a function of screen to a pedestal.

FIG. 53 is a view showing an embodiment of an image display device 610 which further enhances the stability of the image display device 610 by forming a fixed-type screen 640 to the pedestal portion of the image display device 110 shown in FIG. 28.

The image display device 610 includes a projection part 114 which generates projection light 112 in response to a video signal and projects an image on a screen 640, a support column 116 which supports the projection part 114, and a pedestal 618 which mounts the projection part 114 and the support column 116 thereon in an erected manner. The image display device 610 receives inputting of video signals such as RGB signal from a computer device not shown in the drawing, generates the projection light 112 based on the inputted video signal, and radiates the projection light 112 to the screen 640 mounted on the pedestal 618. By mounting the screen 640 which constitutes the projection region for forming the image 113 by the projection light 112, it is possible to make the radiate projection light 112 approximate a right angle. Accordingly, the image display device 610 can display the easily viewable image 113 with small distortion.

Further, by mounting the screen 640 on the pedestal 618, it is possible to ensure a large pedestal installation area on an image side. Accordingly, the projection part 114 and the support column 116 can be mounted in an erected manner close to the center of gravity of the pedestal 618 and hence, the image display device 610 can increase stability thereof when placed on a table thus preventing the falling of the image display device 610.

Further, as shown in FIG. 53, when a user performs an operation relating to the image 113, it is possible to mount the photo detector 126 on the pedestal 618 as an operation switch 124. In a state that the photo detector 126 is used as the operation switch 124, when the user extends his/her finger to a position above the photo detector 126 to block projection light 112 which the photo detector 126 receives, received light information which the photo detector 126 outputs is changed and hence, the image display device 610 can detect that the photo detector 126 is operated by the user.

Further, image display device 610 displays operation function information 122 which informs a user of a function allocated to the operation switch 124 on a portion of the image 113 thus enhancing the easy-to-use property enjoyed by the user. Further, to show the presence of the operation switch 124, a switch identification display which identifies a range of the operation switch 124 and a periphery of the range may be performed in a portion of the image 113. The switch identification display may be a display having complementary color or making high contrast against a background. Further, when a photo detector 126 is used as the operation switch 124, in the switch identification display, light having a wavelength which is not included in light having high brightness such as white light or a fluorescent lamp may preferably be projected.

The function and the manner of operation of the operation switch 124 are equal to the function and the manner of operation explained in conjunction with FIG. 28 and hence, the explanation of the function and the manner of operation of the operation switch 124 is omitted here. The operation switch 124 may be arranged outside the image 113. Further, in place of using the photo detector 126 as the operation switch 124, an input unit 170 (see FIG. 31) which is constituted of a push button switch or the like may be used.

Figure 54:
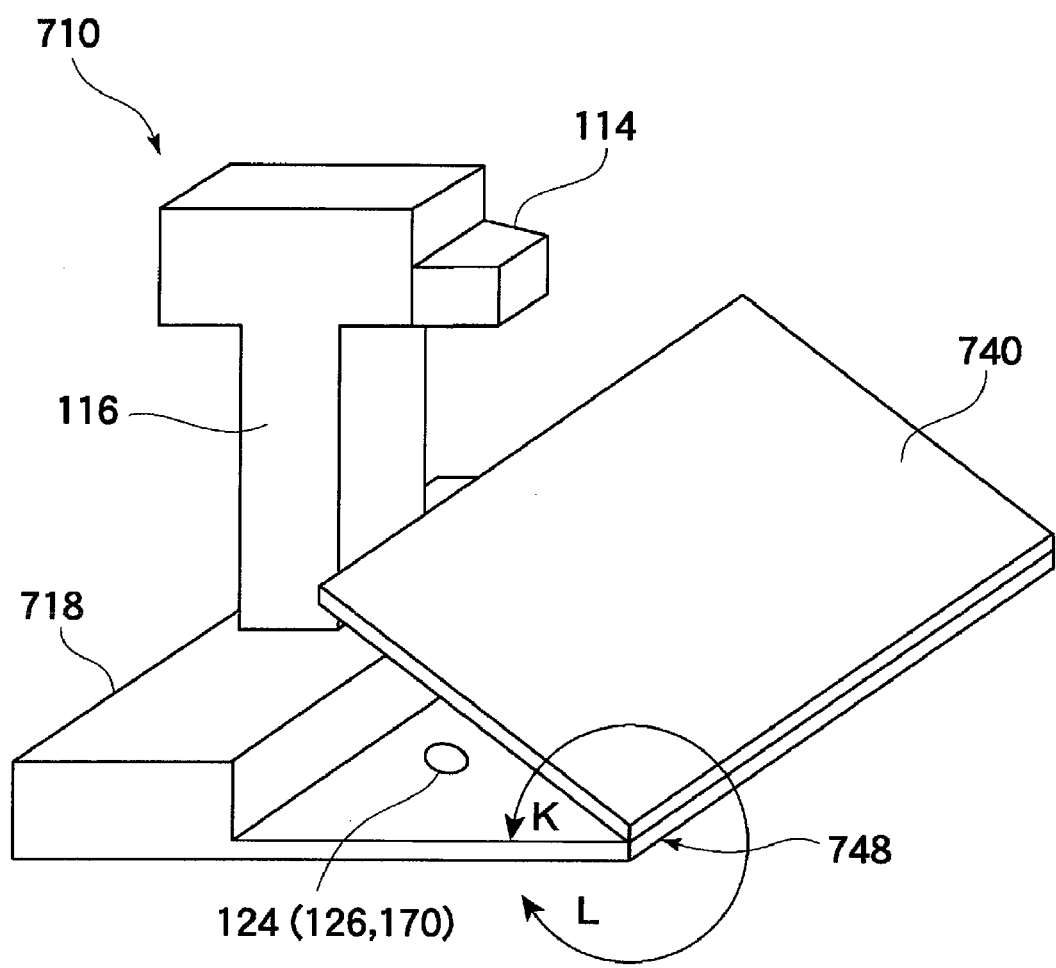
FIG. 54 is a view showing an embodiment of an image display device provided with a foldable screen on a pedestal.

FIG. 54 shows an embodiment of an image display device 710 provided with a foldable screen 740 on the pedestal 618 in the image display device 610 shown in FIG. 53.

As shown in FIG. 54, the image display device 710 mounts a screen on a pedestal 718 thereof, and includes a mechanism 748 such as a hinge which makes the screen 740 foldable. By providing the foldable screen 740 to the pedestal 718, the image display device 710 can easily store to image display device 710 while maintaining an image of high quality.

Further, the image display device 710 may be configured such that when the screen 740 is folded, the mechanical operation switch 124 is pushed down or when the screen 740 is folded, light received by the operation switch 124 constituted of the photo detector 126 is blocked so that upon detection of a state that the operation switch 124 is pushed down or a state that the light received by the operation switch 124 of the photo detector 126 is blocked, the supply of electricity to the image display device 710 is cut off. Further, upon detection of a state that the mechanical operation switch 124 is released or a state that the photo detector 126 receives light, electricity is supplied to the image display device 710. Due to such a constitution, by merely folding the screen 740, it is possible to automatically supply electricity to the image display device 710 or to cut off the supply of electricity to the image display device 710.

In the embodiment explained in conjunction with FIG. 54, the foldable mechanism 748 is provided at a portion of the center of the screen 740 and the folding-side screen 740 is foldable in the direction K so as to cover the operation switch 124. However, the folding-side screen 740 may be folded in the direction L opposite to the direction K. Further, the foldable mechanism 748 may be provided at a plurality of positions such that the screen can be folded like bellows thus enabling the storing of the image display device 710 in a compact shape.

Although the preferred embodiments of the present invention have been explained heretofore, the present invention is not limited to such specific embodiments and various modifications and variations are conceivable without departing from the gist of the present invention.

What is claimed is:

1. An image display device for projecting light on a projection surface to display an image on the projection surface, the image display device comprising:
   at least one processor;
   an aptitude detection part configured to detect an aptitude as the projection surface; and
   memory storing computer-readable instructions that, when executed, cause the at least one processor to function as:
      a projection control unit configured to control the projection light to allow the image to be displayed on the projection surface to fall within a predetermined projection region in response to a result of detection by the aptitude detection part; and
      a region selection part configured to select the projection region in response to the result of detection by the aptitude detection part,
   wherein the aptitude detection part is configured to detect, in a state where the projection region is formed of a mass of a plurality of divided regions, an aptitude value as the projection surface in each divided region,
   wherein the region selection part is configured to select, based on the aptitude values, one or more divided regions from the plurality of divided regions as the projection region, and
   wherein the projection control unit is configured to control the projection light to allow the image to be displayed on the projection surface to fall within the selected projection region,
   wherein the aptitude detection part is configured to detect, based on reflection waves of an electromagnetic wave or an ultrasonic wave radiated toward each divided region, at least one of a position of a reflection point of the electromagnetic wave or the ultrasonic wave and a surface shape of a reflection surface including the reflection point, and
   the aptitude detection part is configured to detect, based on at least the position of the reflection point or the surface shape of the reflection surface, the aptitude value of the corresponding divided region,
   wherein the aptitude detection part is configured to treat the projection region as a mass of three or more divided regions and is configured to detect the aptitude value based on at least the position of the reflection point, is configured to set positions determined based on the positions of one or more reflection points within the divided region as evaluation-use positions in the corresponding divided region, is configured to select three or more divided regions, and when the evaluation-use positions in the three or more selected divided regions are on one plane, is configured to detect the aptitude values determined as projection candidate regions with respect to three or more selected divided regions.

2. An image display device according to claim 1, wherein the region selection part is configured to determine one or more divided regions of the plurality of divided regions as projection candidate regions based on the aptitude values, and is configured to select one or more projection candidate regions as the projection region from the plurality of projection candidate regions based on positions or arrangements of the projection candidate regions within the projection region.

3. An image display device according to claim 1, wherein the aptitude detection part is configured to use the position of one reflection point within the divided region as the evaluation-use position, and is configured to select three or more divided regions out of the divided regions where the radiation directions of the electromagnetic waves or the ultrasonic waves incident on the reflection points used as the evaluation-use positions are on the same plane, and when the positions of the reflection points used as the evaluation-use positions in three or more selected divided regions are on one straight line, the aptitude detection part is configured to detect the aptitude values determined as projection candidate regions in three or more selected divided regions.

4. An image display device according to claim 1, wherein the aptitude detection part is configured to detect, based on reflection light of white light projected toward at least the respective divided regions, colors of the divided regions, and is configured to detects the aptitude values of the divided regions corresponding to the colors.

5. An image display device according to claim 1, wherein the aptitude detection part is configured to detect, based on reflection light of white light projected toward at least the respective divided regions, brightnesses of the divided regions, and is configured to detect the aptitude values of the divided regions corresponding to the brightnesses.

6. An image display device according to claim 2, wherein the region selection part, when the divided region including a center position of the projection area is included as one of the projection candidate regions, is configured to select the divided region including the center position to be part of the projection region.

7. An image display device according to claim 2, wherein the region selection part, when a maximum similar shape which falls within one or more projection candidate regions out of similar shapes similar to a shape of a projection range of the projection light overlaps with one or more projection candidate regions, is configured to select one or more projection candidate regions which overlap with the similar shape to be part of the projection region.

8. An image display device for projecting light on a projection surface to display an image on the projection surface, the image display device comprising:
at least one processor;
an aptitude detection part configured to detect an aptitude as the projection surface;
a projection part configured to generate and project projection light based on a video signal;
a pedestal which mounts the projection part in an erected manner, wherein the projection part is configured to project the projection light such that at least a portion of the projection light is radiated to the pedestal;
a projection space where at least a portion of an image formed by the projection light is formed on the pedestal; and
memory storing computer-readable instructions that, when executed, cause the at least one processor to function as:
a projection control unit configured to control the projection light to allow the image to be displayed on the projection surface to fall within a predetermined projection region in response to a result of detection by the aptitude detection part; and
a region selection part configured to select the projection region in response to the result of detection by the aptitude detection part,
wherein the aptitude detection part is configured to detect, in a state where the projection region is formed of a mass of a plurality of divided regions, an aptitude value as the projection surface in each divided region,
wherein the region selection part is configured to select, based on the aptitude values, one or more divided regions from the plurality of divided regions as the projection region,
wherein the projection control unit is configured to control the projection light to allow the image to be displayed on the projection surface to fall within the selected projection region,
wherein the aptitude detection part includes a photo detector mounted in the projection space of the pedestal, and is configured to receive the projection light and is configured to output received light information after converting received light into the received light information, and
wherein the projection control unit is configured to change a size of the image or a projection position of the image based on the received light information.

9. An image display device according to claim 8, wherein the memory stores additional computer-readable instructions that, when executed, further cause the at least one processor to function as a distance information generation unit configured to generate a video signal including distance information of the image formed by the projection light corresponding to a distance from a projection end on the pedestal side, and is configured to output the video signal to the projection part, and
wherein the projection control unit is configured to change the size of the image or the projection position of the image based on the received light information outputted by the photo detector and the distance information.

10. An image display device according to claim 9, wherein the distance information generation unit is configured to generate distance information expressing the distance of the image formed by the projection light from the projection end on the pedestal side as the difference in projection mode.

11. An image display device according to claim 10, wherein the distance information is the projection mode of the image having different characteristics corresponding to the distances from the projection end on the pedestal side.

12. An image display device according to claim 11, wherein the distance information includes a characteristic parallel to the projection end on the pedestal side.

13. An image display device according to claim 11, wherein the distance information is an image projected only in the vicinity of the photo detector.

14. An image display device according to claim 11, wherein the distance information is an image projected only within a range of a predetermined distance from the projection end on the pedestal end.

15. An image display device according to claim 8, wherein the image display device includes an operation switch mounted on the pedestal and outputs operation information when an operation relating to the image is performed, and wherein the memory stores additional computer-readable instructions that, when executed, further cause the at least one processor to function as a function information generation unit configured to generate a video signal including operation function information for projecting a function allocated to the operation switch and outputs the video signal on the projection part.

16. An image display device according to claim 15, wherein the operation switch is a photo detection switch configured to receive the projection light, convert the received light into the operation information, and output the operation information.

17. An image display device according to claim 8, wherein the image display device includes a varying mechanism capable of changing a height of the projection part relative to the pedestal.

18. An image display device according to claim 8, wherein the pedestal includes a storable or foldable screen.

19. An image display device for projecting light on a projection surface to display an image on the projection surface, the image display device comprising:
   at least one processor;
   an aptitude detection part configured to detect an aptitude as the projection surface;
   a projection part configured to generate and project projection light based on a video signal;
   a pedestal which mounts the projection part in an erected manner, wherein the projection part is configured to project the projection light such that at least a portion of the projection light is radiated to the pedestal;
   a projection space where at least a portion of an image formed by the projection light is formed on the pedestal; and
   memory storing computer-readable instructions that, when executed, cause the at least one processor to function as:
      a projection control unit configured to control the projection light to allow the image to be displayed on the projection surface to fall within a predetermined projection region in response to a result of detection by the aptitude detection part; and
      a region selection part configured to select the projection region in response to the result of detection by the aptitude detection part,
   wherein the aptitude detection part is configured to detect, in a state where the projection region is formed of a mass of a plurality of divided regions, an aptitude value as the projection surface in each divided region,
   wherein the region selection part is configured to select, based on the aptitude values, one or more divided regions from the plurality of divided regions as the projection region,
   wherein the projection control unit is configured to control the projection light to allow the image to be displayed on the projection surface to fall within the selected projection region, and
   wherein the projection part is configured to project light at a projection angle θs larger than an inclination angle θd when a stepped portion of the acute inclination angle θd is present in the projection region on the pedestal.

* * * * *